United States Patent
Park et al.

(10) Patent No.: US 12,003,356 B2
(45) Date of Patent: Jun. 4, 2024

(54) METHOD AND APPARATUS FOR TRANSMITTING EHT PPDU IN WIRELESS LAN SYSTEM

(71) Applicant: LG ELECTRONICS INC., Seoul (KR)

(72) Inventors: Eunsung Park, Seoul (KR); Jinsoo Choi, Seoul (KR); Dongguk Lim, Seoul (KR); Jinmin Kim, Seoul (KR); Sunwoong Yun, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 428 days.

(21) Appl. No.: 17/299,668

(22) PCT Filed: Dec. 9, 2019

(86) PCT No.: PCT/KR2019/017282
§ 371 (c)(1),
(2) Date: Jun. 3, 2021

(87) PCT Pub. No.: WO2020/122523
PCT Pub. Date: Jun. 18, 2020

(65) Prior Publication Data
US 2022/0038315 A1 Feb. 3, 2022

(30) Foreign Application Priority Data

Dec. 13, 2018 (KR) ........................ 10-2018-0160871

(51) Int. Cl.
*H04L 27/26* (2006.01)
*H04B 7/0413* (2017.01)
*H04W 84/12* (2009.01)

(52) U.S. Cl.
CPC ....... *H04L 27/2602* (2013.01); *H04B 7/0413* (2013.01); *H04L 27/2621* (2013.01); *H04W 84/12* (2013.01)

(58) Field of Classification Search
CPC ... H04L 27/2602; H04L 27/2621; H04L 5/00; H04L 27/26132; H04B 7/0413; H04W 84/12; H04J 13/00
See application file for complete search history.

(56) References Cited

U.S. PATENT DOCUMENTS 9,325,463 B2    4/2016 Azizi et al.
2016/0087766 A1 3/2016 Sun et al.
(Continued)

FOREIGN PATENT DOCUMENTS

WO   2016018026    2/2016
WO   2016056799    4/2016
WO   2017022922    2/2017

OTHER PUBLICATIONS

PCT International Application No. PCT/KR2019/017282, International Search Report dated Mar. 18, 2020, 10 pages.

*Primary Examiner* — Kiet Tang
(74) *Attorney, Agent, or Firm* — LEE, HONG, DEGERMAN, KANG & WAIMEY

(57) ABSTRACT

A method and apparatus for transmitting an EHT PPDU in a wireless LAN system is proposed. Specifically, a transmitting STA generates an EHT PPDU including a STF signal. The transmitting STA transmits the EHT PPDU to a receiving STA. The STF signal is generated on the basis of an EHT STF sequence for a 320 MHz band or a 160+160 MHz band. The EHT STF sequence for the 320 MHz band is a first sequence in which a predetermined M sequence is repeated, which is defined as {M 1 M 1 M 1 −M 0 M 1 −M 1 −M 1 M 0 M 1 M 1 M 1 −M 0 −M −1 M −1 M −1 −M}*(1+j)/sqrt(2). The sqrt( ) represents the square root.

(Continued)

The predetermined M sequence is defined as M={−1, −1, −1, 1, 1, 1, −1, 1, 1, 1, −1, 1, 1, −1, 1}.

20 Claims, 26 Drawing Sheets

(56) References Cited

U.S. PATENT DOCUMENTS

| | | | |
|---|---|---|---|
| 2019/0288895 A1* | 9/2019 | Chen | H04W 72/542 |
| 2019/0289612 A1* | 9/2019 | Chen | H04L 27/2613 |
| 2020/0153571 A1* | 5/2020 | Suh | H04L 5/0044 |
| 2022/0007353 A1* | 1/2022 | Chen | H04L 69/18 |

* cited by examiner

FIG. 2
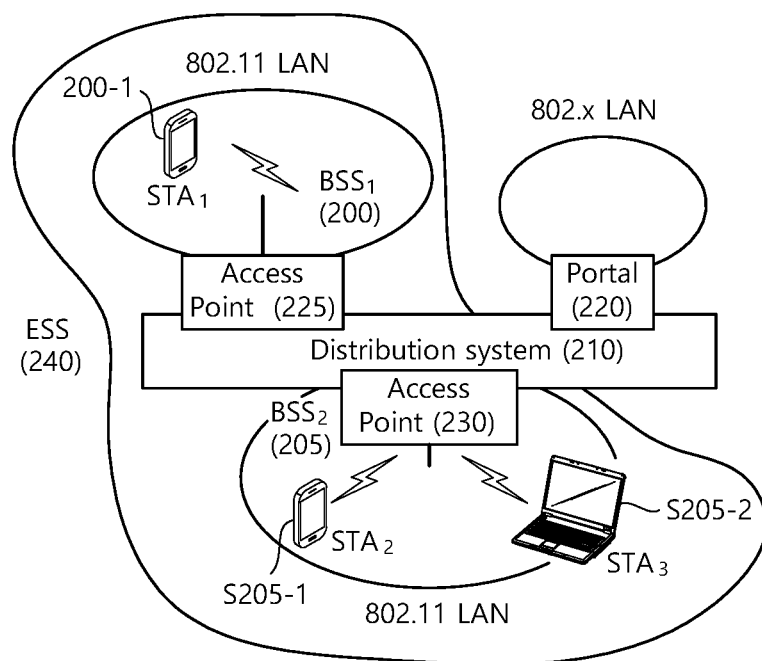
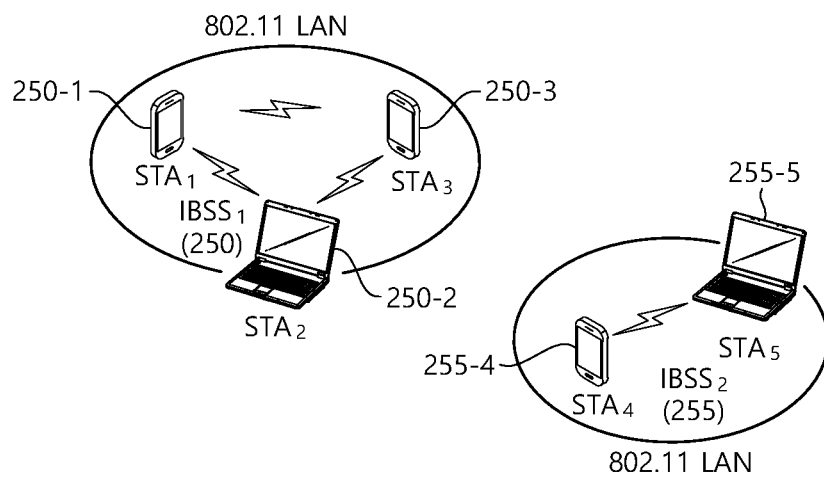

METHOD AND APPARATUS FOR TRANSMITTING EHT PPDU IN WIRELESS LAN SYSTEM

CROSS-REFERENCE TO RELATED APPLICATIONS

This application is the National Stage filing under 35 U.S.C. 371 of International Application No. PCT/KR2019/017282, filed on Dec. 9, 2019, which claims the benefit of earlier filing date and right of priority to Korean Application No. 10-2018-0160871, filed on Dec. 13, 2018, the contents of which are all incorporated by reference herein in their entirety.

BACKGROUND

Field of the Disclosure

The present specification relates to a scheme of transmitting an extremely high throughput (EHT) physical protocol data unit (PPDU) in a wireless local area network (WLAN) system, and more particularly, to a method and apparatus for configuring a short training field (STF) signal having an optimal peak-to-average power ratio (PAPR) and transmitting an EHT PPDU in the WLAN system, without consideration of preamble puncturing in a wideband tone plan in which a tone plan defined in an EHT WLAN system is repeated.

Related Art

A wireless local area network (WLAN) has been improved in various ways. For example, the IEEE 802.11ax standard proposed an improved communication environment using orthogonal frequency division multiple access (OFDMA) and downlink multi-user multiple input multiple output (DL MU MIMO) techniques.

The present specification proposes a technical feature that can be utilized in a new communication standard. For example, the new communication standard may be an extreme high throughput (EHT) standard which is currently being discussed. The EHT standard may use an increased bandwidth, an enhanced PHY layer protocol data unit (PPDU) structure, an enhanced sequence, a hybrid automatic repeat request (HARD) scheme, or the like, which is newly proposed. The EHT standard may be called the IEEE 802.11be standard.

In the new wireless LAN standard, an increased number of spatial streams may be used. In this case, in order to properly use the increased number of spatial streams, a signaling technique in the WLAN system may need to be improved.

SUMMARY

The present specification proposes a method and apparatus for transmitting an extremely high throughput (EHT) physical protocol data unit (PPDU) in a wireless local area network (WLAN) system.

An example of the present specification proposes a method of transmitting an extremely high throughput (EHT) physical protocol data unit (PPDU).

An example of the present embodiment may be performed in a network environment in which a next-generation WLAN system is supported. The next-generation WLAN system is a WLAN system evolved from an 802.11ax system, and may satisfy backward compatibility with the 802.11ax system.

The next-generation WLAN system (IEEE 802.11be or EHT WLAN system) may support a wideband to increase a throughput. The wideband includes 160 MHz, 240 MHz, and 320 MHz bands (or a 160+160 MHz band). In the present embodiment, an STF sequence for obtaining an optimal peak-to-average power ratio (PAPR) is proposed by considering a tone plane for each band, whether preamble puncturing is performed, and radio frequency (RF) capability.

The present embodiment may be performed by a transmitting station (STA), and the transmitting STA may correspond to an access point (AP). A receiving STA of the present embodiment may correspond to an STA supporting an EHT WLAN system.

The transmitting STA generates a short training field (STF) signal.

The transmitting STA transmits the EHT PPDU including the STF signal to the receiving STA through a 320 MHz band or a 160+160 MHz band. The 320 MHz band is a contiguous band, and the 160+160 MHz band is a non-contiguous band.

The STF signal is generated based on an EHT STF sequence for the 320 MHz band or the 160+160 MHz band.

The EHT STF sequence for the 320 MHz band is a first sequence in which a pre-set M sequence is repeated, and is defined as follows.

$$\{M\ 1\ -M\ 0\ -M\ 1\ -M\ 0\ -M\ -1\ M\ 0\ -M\ 1\ -M\ 0\ -M\ -1\ M\ 0\ M\ -1\ M\ 0\ -M\ -1\ M\ 0\ -M\ 1\ -M\}*(1+j)/\mathrm{sqrt}(2).$$

Herein, sqrt( ) represents a square root. In addition, * denotes a multiplication operator.

The pre-set M sequence is defined as follows.

$$M=\{-1, -1, -1, 1, 1, 1, -1, 1, 1, 1, -1, 1, 1, -1, 1\}$$

The pre-set M-sequence is the same as the M-sequence defined in the 801.11ax.

According to an embodiment proposed in the present specification, a short training field (STF) sequence having an optimal peak-to-average power ratio (PAPR) is configured without considering preamble puncturing in a wideband tone plan in which a tone plan defined in an extremely high throughput (EHT) wireless local area network (WLAN) system is repeated, thereby increasing a throughput and achieving overall system improvement.

BRIEF DESCRIPTION OF THE DRAWINGS

FIG. 2 is a conceptual diagram illustrating the structure of a wireless local area network (WLAN).

DESCRIPTION OF EXEMPLARY EMBODIMENTS

In the present specification, a slash (/) or comma may indicate "and/or". For example, "A/B" may indicate "A and/or B," and therefore may mean "only A", "only B", or "A and B". Technical features that are separately described in one drawing may be implemented separately or may be implemented simultaneously.

In the present specification, parentheses may indicate "for example." Specifically, "control information (EHT-Signal)" may mean that the "EHT-Signal" is proposed as an example of the "control information". Further, "control information (i.e., EHT-Signal)" may also mean that the "EHT-Signal" is proposed as an example of the "control information."

The following examples of the present specification may be applied to various wireless communication systems. For example, the following examples of the present specification may be applied to a wireless local area network (WLAN) system. For example, the present specification may be applied to IEEE 802.11a/g/n/ac or IEEE 802.11ax. The present specification may also be applied to a newly proposed EHT standard or IEEE 802.11be. Further, the present specification may be applied to a new WLAN stand which has enhanced IEEE 802.11be.

Hereinafter, technical features of a WLAN system to which the present specification is applicable are described in order to describe technical features of the present specification.

Figure 1:
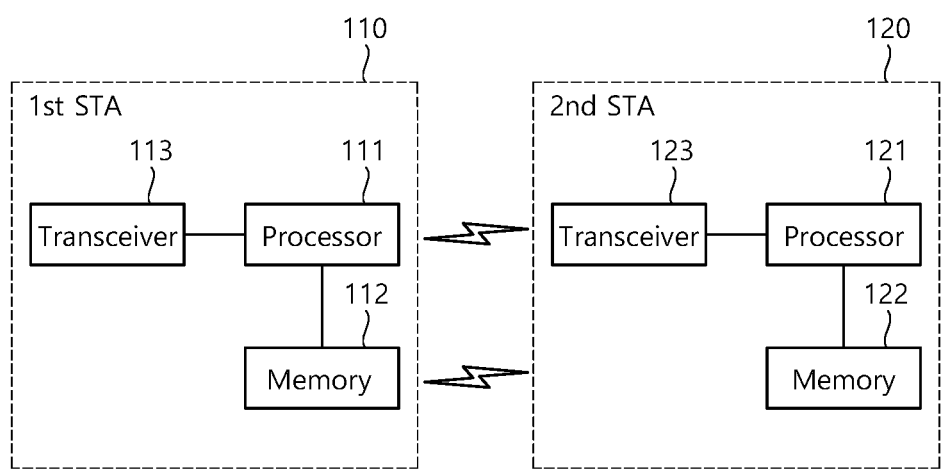
FIG. 1 illustrates an example of a transmitting device and/or a receiving device according to the present disclosure.

FIG. 1 shows an example of a transmitting apparatus and/or receiving apparatus of the present specification.

In the example of FIG. 1, various technical features described below may be performed. FIG. 1 relates to two stations (STAs). For example, STAs 110 and 120 of the present specification may also be called in various terms such as a mobile terminal, a wireless device, a wireless transmit/receive unit (WTRU), a user equipment (UE), a mobile station (MS), a mobile subscriber unit, or simply a user. Further, the STAs 110 and 120 of the present specification may also be referred to as various names such as a receiving apparatus, a transmitting apparatus, a receiving STA, a transmitting STA, a receiving device, a transmitting device, or the like.

The STAs 110 and 120 may serve as an AP or a non-AP. That is, the STAs 110 and 120 of the present specification may serve as the AP and/or the non-AP.

The STAs 110 and 120 of the present specification may support various communication standards together in addition to the IEEE 802.11 standard. For example, a communication standard (e.g., LTE, LTE-A, 5G NR standard) or the like based on the 3GPP standard may be supported. In addition, the STA of the present specification may be implemented as various devices such as a mobile phone, a vehicle, a personal computer, or the like.

The STAs 110 and 120 of the present specification may include a medium access control (MAC) conforming to the IEEE 802.11 standard and a physical layer interface for a radio medium.

The first STA 110 may include a processor 111, a memory 112, and a transceiver 113. The illustrated process, memory, and transceiver may be implemented individually as separate chips, or at least two blocks/functions may be implemented through a single chip.

The transceiver 113 of the first STA performs a signal transmission/reception operation. Specifically, an IEEE 802.11 packet (e.g., IEEE 802.11a/b/g/n/ac/ax/be, etc.) may be transmitted/received.

For example, the first STA 110 may perform an operation intended by an AP. For example, the processor 111 of the AP may receive a signal through the transceiver 113, process a reception (RX) signal, generate a transmission (TX) signal, and provide control for signal transmission. The memory 112 of the AP may store a signal (e.g., RX signal) received through the transceiver 113, and may store a signal (e.g., TX signal) to be transmitted through the transceiver.

For example, the second STA 120 may perform an operation intended by a non-AP STA. For example, a transceiver 123 of a non-AP performs a signal transmission/reception operation. Specifically, an IEEE 802.11 packet (e.g., IEEE 802.11a/b/g/n/ac/ax/be packet, etc.) may be transmitted/received.

For example, a processor 121 of the non-AP STA may receive a signal through the transceiver 123, process an RX signal, generate a TX signal, and provide control for signal transmission. A memory 122 of the non-AP STA may store a signal (e.g., RX signal) received through the transceiver 123, and may store a signal (e.g., TX signal) to be transmitted through the transceiver.

For example, an operation of a device indicated as an AP in the specification described below may be performed in the first STA 110. For example, if the first STA 110 is the AP, the operation of the device indicated as the AP may be controlled by the processor 111 of the first STA 110, and a related signal may be transmitted or received through the transceiver 113 controlled by the processor 111 of the first STA 110. In addition, control information related to the operation of the AP or a TX/RX signal of the AP may be stored in the memory 112 of the first STA 110.

For example, in the specification described below, an operation of a device indicated as a non-AP (or user-STA) may be performed in the second STA 120. For example, if the second STA 120 is the non-AP, the operation of the device indicated as the non-AP may be controlled by the processor 121 of the second STA 120, and a related signal may be transmitted or received through the transceiver 123 controlled by the processor 121 of the second STA 120. In addition, control information related to the operation of the non-AP or a TX/RX signal of the non-AP may be stored in the memory 122 of the second STA 120.

FIG. 2 is a conceptual view illustrating the structure of a wireless local area network (WLAN).

An upper part of FIG. 2 illustrates the structure of an infrastructure basic service set (BSS) of institute of electrical and electronic engineers (IEEE) 802.11.

Referring the upper part of FIG. 2, the wireless LAN system may include one or more infrastructure BSSs 200 and 205 (hereinafter, referred to as BSS). The BSSs 200 and 205 as a set of an AP and an STA such as an access point (AP) 225 and a station (STA1) 200-1 which are successfully synchronized to communicate with each other are not concepts indicating a specific region. The BSS 205 may include one or more STAs 205-1 and 205-2 which may be joined to one AP 230.

The BSS may include at least one STA, APs providing a distribution service, and a distribution system (DS) 210 connecting multiple APs.

The distribution system 210 may implement an extended service set (ESS) 240 extended by connecting the multiple BSSs 200 and 205. The ESS 240 may be used as a term indicating one network configured by connecting one or more APs 225 or 230 through the distribution system 210. The AP included in one ESS 240 may have the same service set identification (SSID).

A portal 220 may serve as a bridge which connects the wireless LAN network (IEEE 802.11) and another network (e.g., 802.X).

In the BSS illustrated in the upper part of FIG. 2, a network between the APs 225 and 230 and a network between the APs 225 and 230 and the STAs 200-1, 205-1, and 205-2 may be implemented. However, the network is configured even between the STAs without the APs 225 and 230 to perform communication. A network in which the communication is performed by configuring the network even between the STAs without the APs 225 and 230 is defined as an Ad-Hoc network or an independent basic service set (IBSS).

A lower part of FIG. 2 illustrates a conceptual view illustrating the IBSS.

Referring to the lower part of FIG. 2, the IBSS is a BSS that operates in an Ad-Hoc mode. Since the IBSS does not include the access point (AP), a centralized management entity that performs a management function at the center does not exist. That is, in the IBSS, STAs 250-1, 250-2, 250-3, 255-4, and 255-5 are managed by a distributed manner. In the IBSS, all STAs 250-1, 250-2, 250-3, 255-4, and 255-5 may be constituted by movable STAs and are not permitted to access the DS to constitute a self-contained network.

Figure 3:
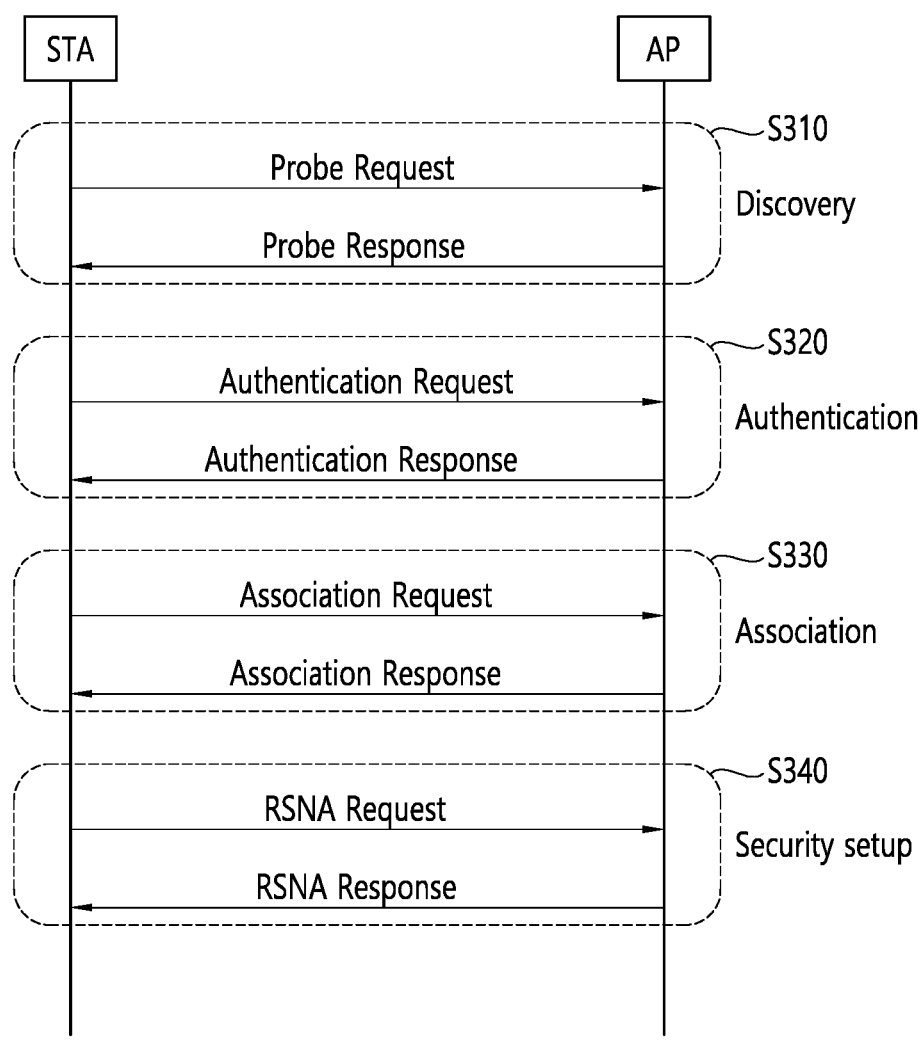
FIG. 3 illustrates a general link setup process.

FIG. 3 illustrates a general link setup process.

In S310, a STA may perform a network discovery operation. The network discovery operation may include a scanning operation of the STA. That is, to access a network, the STA needs to discover a participating network. The STA needs to identify a compatible network before participating in a wireless network, and a process of identifying a network present in a particular area is referred to as scanning. Scanning methods include active scanning and passive scanning.

FIG. 3 illustrates a network discovery operation including an active scanning process. In active scanning, a STA performing scanning transmits a probe request frame and waits for a response to the probe request frame in order to identify which AP is present around while moving to channels. A responder transmits a probe response frame as a response to the probe request frame to the STA having transmitted the probe request frame. Here, the responder may be a STA that transmits the last beacon frame in a BSS of a channel being scanned. In the BSS, since an AP transmits a beacon frame, the AP is the responder. In an IBSS, since STAs in the IBSS transmit a beacon frame in turns, the responder is not fixed. For example, when the STA transmits a probe request frame via channel 1 and receives a probe response frame via channel 1, the STA may store BSS-related information included in the received probe response frame, may move to the next channel (e.g., channel 2), and may perform scanning (e.g., transmits a probe request and receives a probe response via channel 2) by the same method.

Although not shown in FIG. 3, scanning may be performed by a passive scanning method. In passive scanning, a STA performing scanning may wait for a beacon frame while moving to channels. A beacon frame is one of management frames in IEEE 802.11 and is periodically transmitted to indicate the presence of a wireless network and to enable the STA performing scanning to find the wireless network and to participate in the wireless network. In a BSS, an AP serves to periodically transmit a beacon frame. In an IBSS, STAs in the IBSS transmit a beacon frame in turns. Upon receiving the beacon frame, the STA performing scanning stores information about a BSS included in the beacon frame and records beacon frame information in each channel while moving to another channel. The STA having received the beacon frame may store BSS-related information included in the received beacon frame, may move to the next channel, and may perform scanning in the next channel by the same method.

After discovering the network, the STA may perform an authentication process in S320. The authentication process may be referred to as a first authentication process to be clearly distinguished from the following security setup operation in S340. The authentication process in S320 may include a process in which the STA transmits an authentication request frame to the AP and the AP transmits an authentication response frame to the STA in response. The authentication frames used for an authentication request/response are management frames.

The authentication frames may include information about an authentication algorithm number, an authentication transaction sequence number, a status code, a challenge text, a robust security network (RSN), and a finite cyclic group.

The STA may transmit the authentication request frame to the AP. The AP may determine whether to allow the authentication of the STA based on the information included in the received authentication request frame. The AP may provide the authentication processing result to the STA via the authentication response frame.

When the STA is successfully authenticated, the STA may perform an association process in S330. The association process includes a process in which the STA transmits an association request frame to the AP and the AP transmits an association response frame to the STA in response. The association request frame may include, for example, information about various capabilities, a beacon listen interval, a service set identifier (SSID), a supported rate, a supported channel, RSN, a mobility domain, a supported operating class, a traffic indication map (TIM) broadcast request, and an interworking service capability. The association response frame may include, for example, information about various capabilities, a status code, an association ID (AID), a supported rate, an enhanced distributed channel access (EDCA) parameter set, a received channel power indicator (RCPI), a received signal-to-noise indicator (RSNI), a mobility domain, a timeout interval (association comeback time), an overlapping BSS scanning parameter, a TIM broadcast response, and a QoS map.

In S340, the STA may perform a security setup process. The security setup process in S340 may include a process of setting up a private key through four-way handshaking, for example, through an extensible authentication protocol over LAN (EAPOL) frame.

Figure 4:
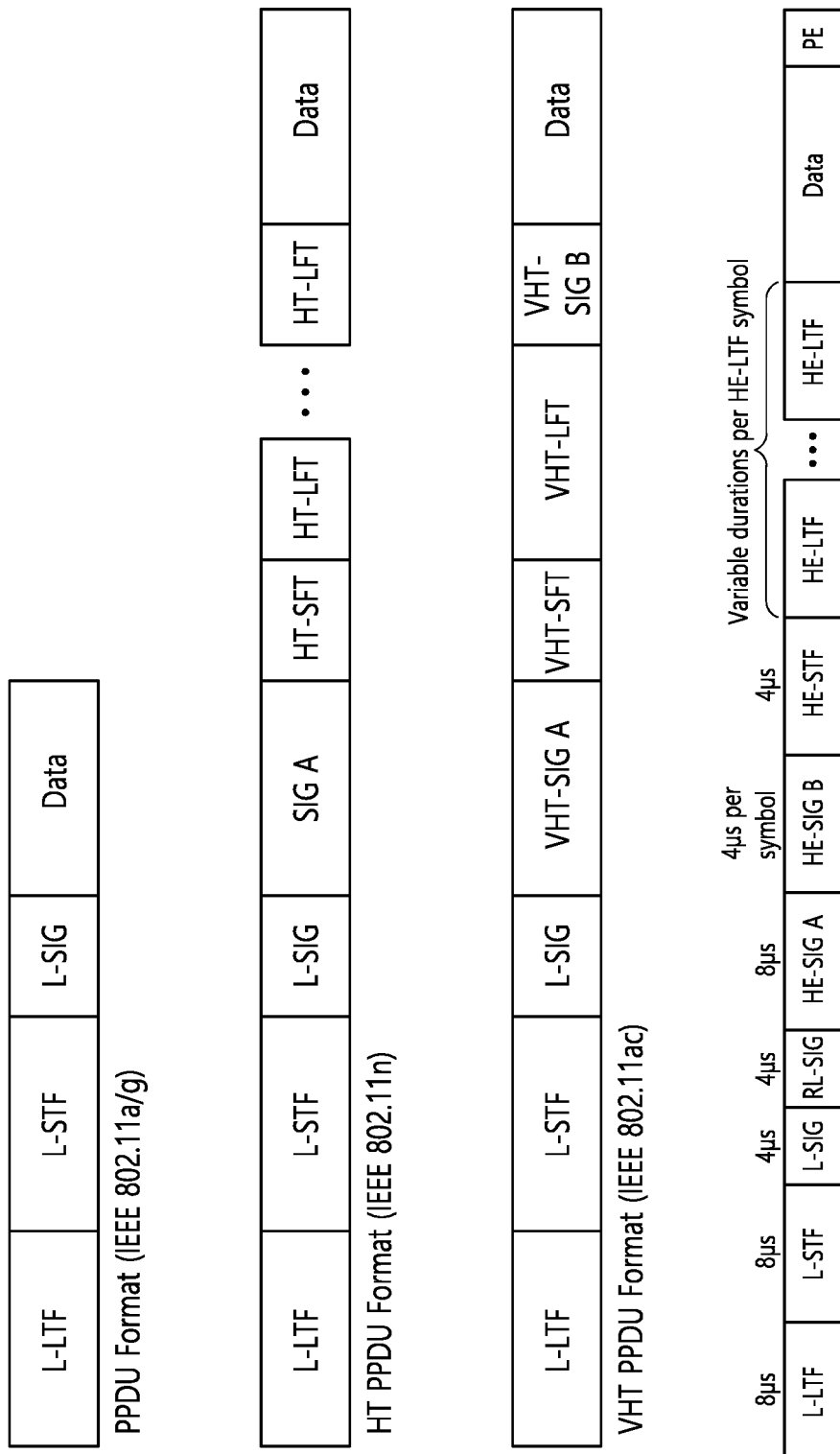
FIG. 4 illustrates an example of a PPDU used in an IEEE standard.

FIG. 4 illustrates an example of a PPDU used in an IEEE standard.

As illustrated in FIG. 4, various types of PHY protocol data units (PPDUs) are used in IEEE a/g/n/ac standards. Specifically, a LTF and a STF include a training signal, a SIG-A and a SIG-B include control information for a receiving STA, and a data field includes user data corresponding to a PSDU (MAC PDU/aggregated MAC PDU).

FIG. 4 also includes an example of an HE PPDU according to IEEE 802.11ax. The HE PPDU according to FIG. 4 is an illustrative PPDU for multiple users. An HE-SIG-B may be included only in a PPDU for multiple users, and an HE-SIG-B may be omitted in a PPDU for a single user.

As illustrated in FIG. 4, the HE-PPDU for multiple users (MUs) may include a legacy-short training field (L-STF), a legacy-long training field (L-LTF), a legacy-signal (L-SIG), a high efficiency-signal A (HE-SIG A), a high efficiency-signal-B (HE-SIG B), a high efficiency-short training field (HE-STF), a high efficiency-long training field (HE-LTF), a data field (alternatively, an MAC payload), and a packet extension (PE) field. The respective fields may be transmitted for illustrated time periods (i.e., 4 or 8 μs).

Hereinafter, a resource unit (RU) used for a PPDU is described. An RU may include a plurality of subcarriers (or tones). An RU may be used to transmit a signal to a plurality of STAs according to OFDMA. Further, an RU may also be defined to transmit a signal to one STA. An RU may be used for an STF, an LTF, a data field, or the like.

Figure 5:
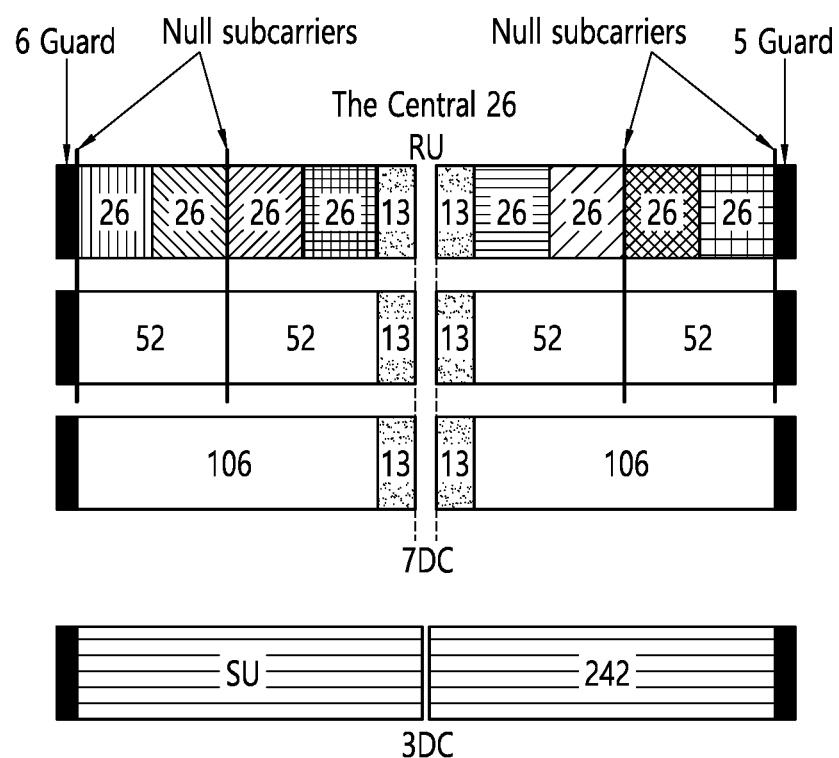
FIG. 5 is a diagram illustrating a layout of resource units (RUs) used in a band of 20 MHz.

FIG. 5 illustrates a layout of resource units (RUs) used in a band of 20 MHz.

As illustrated in FIG. 5, resource units (RUs) corresponding to different numbers of tones (i.e., subcarriers) may be used to form some fields of an HE-PPDU. For example, resources may be allocated in illustrated RUs for an HE-STF, an HE-LTF, and a data field.

As illustrated in the uppermost part of FIG. 5, a 26-unit (i.e., a unit corresponding to 26 tones) may be disposed. Six tones may be used for a guard band in the leftmost band of the 20 MHz band, and five tones may be used for a guard band in the rightmost band of the 20 MHz band. Further, seven DC tones may be inserted in a center band, that is, a DC band, and a 26-unit corresponding to 13 tones on each of the left and right sides of the DC band may be disposed. A 26-unit, a 52-unit, and a 106-unit may be allocated to other bands. Each unit may be allocated for a receiving STA, that is, a user.

The layout of the RUs in FIG. 5 may be used not only for a multiple users (MUs) but also for a single user (SU), in which case one 242-unit may be used and three DC tones may be inserted as illustrated in the lowermost part of FIG. 5.

Although FIG. 5 proposes RUs having various sizes, that is, a 26-RU, a 52-RU, a 106-RU, and a 242-RU, specific sizes of RUs may be extended or increased. Therefore, the present embodiment is not limited to the specific size of each RU (i.e., the number of corresponding tones).

Figure 6:
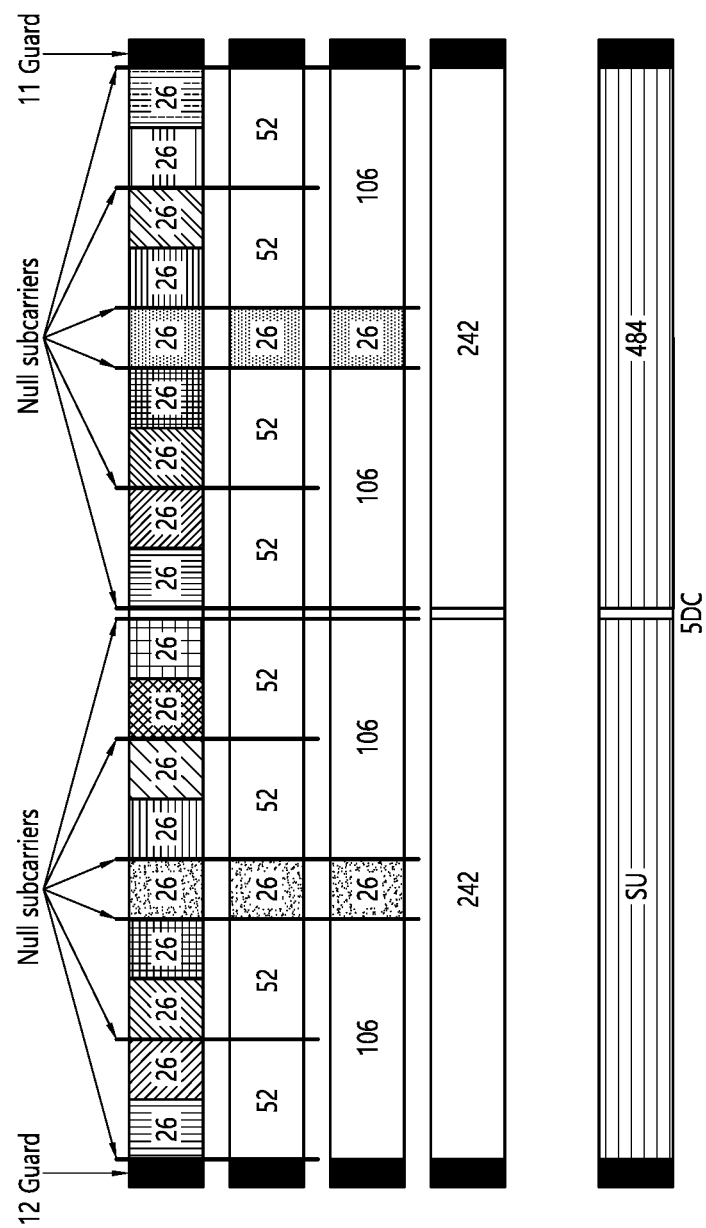
FIG. 6 is a diagram illustrating a layout of resource units (RUs) used in a band of 40 MHz.

FIG. 6 illustrates a layout of RUs used in a band of 40 MHz.

Similarly to FIG. 5 in which RUs having various sizes are used, a 26-RU, a 52-RU, a 106-RU, a 242-RU, a 484-RU, and the like may be used in an example of FIG. 6. Further, five DC tones may be inserted in a center frequency, 12 tones may be used for a guard band in the leftmost band of the 40 MHz band, and 11 tones may be used for a guard band in the rightmost band of the 40 MHz band.

As illustrated in FIG. 6, when the layout of the RUs is used for a single user, a 484-RU may be used. The specific number of RUs may be changed similarly to FIG. 5.

Figure 7:
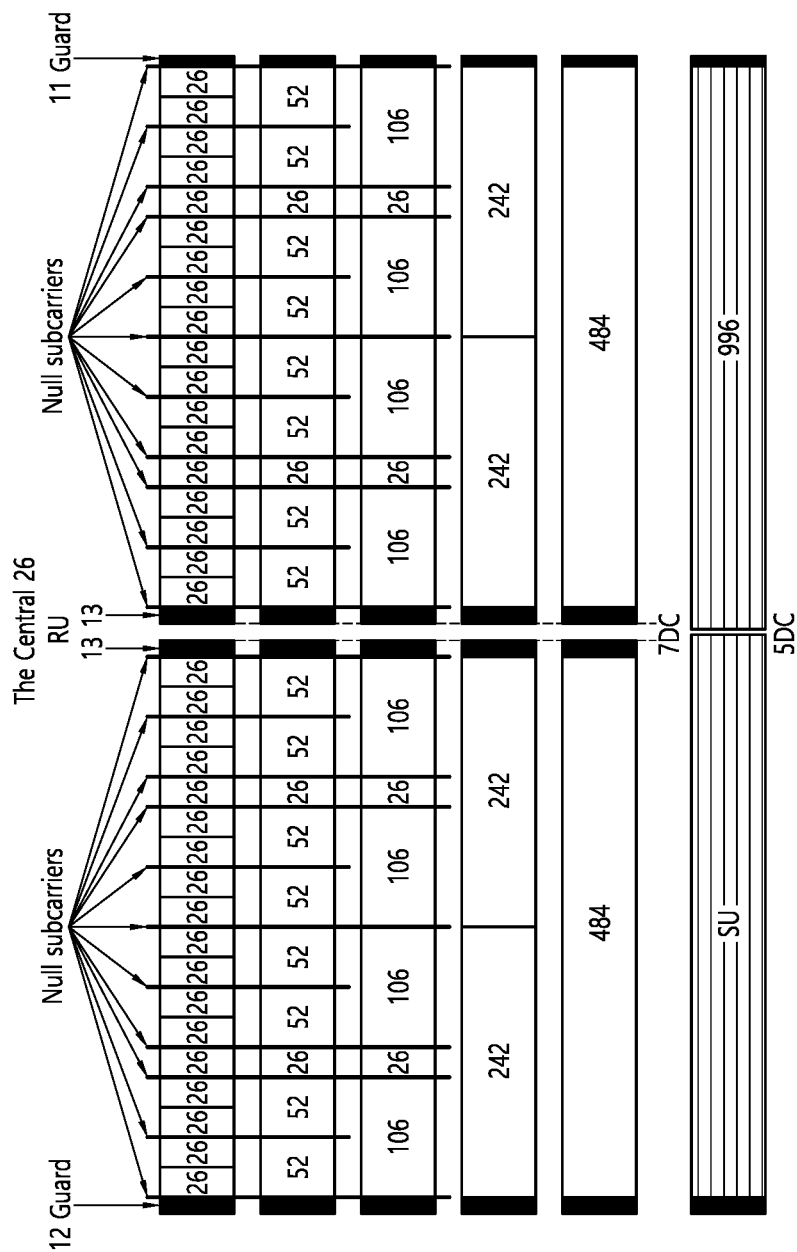
FIG. 7 is a diagram illustrating a layout of resource units (RUs) used in a band of 80 MHz.

FIG. 7 illustrates a layout of RUs used in a band of 80 MHz.

Similarly to FIG. 5 and FIG. 6 in which RUs having various sizes are used, a 26-RU, a 52-RU, a 106-RU, a 242-RU, a 484-RU, a 996-RU, and the like may be used in an example of FIG. 7. Further, seven DC tones may be inserted in the center frequency, 12 tones may be used for a guard band in the leftmost band of the 80 MHz band, and 11 tones may be used for a guard band in the rightmost band of the 80 MHz band. In addition, a 26-RU corresponding to 13 tones on each of the left and right sides of the DC band may be used.

As illustrated in FIG. 7, when the layout of the RUs is used for a single user, a 996-RU may be used, in which case five DC tones may be inserted.

In the meantime, the fact that the specific number of RUs can be changed is the same as those of FIGS. 5 and 6.

The RU arrangement (i.e., RU location) shown in FIGS. 5 to 7 can be applied to a new wireless LAN system (e.g. EHT system) as it is. Meanwhile, for the 160 MHz band supported by the new WLAN system, the RU arrangement for 80 MHz (i.e., an example of FIG. 7) may be repeated twice, or the RU arrangement for the 40 MHz (i.e., an example of FIG. 6) may be repeated 4 times. In addition, when the EHT PPDU is configured for the 320 MHz band, the arrangement of the RU for 80 MHz (i.e., an example of FIG. 7) may be repeated 4 times or the arrangement of the RU for 40 MHz (i.e., an example of FIG. 6) may be repeated 8 times.

One RU of the present specification may be allocated for a single STA (e.g., a single non-AP STA). Alternatively, a plurality of RUs may be allocated for one STA (e.g., a non-AP STA).

The RU described in the present specification may be used in uplink (UL) communication and downlink (DL) communication. For example, when UL-MU communication which is solicited by a trigger frame is performed, a transmitting STA (e.g., AP) may allocate a first RU (e.g., 26/52/106/242-RU, etc.) to a first STA through the trigger frame, and may allocate a second RU (e.g., 26/52/106/242-RU, etc.) to a second STA. Thereafter, the first STA may transmit a first trigger-based PPDU based on the first RU, and the second STA may transmit a second trigger-based PPDU based on the second RU. The first/second trigger-based PPDU is transmitted to the AP at the same (or overlapped) time period.

For example, when a DL MU PPDU is configured, the transmitting STA (e.g., AP) may allocate the first RU (e.g., 26/52/106/242-RU. etc.) to the first STA, and may allocate the second RU (e.g., 26/52/106/242-RU, etc.) to the second STA. That is, the transmitting STA (e.g., AP) may transmit HE-STF, HE-LTF, and Data fields for the first STA through the first RU in one MU PPDU, and may transmit HE-STF, HE-LTF, and Data fields for the second STA through the second RU.

Information related to a layout of the RU may be signaled through HE-SIG-B.

Figure 8:
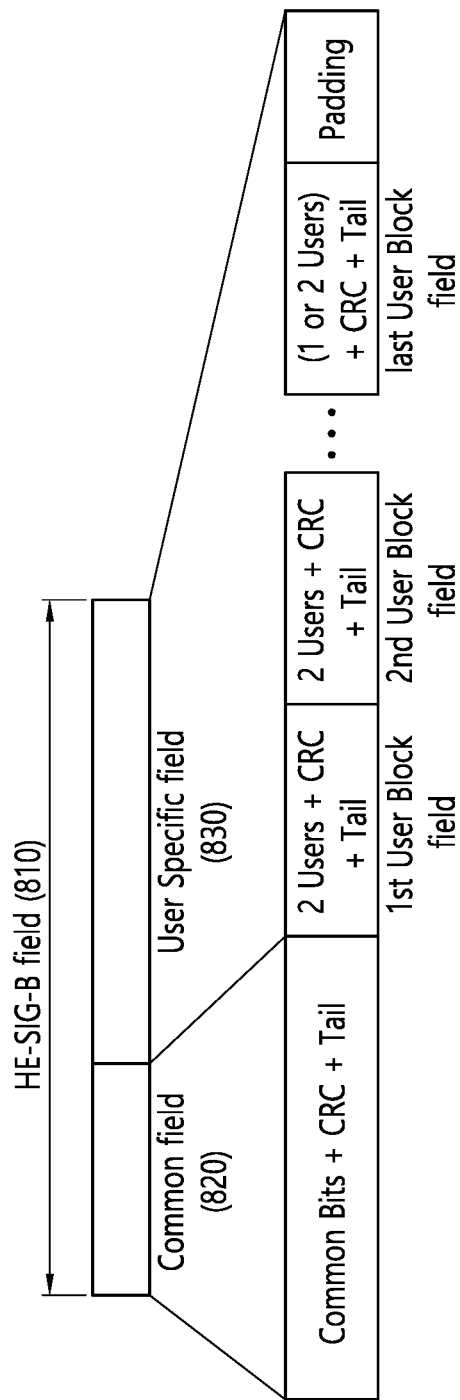
FIG. 8 illustrates the structure of an HE-SIG-B field.

FIG. 8 illustrates a structure of an HE-SIG-B field.

As illustrated, an HE-SIG-B field 810 includes a common field 820 and a user-specific field 830. The common field 820 may include information commonly applied to all users (i.e., user STAs) which receive SIG-B. The user-specific field 830 may be called a user-specific control field. When the SIG-B is transferred to a plurality of users, the user-specific field 830 may be applied only any one of the plurality of users.

As illustrated in FIG. 8, the common field 820 and the user-specific field 830 may be separately encoded.

The common field 820 may include RU allocation information of N*8 bits. For example, the RU allocation information may include information related to a location of an RU. For example, when a 20 MHz channel is used as shown in FIG. 5, the RU allocation information may include information related to a specific frequency band to which a specific RU (26-RU/52-RU/106-RU) is arranged.

An example of a case in which the RU allocation information consists of 8 bits is as follows.

TABLE 1

| RU Allocation subfield (B7 B6 B5 B4 B3 B2 B1 B0) | #1 | #2 | #3 | #4 | #5 | #6 | #7 | #8 | #9 | Number of entries |
|---|---|---|---|---|---|---|---|---|---|---|
| 00000000 | 26 | 26 | 26 | 26 | 26 | 26 | 26 | 26 | 26 | 1 |
| 00000001 | 26 | 26 | 26 | 26 | 26 | 26 | 26 | 52 | | 1 |
| 00000010 | 26 | 26 | 26 | 26 | 26 | 52 | 26 | 26 | | 1 |
| 00000011 | 26 | 26 | 26 | 26 | 26 | 52 | 52 | | | i |
| 00000100 | 26 | 26 | 52 | 26 | 26 | 26 | 26 | 26 | | 1 |
| 00000101 | 26 | 26 | 52 | 26 | 26 | 26 | 52 | | | 1 |
| 00000110 | 26 | 26 | 52 | 26 | 52 | 26 | 26 | | | 1 |
| 00000111 | 26 | 26 | 52 | 26 | 52 | 52 | | | | 1 |
| 00001000 | 52 | 26 | 26 | 26 | 26 | 26 | 26 | 26 | | 1 |
| 00001001 | 52 | 26 | 26 | 26 | 26 | 26 | 52 | | | 1 |
| 00001010 | 52 | 26 | 26 | 26 | 52 | 26 | 26 | | | 1 |

As shown the example of FIG. 5, up to nine 26-RUs may be allocated to the 20 MHz channel. When the RU allocation information of the common field 820 is set to "00000000" as shown in Table 1, the nine 26-RUs may be allocated to a corresponding channel (i.e., 20 MHz). In addition, when the RU allocation information of the common field 820 is set to "00000001" as shown in Table 1, seven 26-RUs and one 52-RU are arranged in a corresponding channel. That is, in the example of FIG. 5, the 52-RU may be allocated to the rightmost side, and the seven 26-RUs may be allocated to the left thereof.

The example of Table 1 shows only some of RU locations capable of displaying the RU allocation information. For example, the RU allocation information may include an example of Table 2 below.

TABLE 2

| | #1 | #2 | #3 | #4 | #5 | #6 | #7 | #8 | #9 | Number |
|---|---|---|---|---|---|---|---|---|---|---|
| $00010y_2y_1y_0$ | | 52 | | 52 | — | | 106 | | | 8 |
| $00011y_2y_1y_0$ | | | 106 | | — | 52 | | 52 | | 8 |
| $00100y_2y_1y_0$ | 26 | 26 | 26 | 26 | 26 | | 106 | | | 8 |
| $00101y_2y_1y_0$ | 26 | 26 | | 52 | 26 | | 106 | | | 8 |
| $00110y_2y_1y_0$ | | 52 | 26 | 26 | 26 | | 106 | | | 8 |
| $00111y_2y_1y_0$ | | 52 | | 52 | 26 | | 106 | | | 8 |
| $01000y_2y_1y_0$ | | | 106 | | | 26 | 26 | 26 | 26 26 | 8 |
| $01001y_2y_1y_0$ | | | 106 | | | 26 | 26 | 26 | 52 | 8 |
| $01010y_2y_1y_0$ | | | 106 | | | 26 | 52 | | 26 26 | 8 |
| $01011y_2y_1y_0$ | | | 106 | | | 26 | 52 | | 52 | 8 |
| $0110y_1y_0z_1z_0$ | | | 106 | | — | | 106 | | | 16 |

"$01000y_2y_1y_0$" relates to an example in which a 106-RU is allocated to the leftmost side of the 20 MHz channel, and five 26-RUs are allocated to the right side thereof. In this case, a plurality of STAs (e.g., user-STAs) may be allocated to the 106-RU, based on a MU-MIMO scheme. Specifically, up to 8 STAs (e.g., user-STAs) may be allocated to the 106-RU, and the number of STAs (e.g., user-STAs) allocated to the 106-RU is determined based on 3-bit information ($y_2y_1y_0$). For example, when the 3-bit information ($y_2y_1y_0$) is set to N, the number of STAs (e.g., user-STAs) allocated to the 106-RU based on the MU-MIMO scheme may be N+1.

In general, a plurality of STAs (e.g., user STAs) different from each other may be allocated to a plurality of RUs. However, the plurality of STAs (e.g., user STAs) may be allocated to one or more RUs having at least a specific size (e.g., 106 subcarriers), based on the MU-MIMO scheme.

As shown in FIG. 8, the user-specific field 830 may include a plurality of user fields. As described above, the number of STAs (e.g., user STAs) allocated to a specific channel may be determined based on the RU allocation information of the common field 820. For example, when the RU allocation information of the common field 820 is "00000000", one user STA may be allocated to each of nine 26-RUs (e.g., nine user STAs may be allocated). That is, up to 9 user STAs may be allocated to a specific channel through an OFDMA scheme. In other words, up to 9 user STAs may be allocated to a specific channel through a non-MU-MIMO scheme.

For example, when RU allocation is set to "$01000y_2y_1y_0$", a plurality of STAs may be allocated to the 106-RU arranged at the leftmost side through the MU-MIMO scheme, and five user STAs may be allocated to five 26-RUs arranged to the right side thereof through the non-MU MIMO scheme. This case is specified through an example of FIG. 9.

Figure 9:
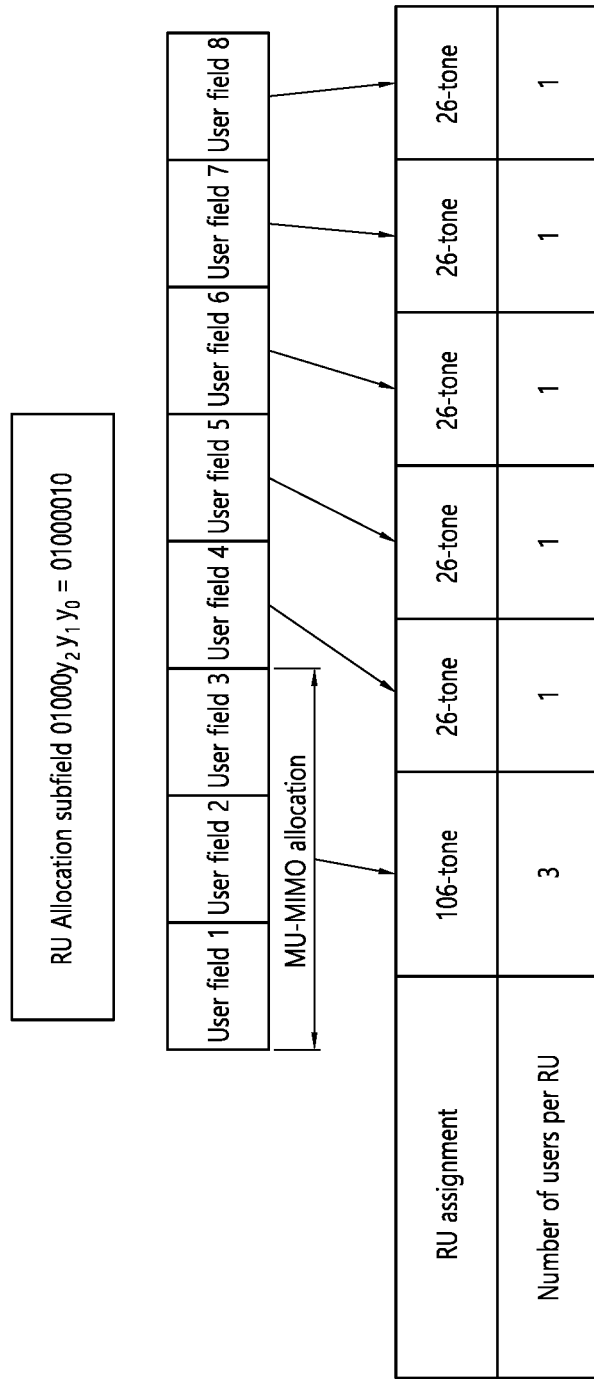
FIG. 9 illustrates an example in which a plurality of user STAs is allocated to the same RU through a MU-MIMO technique.

FIG. 9 illustrates an example in which a plurality of user STAs are allocated to the same RU through a MU-MIMO scheme.

For example, when RU allocation is set to "01000010" as shown in FIG. 9, a 106-RU may be allocated to the leftmost side of a specific channel, and five 26-RUs may be allocated to the right side thereof. In addition, three user STAs may be allocated to the 106-RU through the MU-MIMO scheme. As a result, since eight user STAs are allocated, the user-specific field 830 of HE-SIG-B may include eight user fields.

The eight user fields may be expressed in the order shown in FIG. 9. In addition, as shown in FIG. 8, two user fields may be implemented with one user block field.

The user fields shown in FIG. 8 and FIG. 9 may be configured based on two formats. That is, a user field related to a MU-MIMO scheme may be configured in a first format, and a user field related to a non-MIMO scheme may be configured in a second format. Referring to the example of FIG. 9, a user field 1 to a user field 3 may be based on the first format, and a user field 4 to a user field 8 may be based on the second format.

The first format or the second format may include bit information of the same length (e.g., 21 bits).

Figure 10:
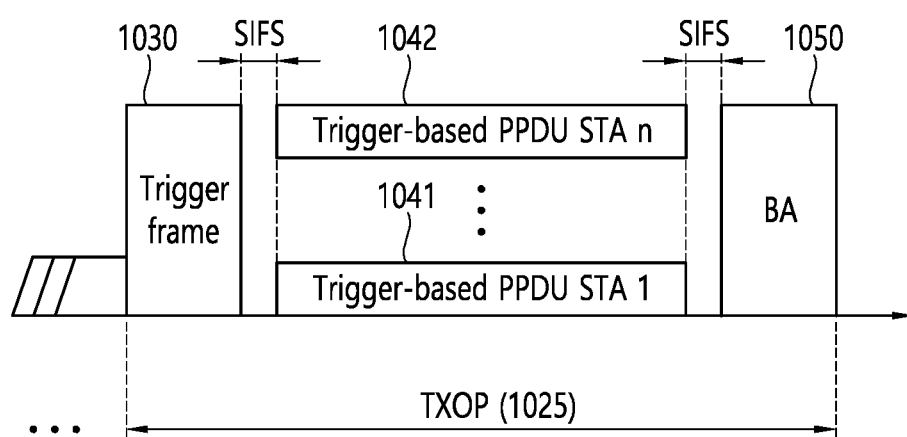
FIG. 10 illustrates a UL-MU operation.

FIG. 10 illustrates an operation based on UL-MU. As illustrated, a transmitting STA (e.g., AP) may perform channel access through contending (e.g., a backoff operation), and may transmit a trigger frame 1030. That is, the transmitting STA may transmit a PPDU including the trigger frame 1030. Upon receiving the PPDU including the trigger frame, a trigger-based (TB) PPDU is transmitted after a delay corresponding to SIFS.

TB PPDUs 1041 and 1042 may be transmitted at the same time period, and may be transmitted from a plurality of STAs (e.g., user STAs) having AIDs indicated in the trigger frame 1030. An ACK frame 1050 for the TB PPDU may be implemented in various forms.

A specific feature of the trigger frame is described with reference to FIG. 11 to FIG. 13. Even if UL-MU communication is used, an orthogonal frequency division multiple access (OFDMA) scheme or a MU MIMO scheme may be used, and the OFDMA and MU-MIMO schemes may be simultaneously used.

Figure 11:
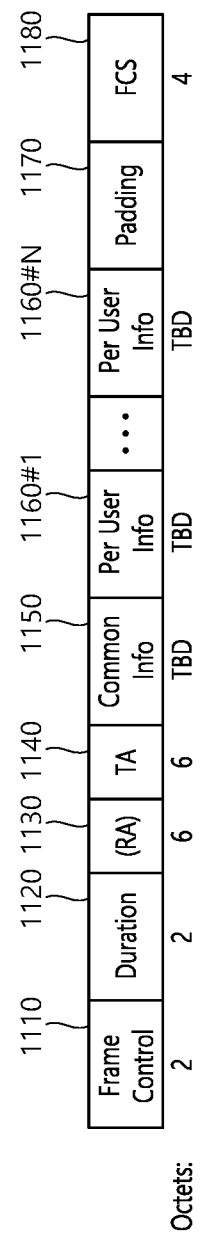
FIG. 11 illustrates an example of a trigger frame.

FIG. 11 illustrates an example of a trigger frame. The trigger frame of FIG. 11 allocates a resource for uplink multiple-user (MU) transmission, and may be transmitted, for example, from an AP. The trigger frame may be configured of a MAC frame, and may be included in a PPDU.

Each field shown in FIG. 11 may be partially omitted, and another field may be added. In addition, a length of each field may be changed to be different from that shown in the figure.

A frame control field 1110 of FIG. 11 may include information related to a MAC protocol version and extra additional control information. A duration field 1120 may include time information for NAV configuration or information related to an identifier (e.g., AID) of an STA.

In addition, an RA field 1130 may include address information of a receiving STA of a corresponding trigger frame, and may be optionally omitted. A TA field 1140 may include address information of an STA (e.g., AP) which transmits the corresponding trigger frame. A common information field 1150 includes common control information applied to the receiving STA which receives the corresponding trigger frame. For example, a field indicating a length of an L-SIG field of an uplink PPDU transmitted in response to the corresponding trigger frame or information for controlling content of an SIG-A field (i.e., HE-SIG-A field) of the uplink PPDU transmitted in response to the corresponding trigger frame may be included. In addition, as common control information, information related to a length of a CP of the uplink PPDU transmitted in response to the corresponding trigger frame or information related to a length of an LTF field may be included.

In addition, per user information fields 1160#1 to 1160#N corresponding to the number of receiving STAs which receive the trigger frame of FIG. 11 are preferably included. The per user information field may also be called an "allocation field".

In addition, the trigger frame of FIG. 11 may include a padding field 1170 and a frame check sequence field 1180.

Each of the per user information fields 1160#1 to 1160#N shown in FIG. 11 may include a plurality of subfields.

Figure 12:
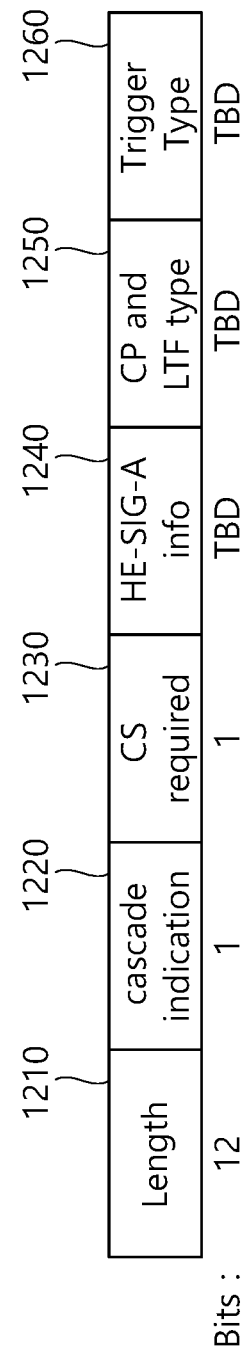
FIG. 12 illustrates an example of a common information field of the trigger frame.

FIG. 12 illustrates an example of a common information field of a trigger frame. A subfield of FIG. 12 may be partially omitted, and an extra subfield may be added. In addition, a length of each subfield illustrated may be changed.

A length field 1210 illustrated has the same value as a length field of an L-SIG field of an uplink PPDU transmitted in response to a corresponding trigger frame, and a length field of the L-SIG field of the uplink PPDU indicates a length of the uplink PPDU. As a result, the length field 1210 of the trigger frame may be used to indicate the length of the corresponding uplink PPDU.

In addition, a cascade identifier field 1220 indicates whether a cascade operation is performed. The cascade operation implies that downlink MU transmission and uplink MU transmission are performed together in the same TXOP. That is, it implies that downlink MU transmission is performed and thereafter uplink MU transmission is performed after a pre-set time (e.g., SIFS). During the cascade operation, only one transmitting device (e.g., AP) may perform downlink communication, and a plurality of transmitting devices (e.g., non-APs) may perform uplink communication.

A CS request field 1230 indicates whether a wireless medium state or an NAV or the like is necessarily considered in a situation where a receiving device which has received a corresponding trigger frame transmits a corresponding uplink PPDU.

An HE-SIG-A information field 1240 may include information for controlling content of an SIG-A field (i.e., HE-SIG-A field) of the uplink PPDU in response to the corresponding trigger frame.

A CP and LTF type field 1250 may include information related to a CP length and LTF length of the uplink PPDU transmitted in response to the corresponding trigger frame. A trigger type field 1260 may indicate a purpose of using the corresponding trigger frame, for example, typical triggering, triggering for beamforming, a request for block ACK/NACK, or the like.

It may be assumed that the trigger type field 1260 of the trigger frame in the present specification indicates a trigger frame of a basic type for typical triggering. For example, the trigger frame of the basic type may be referred to as a basic trigger frame.

Figure 13:
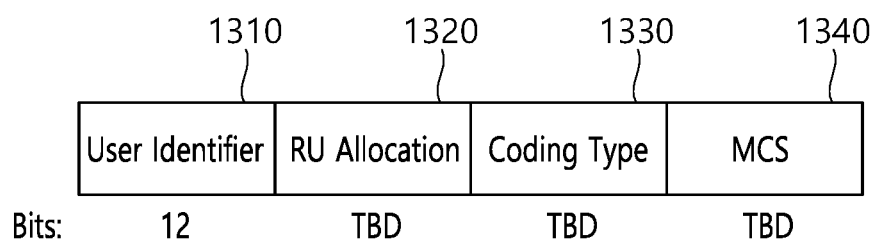
FIG. 13 illustrates an example of a subfield included in a per user information field.

FIG. 13 illustrates an example of a subfield included in a per user information field. A user information field 1300 of FIG. 13 may be understood as any one of the per user information fields 1160#1 to 1160#N mentioned above with reference to FIG. 11. A subfield included in the user information field 1300 of FIG. 13 may be partially omitted, and an extra subfield may be added. In addition, a length of each subfield illustrated may be changed.

A user identifier field 1310 of FIG. 13 indicates an identifier of an STA (i.e., receiving STA) corresponding to per user information. An example of the identifier may be the entirety or part of an association identifier (AID) value of the receiving STA.

In addition, an RU allocation field 1320 may be included. That is, when the receiving STA identified through the user identifier field 1310 transmits a TB PPDU in response to the trigger frame, the TB PPDU is transmitted through an RU indicated by the RU allocation field 1320. In this case, the RU indicated by the RU allocation field 1320 may be an RU shown in FIG. 5, FIG. 6, and FIG. 7.

The subfield of FIG. 13 may include a coding type field 1330. The coding type field 1330 may indicate a coding type of the TB PPDU. For example, when BCC coding is applied to the TB PPDU, the coding type field 1330 may be set to '1', and when LDPC coding is applied, the coding type field 1330 may be set to '0'.

In addition, the subfield of FIG. 13 may include an MCS field 1340. The MCS field 1340 may indicate an MCS scheme applied to the TB PPDU. For example, when BCC coding is applied to the TB PPDU, the coding type field 1330 may be set to '1', and when LDPC coding is applied, the coding type field 1330 may be set to '0'.

Hereinafter, a UL OFDMA-based random access (UORA) scheme will be described.

Figure 14:
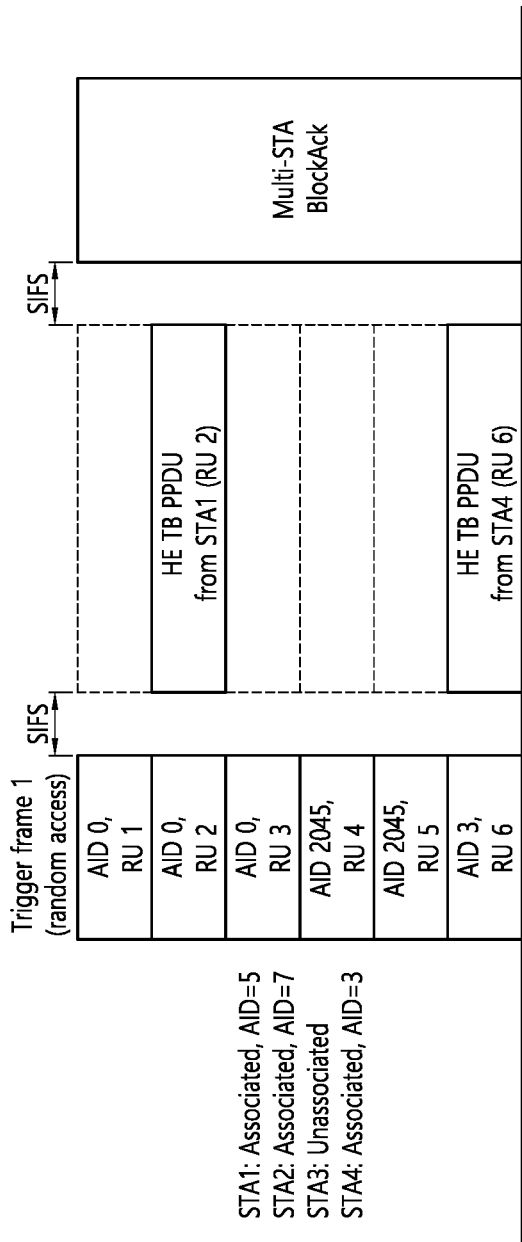
FIG. 14 illustrates technical characteristics of a UROA technique.

FIG. 14 describes a technical feature of the UORA scheme.

A transmitting STA (e.g., AP) may allocate six RU resources through a trigger frame as shown in FIG. 14. Specifically, the AP may allocate a 1st RU resource (AID 0, RU 1), a 2nd RU resource (AID 0, RU 2), a 3rd RU resource (AID 0, RU 3), a 4th RU resource (AID 2045, RU 4), a 5th RU resource (AID 2045, RU 5), and a 6th RU resource (AID 3, RU 6). Information related to the AID 0, AID 3, or AID 2045 may be included, for example, in the user identifier field 1310 of FIG. 13. Information related to the RU 1 to RU 6 may be included, for example, in the RU allocation field 1320 of FIG. 13. AID=0 may imply a UORA resource for an associated STA, and AID=2045 may imply a UORA resource for an un-associated STA. Accordingly, the 1st to 3rd RU resources of FIG. 14 may be used as a UORA resource for the associated STA, the 4th and 5th RU resources of FIG. 14 may be used as a UORA resource for the un-associated STA, and the 6th RU resource of FIG. 14 may be used as a typical resource for UL MU.

In the example of FIG. 14, an OFDMA random access backoff (OBO) of an STA1 is decreased to 0, and the STA1 randomly selects the 2nd RU resource (AID 0, RU 2). In addition, since an OBO counter of an STA2/3 is greater than 0, an uplink resource is not allocated to the STA2/3. In addition, regarding an STA4 in FIG. 14, since an AID (e.g., AID=3) of the STA4 is included in a trigger frame, a resource of the RU 6 is allocated without backoff.

Specifically, since the STA1 of FIG. 14 is an associated STA, the total number of eligible RA RUs for the STA1 is 3 (RU 1, RU 2, and RU 3), and thus the STA1 decreases an OBO counter by 3 so that the OBO counter becomes 0. In addition, since the STA2 of FIG. 14 is an associated STA, the total number of eligible RA RUs for the STA2 is 3 (RU 1, RU 2, and RU 3), and thus the STA2 decreases the OBO counter by 3 but the OBO counter is greater than 0. In addition, since the STA3 of FIG. 14 is an un-associated STA, the total number of eligible RA RUs for the STA3 is 2 (RU 4, RU 5), and thus the STA3 decreases the OBO counter by 2 but the OBO counter is greater than 0.

Figure 15:
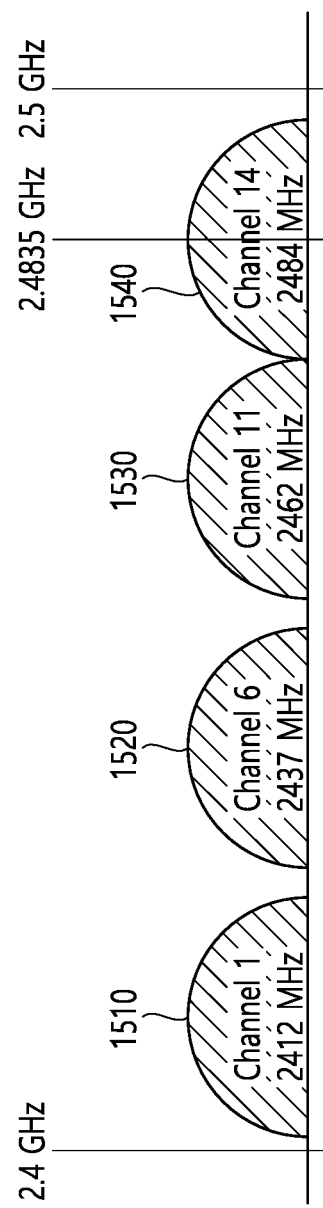
FIG. 15 illustrates an example of a channel used/supported/defined in a 2.4 GHz band.

FIG. 15 illustrates an example of a channel used/supported/defined within a 2.4 GHz band.

The 2.4 GHz band may be called in other terms such as a first band. In addition, the 2.4 GHz band may imply a frequency domain in which channels of which a center frequency is close to 2.4 GHz (e.g., channels of which a center frequency is located within 2.4 to 2.5 GHz) are used/supported/defined.

A plurality of 20 MHz channels may be included in the 2.4 GHz band. 20 MHz within the 2.4 GHz may have a plurality of channel indices (e.g., an index 1 to an index 14). For example, a center frequency of a 20 MHz channel to which a channel index 1 is allocated may be 2.412 GHz, a center frequency of a 20 MHz channel to which a channel index 2 is allocated may be 2.417 GHz, and a center frequency of a 20 MHz channel to which a channel index N is allocated may be (2.407+0.005*N) GHz. The channel index may be called in various terms such as a channel number or the like. Specific numerical values of the channel index and center frequency may be changed.

FIG. 15 exemplifies 4 channels within a 2.4 GHz band. Each of 1st to 4th frequency domains 1510 to 1540 shown herein may include one channel. For example, the 1st frequency domain 1510 may include a channel 1 (a 20 MHz channel having an index 1). In this case, a center frequency of the channel 1 may be set to 2412 MHz. The 2nd frequency domain 1520 may include a channel 6. In this case, a center frequency of the channel 6 may be set to 2437 MHz. The 3rd frequency domain 1530 may include a channel 11. In this case, a center frequency of the channel 11 may be set to 2462 MHz. The 4th frequency domain 1540 may include a channel 14. In this case, a center frequency of the channel 14 may be set to 2484 MHz.

Figure 16:
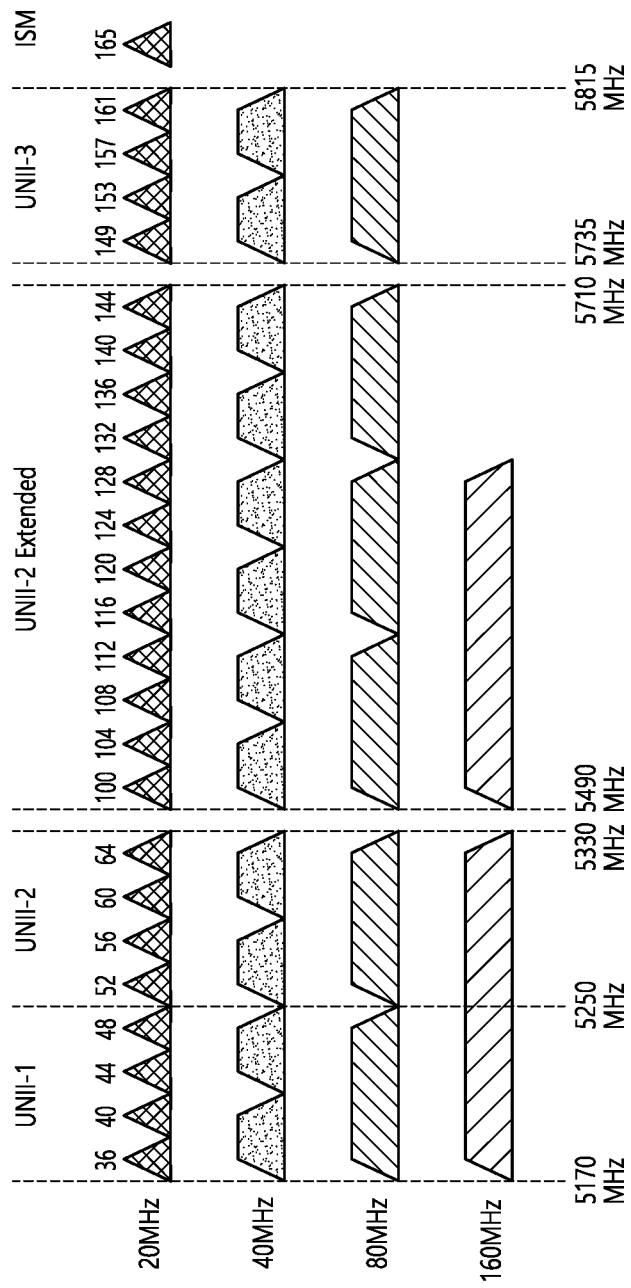
FIG. 16 illustrates an example of a channel used/supported/defined in a 5 GHz band.

FIG. 16 illustrates an example of a channel used/supported/defined within a 5 GHz band.

The 5 GHz band may be called in other terms such as a second band or the like. The 5 GHz band may imply a frequency domain in which channels of which a center frequency is greater than or equal to 5 GHz and less than 6 GHz (or less than 5.9 GHz) are used/supported/defined. Alternatively, the 5 GHz band may include a plurality of channels between 4.5 GHz and 5.5 GHz. A specific numerical value shown in FIG. 16 may be changed.

A plurality of channels within the 5 GHz band include an unlicensed national information infrastructure (UNII)-1, a UNII-2, a UNII-3, and an ISM. The INII-1 may be called UNII Low. The UNII-2 may include a frequency domain called UNII Mid and UNII-2Extended. The UNII-3 may be called UNII-Upper.

A plurality of channels may be configured within the 5 GHz band, and a bandwidth of each channel may be variously set to, for example, 20 MHz, 40 MHz, 80 MHz, 160 MHz, or the like. For example, 5170 MHz to 5330 MHz frequency domains/ranges within the UNII-1 and UNII-2 may be divided into eight 20 MHz channels. The 5170 MHz to 5330 MHz frequency domains/ranges may be divided into four channels through a 40 MHz frequency domain. The 5170 MHz to 5330 MHz frequency domains/ranges may be divided into two channels through an 80 MHz frequency domain. Alternatively, the 5170 MHz to 5330 MHz frequency domains/ranges may be divided into one channel through a 160 MHz frequency domain.

Figure 17:
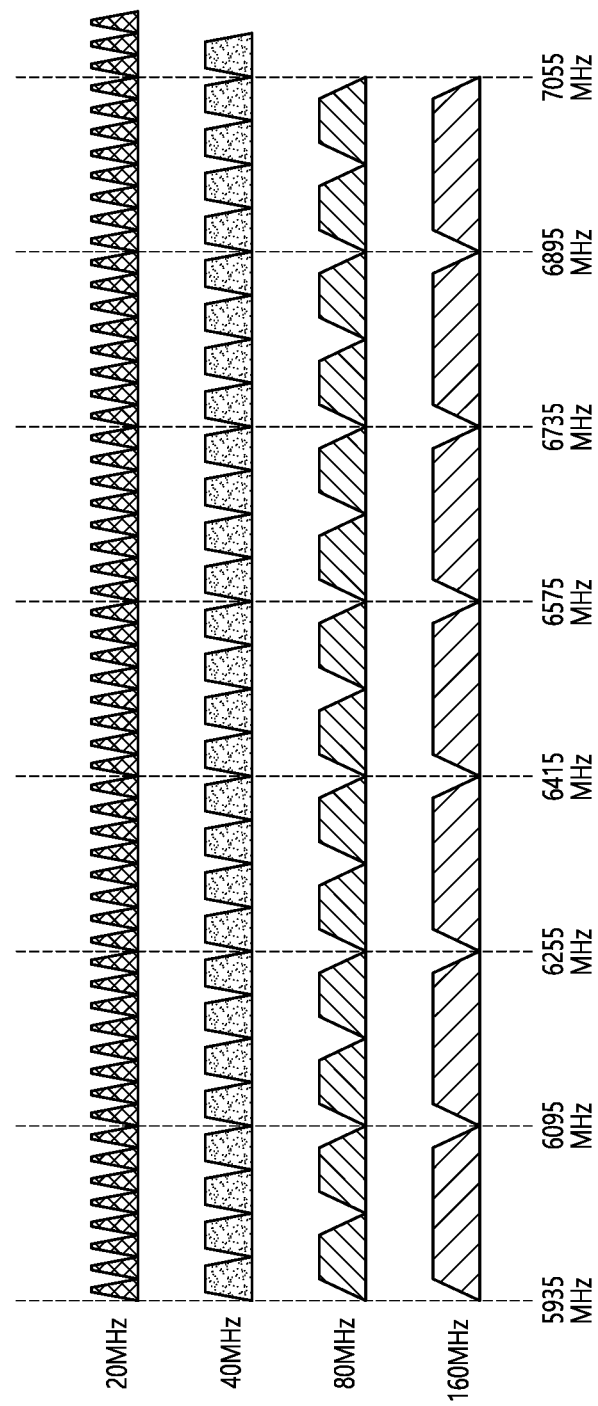
FIG. 17 illustrates an example of a channel used/supported/defined in a 6 GHz band.

FIG. 17 illustrates an example of a channel used/supported/defined within a 6 GHz band.

The 6 GHz band may be called in other terms such as a third band or the like. The 6 GHz band may imply a frequency domain in which channels of which a center frequency is greater than or equal to 5.9 GHz are used/supported/defined. A specific numerical value shown in FIG. 17 may be changed.

For example, the 20 MHz channel of FIG. 17 may be defined starting from 5.940 GHz. Specifically, among 20 MHz channels of FIG. 17, the leftmost channel may have an index 1 (or a channel index, a channel number, etc.), and 5.945 GHz may be assigned as a center frequency. That is, a center frequency of a channel of an index N may be determined as (5.940+0.005*N)GHz.

Accordingly, an index (or channel number) of the 2 MHz channel of FIG. 17 may be 1, 5, 9, 13, 17, 21, 25, 29, 33, 37, 41, 45, 49, 53, 57, 61, 65, 69, 73, 77, 81, 85, 89, 93, 97, 101, 105, 109, 113, 117, 121, 125, 129, 133, 137, 141, 145, 149, 153, 157, 161, 165, 169, 173, 177, 181, 185, 189, 193, 197, 201, 205, 209, 213, 217, 221, 225, 229, 233. In addition, according to the aforementioned (5.940+0.005*N)GHz rule, an index of the 40 MHz channel of FIG. 17 may be 3, 11, 19, 27, 35, 43, 51, 59, 67, 75, 83, 91, 99, 107, 115, 123, 131, 139, 147, 155, 163, 171, 179, 187, 195, 203, 211, 219, 227.

Although 20, 40, 80, and 160 MHz channels are illustrated in the example of FIG. 17, a 240 MHz channel or a 320 MHz channel may be additionally added.

Hereinafter, a PPDU transmitted/received in an STA of the present specification will be described.

Figure 18:
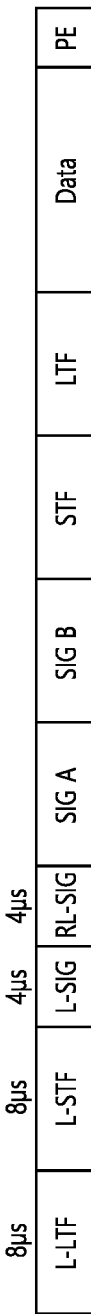
FIG. 18 illustrates an example of a PPDU used in the present disclosure.

FIG. 18 illustrates an example of a PPDU used in the present specification.

The PPDU depicted in FIG. 18 may be referred to as various terms such as an EHT PPDU, a TX PPDU, an RX PPDU, a first type or N-th type PPDU, or the like. In addition, the EHT PPDU may be used in an EHT system and/or a new WLAN system enhanced from the EHT system.

The subfields depicted in FIG. 18 may be referred to as various terms. For example, a SIG A field may be referred to an EHT-SIG-A field, a SIG B field may be referred to an EHT-SIG-B, a STF field may be referred to an EHT-STF field, and an LTF field may be referred to an EHT-LTF.

The subcarrier spacing of the L-LTF, L-STF, L-SIG, and RL-SIG fields of FIG. 18 can be set to 312.5 kHz, and the subcarrier spacing of the STF, LTF, and Data fields of FIG. 18 can be set to 78.125 kHz. That is, the subcarrier index of the L-LTF, L-STF, L-SIG, and RL-SIG fields can be expressed in unit of 312.5 kHz, and the subcarrier index of the STF, LTF, and Data fields can be expressed in unit of 78.125 kHz.

The SIG A and/or SIG B fields of FIG. 18 may include additional fields (e.g., a SIG C field or one control symbol, etc.). The subcarrier spacing of all or part of the SIG A and SIG B fields may be set to 312.5 kHz, and the subcarrier spacing of the remaining part/fields may be set to 78.125 kHz.

In the PPDU of FIG. 18, the L-LTF and the L-STF may be the same as conventional L-LTF and L-STF fields.

The L-SIG field of FIG. 18 may include, for example, bit information of 24 bits. For example, the 24-bit information may include a rate field of 4 bits, a reserved bit of 1 bit, a length field of 12 bits, a parity bit of 1 bit, and a tail bit of 6 bits. For example, the length field of 12 bits may include information related to the number of octets of a corresponding Physical Service Data Unit (PSDU). For example, the length field of 12 bits may be determined based on a type of the PPDU. For example, when the PPDU is a non-HT, HT, VHT PPDU or an EHT PPDU, a value of the length field may be determined as a multiple of 3. For example, when the PPDU is an HE PPDU, the value of the length field may be determined as "a multiple of 3"+1 or "a multiple of 3"+2. In other words, for the non-HT, HT, VHT PPDI or the EHT PPDU, the value of the length field may be determined as a multiple of 3, and for the HE PPDU, the value of the length field may be determined as "a multiple of 3"+1 or "a multiple of 3"+2.

For example, the transmitting STA may apply BCC encoding based on a ½ coding rate to the 24-bit information of the L-SIG field. Thereafter, the transmitting STA may obtain a BCC coding bit of 48 bits. BPSK modulation may be applied to the 48-bit coding bit, thereby generating 48 BPSK symbols. The transmitting STA may map the 48 BPSK symbols to positions except for a pilot subcarrier {subcarrier index −21, −7, +7, +21} and a DC subcarrier {subcarrier index 0}. As a result, the 48 BPSK symbols may be mapped to subcarrier indices −26 to −22, −20 to −8, −6 to −1, +1 to +6, +8 to +20, and +22 to +26. The transmitting STA may additionally map a signal of {−1, −1, −1, 1} to a subcarrier index {−28, −27, +27, +28}. The aforementioned signal may be used for channel estimation on a frequency domain corresponding to {−28, −27, +27, +28}.

The transmitting STA may generate an RL-SIG which is identical to the L-SIG. BPSK modulation may be applied to the RL-SIG. The receiving STA may figure out that the RX PPDU is the HE PPDU or the EHT PPDU, based on the presence of the RL-SIG.

After the RL-SIG of FIG. 18, for example, EHT-SIG-A or one control symbol may be inserted. A symbol contiguous to the RL-SIG (i.e., EHT-SIG-A or one control symbol) may include 26 bit information and may further include information for identifying the type of the EHT PPDU. For example, when the EHT PPDU is classified into various types (e.g., an EHT PPDU supporting an SU mode, an EHT PPDU supporting a MU mode, an EHT PPDU related to the Trigger Frame, an EHT PPDU related to an Extended Range transmission, etc.), Information related to the type of the EHT PPDU may be included in a symbol contiguous to the RL-SIG.

A symbol contiguous to the RL-SIG may include, for example, information related to the length of the TXOP and information related to the BSS color ID. For example, the SIG-A field may be contiguous to the symbol contiguous to the RL-SIG (e.g., one control symbol). Alternatively, a symbol contiguous to the RL-SIG may be the SIG-A field.

For example, the SIG-A field may include 1) a DL/UL indicator, 2) a BSS color field which is an identifier of a BSS, 3) a field including information related to the remaining time of a current TXOP section, 4) a bandwidth field including information related to the bandwidth, 5) a field including information related to an MCS scheme applied to an HE-SIG B, 6) a field including information related to whether a dual subcarrier modulation (DCM) scheme is applied to the HE-SIG B, 7) a field including information related to the number of symbols used for the HE-SIG B, 8) a field including information related to whether the HE-SIG B is generated over the entire band, 9) a field including information related to the type of the LTF/STF, 10) a field indicating the length of the HE-LTF and a CP length.

An STF of FIG. 18 may be used to improve automatic gain control estimation in a multiple input multiple output (MIMO) environment or an OFDMA environment. An LTF of FIG. 18 may be used to estimate a channel in the MIMO environment or the OFDMA environment.

The EHT-STF of FIG. 18 may be set in various types. For example, a first type of STF (e.g., 1×STF) may be generated based on a first type STF sequence in which a non-zero coefficient is arranged with an interval of 16 subcarriers. An STF signal generated based on the first type STF sequence may have a period of 0.8 µs, and a periodicity signal of 0.8 µs may be repeated 5 times to become a first type STF having a length of 4 µs. For example, a second type of STF (e.g., 2×STF) may be generated based on a second type STF sequence in which a non-zero coefficient is arranged with an interval of 8 subcarriers. An STF signal generated based on the second type STF sequence may have a period of 1.6 µs, and a periodicity signal of 1.6 µs may be repeated 5 times to become a second type STF having a length of 8 µs. For example, a third type of STF (e.g., 4×STF) may be generated based on a third type STF sequence in which a non-zero coefficient is arranged with an interval of 4 subcarriers. An STF signal generated based on the third type STF sequence may have a period of 3.2 µs, and a periodicity signal of 3.2 µs may be repeated 5 times to become a second type STF having a length of 16 µs. Only some of the first to third type EHT-STF sequences may be used. In addition, the EHT-LTF field may also have first, second, and third types (ie, 1×, 2×, 4×LTF). For example, the first/second/third type LTF field may be generated based on an LTF sequence in which a non-zero coefficient is arranged with an interval of 4/2/1 subcarriers. The first/second/third type LTF may have a time length of 3.2/6.4/12.8 µs. In addition, Guard Intervals (GIs) with various lengths (e.g., 0.8/1/6/3.2 µs) may be applied to the first/second/third type LTF.

Information related to the type of STF and/or LTF (including information related to GI applied to the LTF) may be included in the SIG A field and/or the SIG B field of FIG. 18.

The PPDU of FIG. 18 may be identified as an EHT PPDU based on the following method.

A receiving STA may determine a type of an RX PPDU as the EHT PPDU, based on the following aspect. For example, the RX PPDU may be determined as the EHT PPDU: 1) when a first symbol after an L-LTF signal of the RX PPDU is a BPSK symbol; 2) when RL-SIG in which the L-SIG of the RX PPDU is repeated is detected; and 3) when a result of applying "modulo 3" to a value of a length field of the L-SIG of the RX PPDU is detected as "0". When the RX PPDU is determined as the EHT PPDU, the receiving STA may detect a type of the EHT PPDU (e.g., an SU/MU/Trigger-based/Extended Range type), based on bit information included in a symbol after the RL-SIG of FIG. 18. In other words, the receiving STA may determine the RX PPDU as the EHT PPDU, based on: 1) a first symbol after an L-LTF signal, which is a BPSK symbol; 2) RL-SIG contiguous to the L-SIG field and identical to L-SIG; and 3) L-SIG including a length field in which a result of applying "modulo 3" is set to "0".

For example, the receiving STA may determine the type of the RX PPDU as the EHT PPDU, based on the following aspect. For example, the RX PPDU may be determined as the HE PPDU: 1) when a first symbol after an L-LTF signal is a BPSK symbol; 2) when RL-SIG in which the L-SIG is repeated is detected; and 3) when a result of applying "modulo 3" to a value of a length field of the L-SIG is detected as "1" or "2".

For example, the receiving STA may determine the type of the RX PPDU as a non-HT, HT, and VHT PPDU, based on the following aspect. For example, there may be cases where: 1) a first symbol after an L-LTF signal is a BPSK symbol; 2) RL-SIG in which L-SIG is repeated is not detected; and 3) the receiving STA determines that it is not 802.11ax and thus operates as a state machine for determining the legacy STA, and determines constellation of two symbols received after the L-SIG. In these cases, the RX PPDU may be determined as the non-HT, HT, and VHT PPDU.

1. STF Sequence (or STF Signal)

An HE-STF field mainly aims to improve automatic gain control estimation in MIMO transmission.

Figure 19:
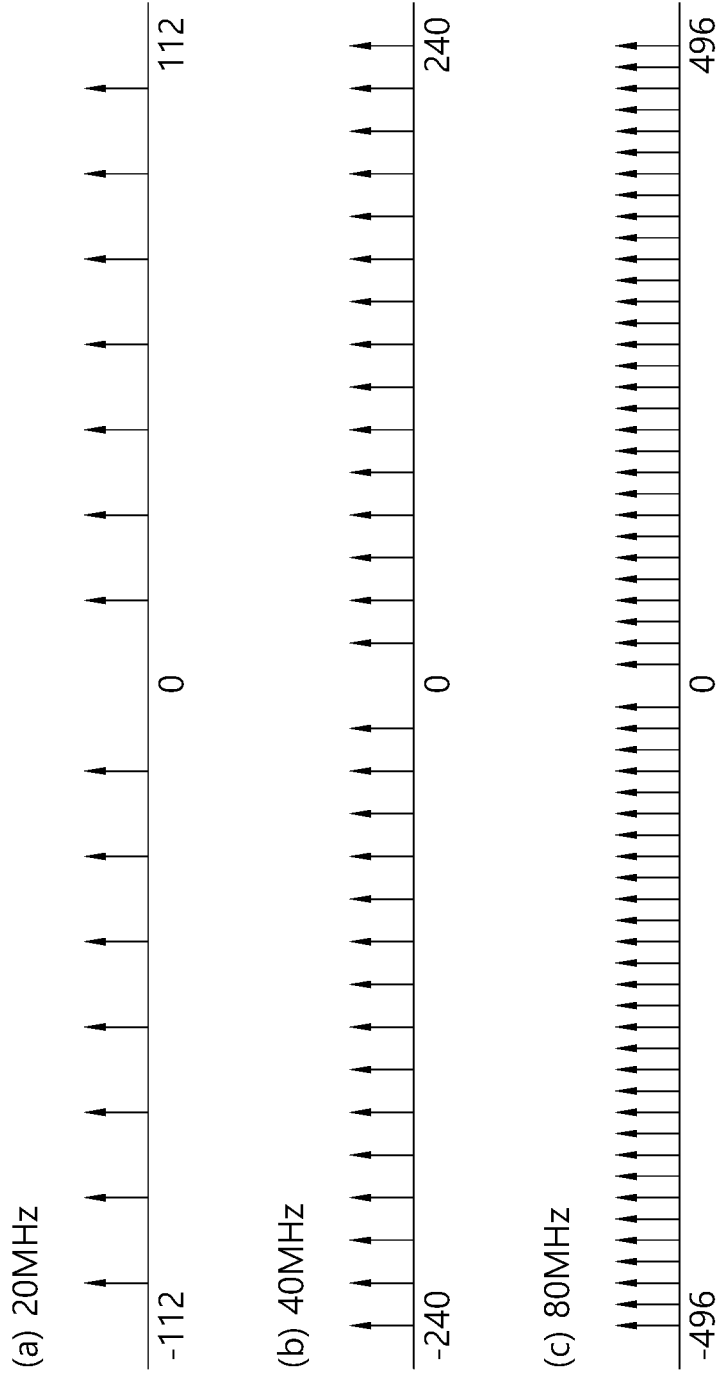
FIG. 19 shows a 1×HE-STF tone in PPDU transmission for each channel according to the present embodiment.

FIG. 19 shows a 1×HE-STF tone in PPDU transmission for each channel according to the present embodiment. More specifically, an HE-STF tone (i.e., 16-tone sampling) having a periodicity of 0.8 µs in a 20 MHz/40 MHz/80 MHz bandwidth is shown for example in FIG. 19. Therefore, in FIG. 19, HE-STF tones for respective bandwidths (or channels) may be located with an interval of 16 tones.

In FIG. 19, an x-axis represents a frequency domain. A numerical value on the x-axis indicates a tone index, and an arrow indicates that a non-zero value is mapped to the tone index.

A sub-figure (a) of FIG. 19 shows an example of a 1×HE-STF tone in 20 MHz PPDU transmission.

Referring to the sub-figure (a), when an HE-STF sequence (i.e., 1×HE-STF sequence) for a periodicity of 0.8 µs is mapped to tones of a 20 MHz channel, the 1×HE-STF sequence may be mapped to a tone having a tone index which is a multiple of 16, except for DC, among tones having a tone index from −112 to 112, and 0 may be mapped to the remaining tones. That is, in the 20 MHz channel, the 1×HE-STF tone may be located at a tone index which is a multiple of 16, except for DC, among the tones having the tone index from −112 to 112. Therefore, the total number of 1×HE-STF tones to which the 1×HE-STF sequence is mapped may be 14 in the 20 MHz channel.

A sub-figure (b) shows an example of a 1×HE-STF tone in 40 MHz PPDU transmission.

Referring to the sub-figure (b), when an HE-STF sequence (i.e., 1×HE-STF sequence) for a periodicity of 0.8 µs is mapped to tones of a 40 MHz channel, the 1×HE-STF sequence may be mapped to a tone having a tone index which is a multiple of 16, except for DC, among tones having a tone index from −240 to 240, and 0 may be mapped to the remaining tones. That is, in the 40 MHz channel, the 1×HE-STF tone may be located at a tone index which is a multiple of 16, except for DC, among the tones having the tone index from −240 to 240. Therefore, the total number of 1×HE-STF tones to which the 1×HE-STF sequence is mapped may be 30 in the 40 MHz channel.

A sub-figure (c) shows an example of a 1×HE-STF tone in 80 MHz PPDU transmission.

Referring to the sub-figure (c), when an HE-STF sequence (i.e., 1×HE-STF sequence) for a periodicity of 0.8 µs is mapped to tones of an 80 MHz channel, the 1×HE-STF sequence may be mapped to a tone having a tone index which is a multiple of 16, except for DC, among tones having a tone index from −496 to 496, and 0 may be mapped to the remaining tones. That is, in the 80 MHz channel, the 1×HE-STF tone may be located at a tone index which is a multiple of 16, except for DC, among the tones having the tone index from −496 to 496. Therefore, the total number of 1×HE-STF tones to which the 1×HE-STF sequence is mapped may be 62 in the 80 MHz channel.

Figure 20:
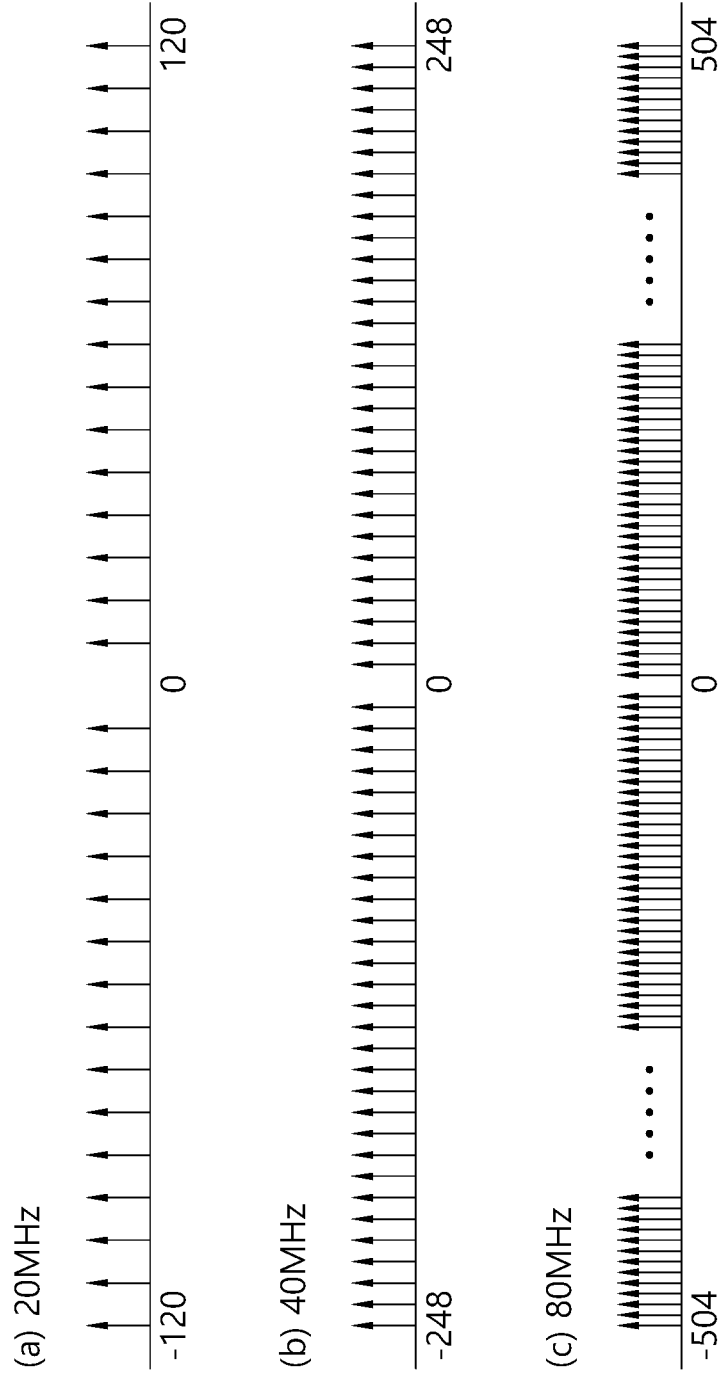
FIG. 20 shows a 2×HE-STF tone in PPDU transmission for each channel according to the present embodiment.

FIG. 20 shows a 2×HE-STF tone in PPDU transmission for each channel according to the present embodiment. More specifically, an HE-STF tone (i.e., 8-tone sampling) having a periodicity of 1.6 µs in a 20 MHz/40 MHz/80 MHz bandwidth is shown for example in FIG. 20. Therefore, in FIG. 20, HE-STF tones for respective bandwidths (or channels) may be located with an interval of 8 tones.

The 2×HE-STF signal according to FIG. 20 may be applied to an uplink MU PPDU. That is, the 2×HE-STF signal shown in FIG. 20 may be included in a PPDU transmitted through uplink in response to the aforementioned trigger frame.

In FIG. 20, an x-axis represents a frequency domain. A numerical value on the x-axis indicates a tone index, and an arrow indicates that a non-zero value is mapped to the tone index.

A sub-figure (a) of FIG. 20 shows an example of a 2×HE-STF tone in 20 MHz PPDU transmission.

Referring to the sub-figure (a), when an HE-STF sequence (i.e., 2×HE-STF sequence) for a periodicity of 1.6 µs is mapped to tones of a 20 MHz channel, the 2×HE-STF sequence may be mapped to a tone having a tone index which is a multiple of 8, except for DC, among tones having a tone index from −120 to 120, and 0 may be mapped to the remaining tones. That is, in the 20 MHz channel, the 2×HE-STF tone may be located at a tone index which is a multiple of 8, except for DC, among the tones having the tone index from −120 to 120. Therefore, the total number of 2×HE-STF tones to which the 2×HE-STF sequence is mapped may be 30 in the 20 MHz channel.

A sub-figure (b) shows an example of a 2×HE-STF tone in 40 MHz PPDU transmission.

Referring to the sub-figure (b), when an HE-STF sequence (i.e., 2×HE-STF sequence) for a periodicity of 1.6 μs is mapped to tones of a 40 MHz channel, the 2×HE-STF sequence may be mapped to a tone having a tone index which is a multiple of 8, except for DC, among tones having a tone index from −248 to 248, and 0 may be mapped to the remaining tones. That is, in the 40 MHz channel, the 2×HE-STF tone may be located at a tone index which is a multiple of 8, except for DC, among the tones having the tone index from −248 to 248. Herein, however, tones having the tone index of ±248 correspond to guard tones (left and right guard tones), and may be nulled (i.e., may have a zero value). Therefore, the total number of 2×HE-STF tones to which the 2×HE-STF sequence is mapped may be 60 in the 40 MHz channel.

A sub-figure (c) shows an example of a 2×HE-STF tone in 80 MHz PPDU transmission.

Referring to the sub-figure (c), when an HE-STF sequence (i.e., 2×HE-STF sequence) for a periodicity of 1.6 μs is mapped to tones of an 80 MHz channel, the 2×HE-STF sequence may be mapped to a tone having a tone index which is a multiple of 8, except for DC, among tones having a tone index from −504 to 504, and 0 may be mapped to the remaining tones. That is, in the 80 MHz channel, the 2×HE-STF tone may be located at a tone index which is a multiple of 8, except for DC, among the tones having the tone index from −504 to 504. Herein, however, tones having the tone index of ±504 correspond to guard tones (left and right guard tones), and may be nulled (i.e., may have a zero value). Therefore, the total number of 2×HE-STF tones to which the 2×HE-STF sequence is mapped may be 124 in the 80 MHz channel.

The 1×HE-STF of FIG. 19 may be used to configure an HE-STF field not for the HE TB PPDU but for the HE PPDU. The 2×HE-STF sequence of FIG. 20 may be used to configure an HE-STF field for the HE TB PPDU.

Hereinafter, a sequence applicable to a 1×HE-STF tone (i.e., sampling with an interval of 16 tones) and a sequence applicable to a 2×HE-STF tones (i.e., sampling with an interval of 8 tones) are proposed. Specifically, a sequence structure with excellent scalability is proposed by using a nested structure in which a basic sequence is set and the basic sequence is included as part of a new sequence. An M-sequence used in the following example is preferably a sequence having a length of 15. The M-sequence is preferably configured of a binary sequence to reduce the complexity during decoding.

First, the M-sequence used to configure the HE-STF field is defined as follows.

$$M = \{-1, -1, -1, 1, 1, -1, 1, 1, 1, -1, 1, 1, -1, 1\}$$

The HE-STF field may be configured by mapping each 242-tone RU to the M sequence multiplied by $(1+j)/\text{sqrt}(2)$ or $(-1-j)/\text{sqrt}(2)$. For a transmission bandwidth greater than 40 MHz, $(1+j)/\text{sqrt}(2)$ or $(-1-j)/\text{sqrt}(2)$ may be assigned to a subcarrier index in a center 26-tone RU.

For 20 MHz/40 MHz/80 MHz/160 MHz/80+80 MHz transmission, a frequency domain sequence for an HE PPDU, not an HE TB PPDU, is given as follows.

For a 20 MHz transmission, the frequency domain sequence for HE PPDUs that are not HE TB PPDUs is given by Equation (27-23).

$$HES_{-112:16:112} = \{M\} \cdot (1+j)/\sqrt{2} \qquad (27\text{-}23)$$

The value of the HE-STF sequence at null torte index 0 is
$$HES_0 = 0$$
where $HES_{a:b:c}$ means coefficients of the HE-STF on every $b$ subcarrier indices from $a$ to $c$ subcarrier indices and coefficients on other subcarrier indices are set to zero.

For a 40 MHz transmission, the frequency domain sequence for HE PPDUs that are not HE TB PPDUs is given by Equation (27-24).

$$HES_{-240:16:240} = \{M, 0, -M\} \cdot (1+j)/\sqrt{2} \qquad (27\text{-}24)$$

For an 80 MHz transmission, the frequency domain sequence for HE PPDUs that are not HE TB PPDUs is given by Equation (2:7-25).

$$HES_{-496:16:496} = \{M, 1, -M, 0, -M, 1, -M\} \cdot (1+j)/\sqrt{2} \qquad (27\text{-}25)$$

For a 160 MHz transmission, the frequency domain sequence for HE PPDUs that are not HE TB PPDUs is given by Equation (27-26).

$$HES_{-1008:16:1008} = \{M, 1, -M, 0, -M, 1, -M, 0, -M,\\ -1, M, 0, -M, 1, -M\} \cdot (1+j)/\sqrt{2} \qquad (27\text{-}26)$$

For an 80+80 MHz transmission, the lower 80 MHz segment for HE PPDUs that are not HE TB PPDUs shall use the HE-STF pattern for the 80 MHz defined in Equation (27-25). For an 80+80 MHz transmission, the frequency domain sequence of the upper 80 MHz segment for HE PPDUs that are not HE TB PPDUs is given by Equation (27-27).

$$HES_{-496:16:496} = \{-M, -1, M, 0, -M, 1, -M\} \cdot (1+j)/\sqrt{2} \qquad (27\text{-}27)$$

For 20 MHz/40 MHz/80 MHz/160 MHz/80+80 MHz transmission, a frequency domain sequence for an HE TB PPDU and an HE TB feedback null data packet (NDP) is given as follows.

For a 20 MHz transmission, the frequency domain sequence for HE TB PPDUs is given by Equation (27-28).

$$HES_{-120:8:120} = \{M, 0, -M\} \cdot (1+j)/\sqrt{2} \qquad (27\text{-}28)$$

For an HE TB feedback NDP in 20 MHz channel width, the frequency domain sequence is given by Equation (27-29), $$HES_{-120:8:120}^{TB\ NDP} = HES_{-120:8:120} \qquad (27\text{-}29)$$

For a 40 MHz transmission, the frequency domain sequence for HE TB PPDUs is given by Equation (27-30), $$HES_{-248:8:248} = \{M, -1, -M, 0, M, -1, M\} \cdot (1+j)/\sqrt{2} \qquad (27\text{-}30)$$

The value of the HE-STF sequence at edge zone indices ±248 is $HES_{\pm 248} = 0$ For an HE TB feedback NDP in 40 MHz channel width, the frequency domain sequence is given by Equation (27-31).

$$HES_{-248:8:-8}^{TB\ NDP} = \{M, -1, -M\} \cdot (1+j)/\sqrt{2}, \text{ if}\\ RU\_TONE\_SET\_INDEX \leq 18$$

$$HES_{8:8:248}^{TB\ NDP} = \{M, -1, M\} \cdot (1+j)/\sqrt{2}, \text{ if } RU\_TONE\_SET\_INDEX > 18$$

$$HES_{248}^{TB\ NDP} = 0 \qquad (27\text{-}31)$$

For an 80 MHz transmission, the frequency domain sequence for HE TB PPDUS is given by Equation (27-32).

$$HES_{-504:8:504} = \{M, -1, M, -1, -M, -1, M, 0, -M, 1,\\ M, 1, -M, 1, -M\} \cdot (1+j)/\sqrt{2} \qquad (27\text{-}32)$$

The value of the HE-STF sequence at edge tone indices ±504 is $HES_{\pm 504} = 0$ For an HE TB feedback NDP in 80 MHz channel width, the frequency domain sequence is given by Equation (27-33).

$HES_{-504:8:-264}^{TB\ NDP} = \{M, -1, M\} \cdot (1+j)/\sqrt{2}$, if
  RU_TONE_SET_INDEX≤18

$HES_{-248:8:-8}^{TB\ NDP} = \{-M, -1, M\} \cdot (1+j)/\sqrt{2}$, if
  18<RU_TONE_SET_INDEX≤36

$HES_{-8:8:248}^{TB\ NDP} = \{-M, 1, M\} \cdot (1+j)/\sqrt{2}$, if
  36<RU_TONE_SET_INDEX≤54

$HES_{-264:8:504}^{TB\ NDP} = \{-M, 1, -M\} \cdot (1+j)/\sqrt{2}$, if
  54<RU_TONE_SET_INDEX≤72

$HES_{\pm504}^{TB\ NDP} = 0$  (27-33)

For a 160 MHz transmission, the frequency domain sequence for HE TB PPDUs is given by Equation (27-34).

$HES_{-1016:8:1016} = \{M, -1, M, -1, -M, -1, M, 0, -M,$
  $1, M, 1, -M, 1, -M, 0-M, 1, -M, 1, M, 1, -M,$
  $0, -M, 1, M, 1, -M, 1, -M\} \cdot (1+j)/\sqrt{2}$   (27-34)

The value of the HE-STF sequence at edge tone indices ±8 and ±10116 is $HES_{\pm8} = 0$, $HES_{\pm1016} = 0$ For an HE TB feedback NDP in 160 MHz channel width, the frequency domain sequence is given by Equation (27-35).

$HES_{-1016:8:-776}^{TB\ NDP} = \{M, -1, M\} \cdot (1+j)/\sqrt{2}$, if
  RU_TONE_SET_INDEX≤18

$HES_{-760:8:-520}^{TB\ NDP} = \{-M, -1, M\} \cdot (1+j)/\sqrt{2}$, if
  18<RU_TONE_SET_INDEX≤36

$HES_{-504:8:-264}^{TB\ NDP} = \{-M, 1, M\} \cdot (1+j)/\sqrt{2}$, if
  36<RU_TONE_SET_INDEX≤54

$HES_{-248:8:-8}^{TB\ NDP} = \{-M, 1, -M\} \cdot (1+j)/\sqrt{2}$, if
  54<RU_TONE_SET_INDEX≤72

$HES_{8:8:248}^{TB\ NDP} = \{-M, 1, -M\} \cdot (1+j)/\sqrt{2}$, if
  72<RU_TONE_SET_INDEX≤90

$HES_{264:8:504}^{TB\ NDP} = \{M, 1, -M\} \cdot (1+j)/\sqrt{2}$, if
  90<RU_TONE_SET_INDEX≤108

$HES_{520:8:760}^{TB\ NDP} = \{-M, 1, M\} \cdot (1+j)/\sqrt{2}$, if
  108<RU_TONE_SET_INDEX≤126

$HES_{776:8:1016}^{TB\ NDP} = \{-M, 1, -M\} \cdot (1+j)/\sqrt{2}$, if
  126<RU_TONE_SET_INDEX≤144

$HES_{1:8}^{TB\ NDP} = HES_{\pm1016}^{TB\ NDP} = 0$  (27-35)

For an 80+80 MHz transmission, the lower 80 MHz segment for HE TB PPDUs shall use the HE-STF pattern for the 80 MHz defined in Equation (27-32).

For an 80+80 MHz transmission, the frequency domain sequence of the upper 80 MHz segment for HE TB PPDUs is given by Equation (27-36).

$HES_{-504:8:504} = \{-M, 1, -M, 1, M, 1, -M, 0, -M, 1,$
  $M, 1, -M, 1, -M\} \cdot (1+j)/\sqrt{2}$   (27-36)

The value of the HE-STF sequence at edge tone indices ±504 is $HES_{\pm504} = 0$ For an HE TB feedback NDP in the lower 80 MHz segment of an 80+80 MHz channel frequency domain sequence is given by Equation (27-33).

For an HE TB feedback NDP in the upper 80 MHz segment of an 80±80 M channel width, the frequency domain sequence is given by Equation (27-37).

$HES_{-504:8:-264}^{TB\ NDP} = \{-M, 1, -M\} \cdot (1+j)/\sqrt{2}$, if
  RU_TONE_SET_INDEX≤90

$HES_{-248:8:-8}^{TB\ NDP} = \{M, 1, -M\} \cdot (1+j)/\sqrt{2}$, if
  90<RU_TONE_SET_INDEX≤108

$HES_{8:8:248}^{TB\ NDP} = \{-M, 1, M\} \cdot (1+j)/\sqrt{2}$, if
  108<RU_TONE_SET_INDEX≤126

$HES_{264:8:504}^{TB\ NDP} = \{-M, 1, -M\} \cdot (1+j)/\sqrt{2}$, if
  126<RU_TONE_SET_INDEX≤144

$HES_{\pm504}^{TB\ NDP} = 0$  (27-37)

2. Proposal of Tone Plan in EHT WLAN System

In the existing 11ax, a tone plan for full band and OFDMA transmission at 20/40/80/80+80/160 MHz is designed, and a 160 MHz tone plan is used by simply repeating the existing 80 MHz tone plan twice. This is designed in consideration of a case where transmission is performed by taking two RFs into account, and may be a reasonable tone plan in case of non-contiguous 80+80 MHz. However, a situation where transmission is performed by using one RF may be considered in case of contiguous 160 MHz. In this case, since there are many subcarriers wasted in the existing tone plan, a new tone plan may be proposed to increase efficiency and throughput of a subcarrier in use.

2.1. New 160 MHz Tone Plan

<Full Band>

In case of transmission using a full band, a new resource unit (RU) may be proposed, and a size of the new RU may be determined by considering various DC tones according to an effect of a DC offset and by considering the existing 11ax 160 MHz guard tone. The existing 11ax guard tone consists of left 12 tones and right 11 tones, and the number of DC tones of 80 MHz is 5 or 7. When this is directly considered, the new RU of the full band is 2020RU or 2018RU.

12/11 guard tone, 5DC, 2020RU

12/11 guard tone, 7DC, 2018RU

In 160 MHz, considering the effect of the DC offset, it is not preferable that the number of DC tones in use is less than 5/7 which is less than the number of DC tones used in the existing 80 MHz. In addition, 5/7DC may be sufficient in terms of performance. Considering the following OFDMA tone plan, up to 7DC may be suitable. In the following OFDMA tone plan, DC is designed by considering 7DC and 5DC in the existing 80 MHz OFDMA tone plan, and it is not preferable that the number of DC tones is less than that. 5 or 7DC may be sufficient in terms of performance. 7DC is used in 20 MHz and 80 MHz which is a case where a center 26RU (13+13RU) is used in the existing 11ax.

<OFDMA Tone Plan>

The OFDMA tone plan can be expressed using the existing 996RU and 26RU (13+13RU) as follows. Hereinafter, G denotes a guard tone and N denotes a null tone.

12G+996RU+13RU+7DC+13RU+996RU+11G

12G+996RU+1N+13RU+5DC+13RU+1N+996RU+11G

The number of DC tones and the number of null subcarriers at both sides may be determined by a DC offset of the center 26RU (13+13 RU) and performance based on an effect of interference. Considering the effect of interference, it may be preferably configured of 5DC and 1 null carrier at both sides.

The following two configurations are proposed as a 996RU configuration.

996RU=484RU+1N+26RU+1N+484RU

996RU=1N+484RU+26RU+484RU+1N

In a first configuration, a null tone is present at both sides of the 26RU so that an effect of interference from/to an adjacent RU can be decreased. In a second configuration, the effect of interference between 484RU and its adjacent RU can be decreased. An RU which uses a small number of subcarriers, such as 26RU, may preferably use the first configuration since interference has significant effect on performance.

The 484RU is configured of two 242RUs as in the existing 11ax.

484RU=242RU+242RU

The 242RU has the following configuration as in the existing 11ax.

242RU=1N+106RU+1N+26RU+1N+106RU+1N

The 106RU has the following configuration as in the existing 11ax.

106RU=52RU+2N+52RU

The 52RU has the following configuration as in the existing 11ax.

52RU=26RU+26RU 2.2. Tone Plan of 40 MHz

An AP may transmit a PPDU by using a bandwidth of 240 MHz which may be configured by combining three existing 11ax 80 MHz tone plans. This may be expressed as follows by considering both contiguous and non-contiguous situations. 80+80+80 MHz/160+80 MHz/80+160 MHz/240 MHz + means non-contiguous, and 160/240 means that ⅔ 80 MHz tone plans are contiguously arranged in succession.

<In the Presence of Contiguous Band>

When 160 MHz is used, a tone index of a left 80 MHz tone plan is a tone index−512 of the existing 80 MHz tone plan, and a tone index of a right 80 MHz tone plan is a tone index+512 of the existing 80 MHz tone plan.

When 240 MHz is used, a tone index of a center 80 MHz tone plan is directly a tone index of the existing 80 MHz tone plan, a tone index of the leftmost 80 MHz tone plan is a tone index−1024 of the existing 80 MHz tone plan, and a tone index of the right most 80 MHz is a tone index+1024 of the existing 80 MHz tone plan.

A pilot subcarrier shall also be corrected according to a location. When 160 MHz is used, a pilot tone index of a left 80 MHz tone plan is a pilot tone index−512 of the existing 80 MHz tone plan, and a pilot tone index of a right 80 MHz tone plan is a tone index+512 of the existing 80 MHz tone plan.

When 240 MHz is used, a pilot tone index of a center 80 MHz tone plan is directly a pilot tone index of the existing 80 MHz tone plan, a pilot tone index of the leftmost 80 MHz tone plan is a pilot tone index−1024 of the existing 80 MHz tone plan, and a pilot tone index of the right most 80 MHz is a pilot tone index+1024 of the existing 80 MHz tone plan.

Alternatively, the existing 11ax 80 MHz tone plan and the new 160 MHz tone plan may be used, and it may be expressed as follows by considering both contiguous and non-contiguous situations.

c80+n160 MHz/n160 MHz+c80/nc240 MHz/cn240 MHz

+ means non-contiguous, and c80 MHz and n160 MHz respectively mean the existing 11ax 80 MHz tone plan and the new 160 MHz tone plan. nc240 MHz/cn240 MHz mean contiguous one new 160 MHz tone plan and existing one 11ax 80 MHz tone plan, and nc/cn denote successive orders of the respective tone plans.

When nc240 MHz is used, a tone index of a left 160 MHz tone plan is a tone index−512 of the new 160 MHz tone plan, and a tone index of a right 80 MHz tone plan is a tone index+1024 of the existing 80 MHz tone plan.

When cn240 MHz is used, a tone index of a left 80 MHz tone plan is a tone index−1024 of the existing 80 MHz tone plan, and a tone index of a right 160 MHz tone plan is a tone index+512 of the new 160 MHz tone plan.

A pilot subcarrier shall also be corrected according to a location. When nc240 MHz is used, a pilot tone index of a left 160 MHz tone plan is a pilot tone index−512 of the new 160 MHz tone plan, and a pilot tone index of a right 80 MHz tone plan is a pilot tone index+1024 of the existing 80 MHz tone plan.

When cn240 MHz is used, a pilot tone index of the left 80 MHz tone plan is a pilot tone index−1024 of the existing 80 MHz tone plan, and a pilot tone index of a right 160 MHz tone plan is a pilot tone index+512 of the new 160 MHz tone plan.

The aforementioned various non-contiguous combinations may use not only the same band but also different bands. For example, in 80+80+80 MHz, each 80 MHz bandwidth may use 2.4 GH/5 GHz/6 GHz band in transmission.

Specifically, the 240 MHz tone plan may be configured roughly in three ways.

Option 1: combination of three 80 MHz tone plans (80+80+80)

Option 2: combination of two 80 MHz tone plans and one new 160 MHz tone plan (160+80/80+160)

Option 3: alternative 240 MHz tone plan (240)

Non-contiguous may be a case where different bands are used. An index of an RU subcarrier may be corrected based on a location.

An index of a 240 MHz pilot subcarrier may be corrected based on a location as follows.

160 MHz: existing 80 MHz ±512 (the same is also applied to RU tone index)

240 MHz: existing 80 MHz±1024, existing 80 MHz (the same is also applied to RU tone index), new 160 MHz±512 (the same is also applied to RU tone index)

2.3. 320 MHz Tone Plan

A configuration of 320 MHz may consider various options as follows.

Option 1: Combination of Four Existing 11ax 80 MHz Tone Plans

This may be expressed as follows by considering both contiguous and non-contiguous situations.

80+80+80+80 MHz/160+80+80 MHz/80+160+80 MHz/80+80+160 MHz/240+80 MHz/80+240 MHz/320 MHz

+ means non-contiguous, and 160/240/320 manes that 2/3/4 80 MHz tone plans are contiguously arranged in succession.

<In the Presence of Contiguous Band>

When 160 MHz is used, a tone index of a left 80 MHz tone plan is a tone index−512 of the existing 80 MHz tone plan, and a tone index of a right 80 MHz tone plan is a tone index+512 of the existing 80 MHZ tone plan.

When 240 MHz is used, a tone index of a center 80 MHz tone plan is directly a tone index of the existing 80 MHz tone plan, a tone index of the leftmost 80 MHz tone plan is a tone index−1024 of the existing 80 MHz tone plan, and a tone index of the rightmost 80 MHz tone index is a tone index+ 1024 of the existing 80 MHz tone plan.

When 320 MHz is used, a tone index of a first left 80 MHz tone plan is a tone index−1536 of the existing 80 MHz tone plan, a tone index of a second left 80 MHz tone plan is a tone index−512 of the existing 80 MHz tone plan, a tone index of a third left 80 MHz tone plan is a tone index+512 of the existing 80 MHz tone plan, and a tone index of a fourth left 80 MHz tone plan is a tone index+1536 of the existing 80 MHz tone plan.

The aforementioned various non-contiguous combinations may use not only the same band but also different bands. For example, in 80+160+80 MHz, each 80/160/80 MHz bandwidth may use 2.4 GH/5 GHz/6 GHz band in transmission.

Option 2: Combination of Two New 160 MHz Tone Plans

This may be expressed as follows by considering both contiguous and non-contiguous situations.

160+160 MHz/320 MHz

+ means non-contiguous, and 320 MHz means that two new 160 MHz tone plans are contiguously arranged.

<In the Presence of Contiguous Band>

When 320 MHz is used, a tone index of a left 160 MHz tone plan is a tone index−1024 of the new 160 MHz tone plan, and a tone index of a right 160 MHz tone plan is a tone index+1024 of the existing 160 MHZ tone plan.

The aforementioned non-contiguous combinations may use not only the same band but also different bands. For example, in 160+160 MHz, each 160 MHz bandwidth may use 2.4 GH/5 GHz band in transmission.

Option 3: Combination of Two Existing 11ax 80 MHz Tone Plans and One New 160 MHz This may be expressed as follows by considering both contiguous and non-contiguous situations.

c80+c80+n160 MHz/c80+n160 MHz+c80/n160+c80+
c80 MHz/cc160+n160 MHz/n160+cc160 MHz/
ncc320 MHz/cnc320 MHz/ccn320 MHz + means non-contiguous, and c80 MHz, cc160 MHz, and n160 MHz respectively mean the existing 11ax 80 MHz tone plan, the existing 11ax contiguous two 80 MHz tone plans, and a new 160 MHz tone plan. ncc320 MHz/cnc320 MHz/ccn320 MHz mean contiguous one new 160 MHz tone plan and existing two 11ax 80 MHz tone plan, and ncc/cnc/ccn denote successive orders of the respective tone plans.

<In the Presence of Contiguous Band>

When cc160 MHz is used, a tone index of a left 80 MHz tone plan is a tone index−512 of the existing 80 MHz tone plan, and a tone index of a right 80 MHz tone plan is a tone index+512 of the existing 80 MHz tone plan.

When ncc320 MHz is used, a tone index of a left 160 MHz tone plan is a tone index−1024 of a 160 MHz tone plan, a tone index of a next 80 MHz tone plan is a tone index+512 of the existing 80 MHz tone plan, and a tone index of a last 80 MHz tone plan is a tone index+1536 of the existing 80 MHz tone plan.

When cnc320 MHz is used, a tone index of a left 80 MHz tone plan is a tone index−1536 of the existing 80 MHZ tone plan, a tone index of a center 160 MHz tone plan is directly tone index of the new 160 MHz tone plan, a tone index of a last 80 MHz tone plan is a tone index+1536 of the existing 80 MHz tone plan.

When ccn320 MHz is used, a tone index of a left 80 MHz tone plan is a tone index−1536, a tone index of a next 80 MHz tone plan is a tone index−512 of the existing 80 MHz tone plan, and a tone index of a last 160 MHz tone plan is a tone index+1024 of the new 160 MHz tone plan.

Various combinations of tone plans having different configurations of c80 and n160 may be considered in the aforementioned options. In this case, there is a disadvantage in that an indication for RU allocation may become significantly complex. Therefore, in order to reduce the signaling overhead, it may be limited to use only a structure having a specific order. For example, only c80+c80+n160 MHz/ccn320 MHz may be used.

The aforementioned various non-contiguous combinations may use not only the same band but also different bands. For example, in c80+n160+c80 MHz, each c80/n160/c80 MHz bandwidth may use 2.4 GH/5 GHz/6 GHz band in transmission.

Option 4: Alternative 320 MHz Tone Plan Considering Use of One RF

In case of contiguous 320 MHz, a situation where transmission is performed by using one RF may be considered. In this case, 320 MHz constituted by combining 160 MHz or 80 MHz tone plans has many subcarriers which are wasted. Therefore, a new tone plan may be proposed to increase efficiency and throughput of subcarrier in use.

Hereinafter, the aforementioned tone plan will be described in detail with reference to FIG. 21 to FIG. 23.

Figure 21:
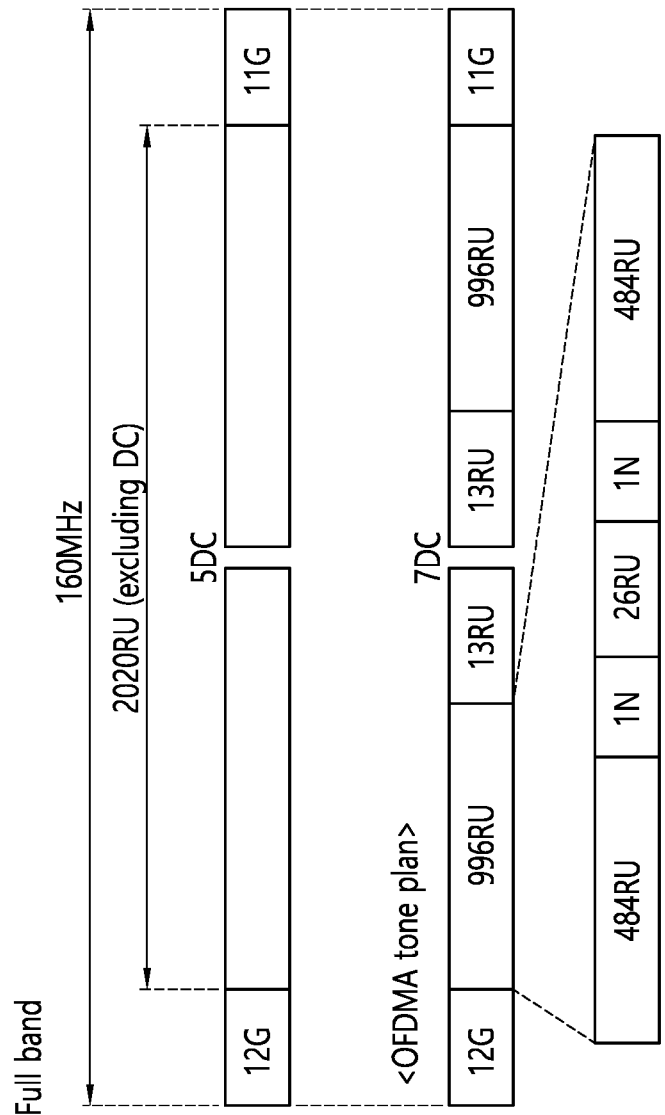
FIG. 21 shows an example of a tone plan in a 160 MHz band according to the present embodiment.

FIG. 21 shows an example of a tone plan in a 160 MHz band according to the present embodiment.

A tone plan in case of a full band and a tone plan in case of applying OFDMA are both illustrated in FIG. 21.

First, in case of the full band, a tone plan of 160 MHz may sequentially consist of 12 guard tones, 2020RU, 5 DC tones, and 11 guard tones. 5 DC tones may be located at the center of 160 MHz, and data may be transmitted in the 2020RU. However, FIG. 21 is for one embodiment only, and thus the 12 guard tones and the 11 guard tones may change in locations. When 7 DC tones are located at the center of 160 MHz, the data may be transmitted in 2018RU.

In case of applying OFDMA, a tone plan of 160 MHz may sequentially consist of 12 guard tones, 996RU, 13RU, 7 DC tones, 13RU, 996RU, and 11 guard tones. In addition, the 996RU may consist of 484RU, one null tone, 26RU, one null tone, and 484RU. However, FIG. 21 is for one embodiment only, and thus the 12 guard tones and the 11 guard tones may change in locations. The 996RU may consist of one null tone, 484RU, 26RU, 484RU, and one null tone.

The 484RU and subordinate RUs are not shown since they may have the same configuration as in the existing 11ax.

Figure 22:
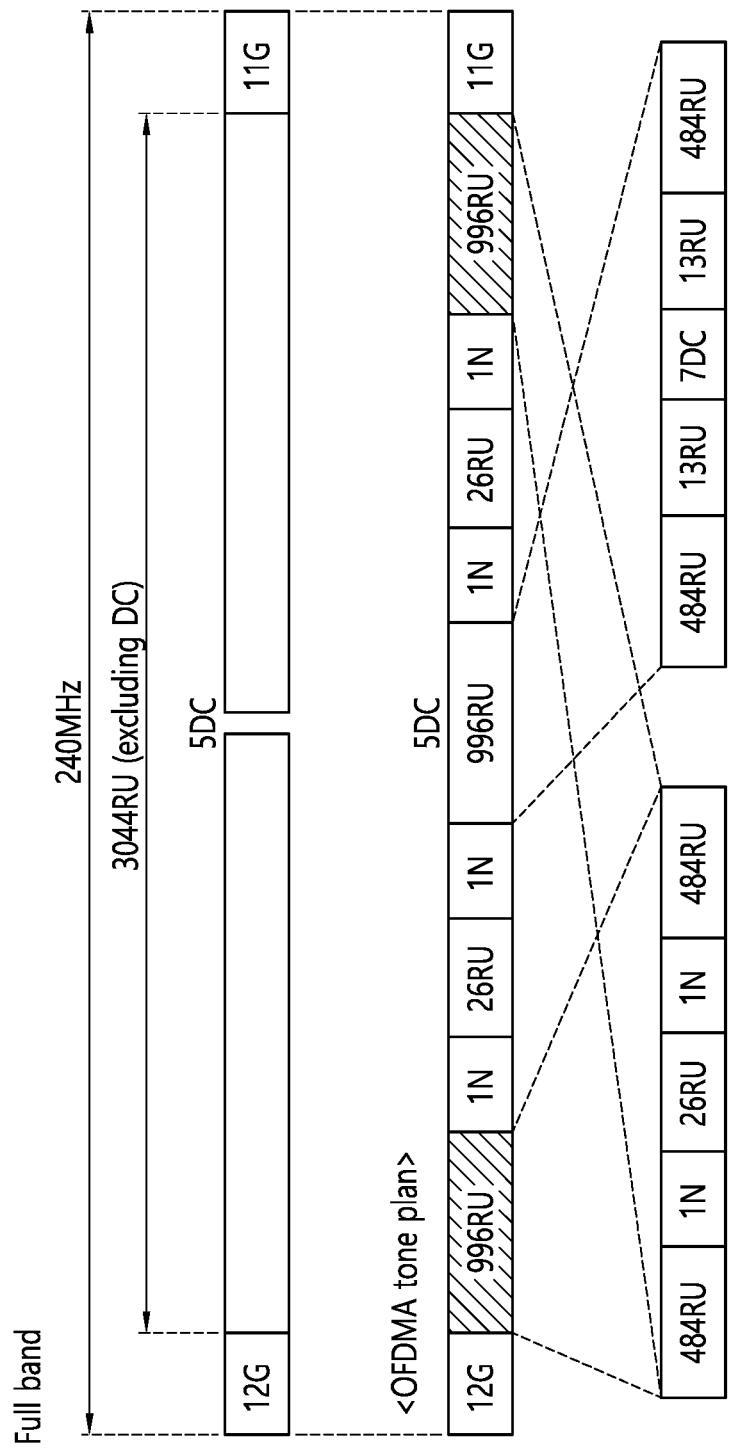
FIG. 22 shows an example of a tone plan in a 240 MHz band according to the present embodiment.

FIG. 22 shows an example of a tone plan in a 240 MHz band according to the present embodiment.

A tone plan in case of a full band proposed in the aforementioned tone plan 1 and a tone plan in case of applying OFDMA are both illustrated in FIG. 22.

First, in case of the full band, a tone plan of 240 MHz may sequentially consist of 12 guard tones, 3044RU, 5 DC tones, and 11 guard tones. 5 DC tones may be located at the center of 160 MHz, and data may be transmitted in the 3044RU. However, FIG. 22 is for one embodiment only, and thus the 12 guard tones and the 11 guard tones may change in locations. When 7 DC tones are located at the center of 240 MHz, the data may be transmitted in 43042RU.

In case of applying OFDMA, a tone plan of 320 MHz may sequentially consist of 12 guard tones, 996RU, 1N, 26RU, 1N, 996RU, 5 DC tones, 1N, 26RU, 1N, 996RU, 11 guard tones.

In addition, the 996RU at both ends may consist of 484RU, one null tone, 26RU, one null tone, and 484RU. The 996RU at the center may consist of 484RU, 13RU, 7 DC tones, 13RU, and 484RU. However, FIG. 13 is for one embodiment only, and thus the 12 guard tones and the 11 guard tones may change in locations. The 996RU at both ends may consist of one null tone, 484RU, 26RU, 484RU, and one null tone.

The 484RU and subordinate RUs are not shown since they may have the same configuration as in the existing 11ax.

When the 240 MHz band is applied to the OFDMA tone plan, an index of a pilot tone in a 996RU located at both ends in the 240 MHz band may be set to ±{24, 92, 158, 226, 266, 334, 400, 468, 536, 604, 670, 738, 778, 846, 912, 980, 1074, 1142, 1208, 1276, 1316, 1384, 1450, 1518}.

When the 240 MHz band is applied to the full band tone plan, an index of a pilot tone may be set to ±{24, 158, 266, 400, 536, 670, 778, 912, 1074, 1208, 1316, 1450}.

However, the index of the pilot tone is only one example, and may be set variously according to a perspective of CFO estimation.

Figure 23:
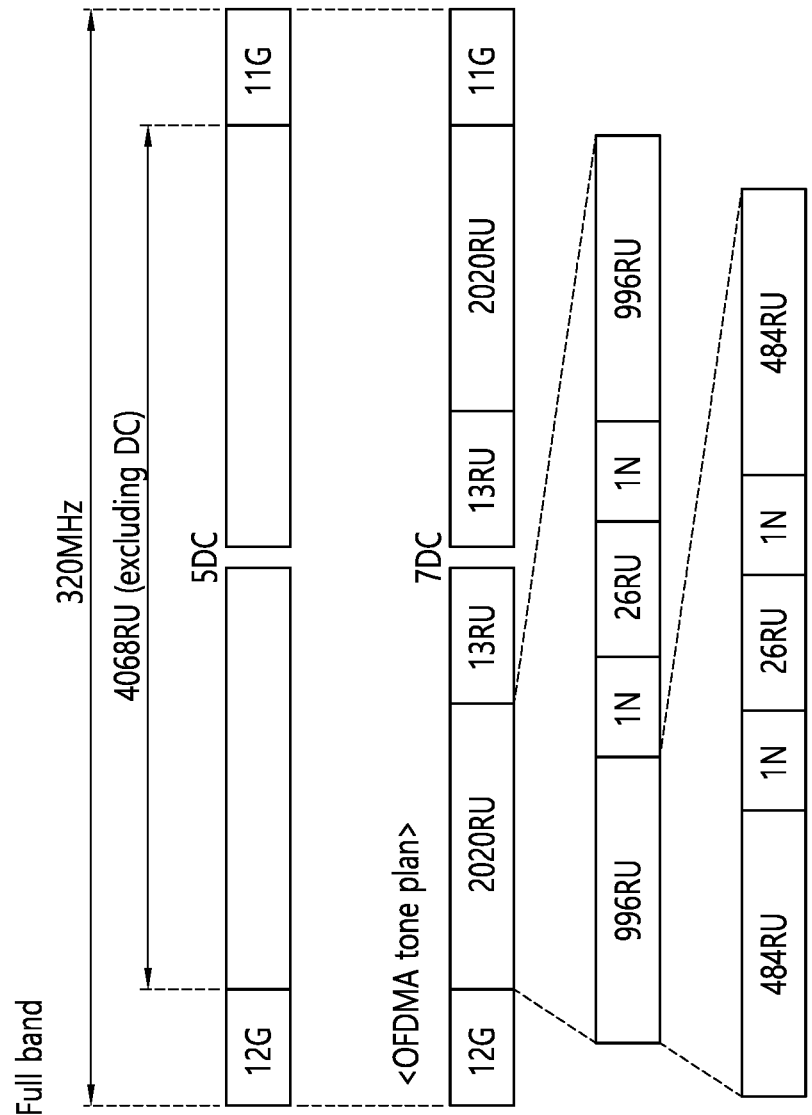
FIG. 23 shows an example of a tone plan in a 320 MHz band according to the present embodiment.

FIG. 23 shows an example of a tone plan in a 320 MHz band according to the present embodiment.

A tone plan in case of a full band and a tone plan in case of applying OFDMA are both illustrated in FIG. 23.

First, in case of the full band, a tone plan of 320 MHz may sequentially consist of 12 guard tones, 4068RU, 5 DC tones, and 11 guard tones. 5 DC tones may be located at the center of 320 MHz, and data may be transmitted in the 4068RU. However, FIG. 23 is for one embodiment only, and thus the 12 guard tones and the 11 guard tones may change in locations. When 7 DC tones are located at the center of 320 MHz, the data may be transmitted in 4066RU.

In case of applying OFDMA, a tone plan of 320 MHz may sequentially consist of 12 guard tones, 2020RU, 13RU, 7 DC tones, 13RU, 2020RU, and 11 guard tones. In addition, the 2020-tone RU may consist of 996RU, one null tone, 26RU, one null tone, and 996RU. In addition, the 996RU may consist of 484RU, one null tone, 26RU, one null tone, and 484RU. However, FIG. 23 is for one embodiment only, and thus the 12 guard tones and the 11 guard tones may change in locations. The 996RU may consist of one null tone, 484RU, 26RU, 484RU, and one null tone.

The 484RU and subordinate RUs are not shown since they may have the same configuration as in the existing 11ax.

3. Embodiment Applicable to the Present Disclosure

Various methods capable of increasing a throughput by supporting a wide bandwidth (up to 320 MHz), 16 streams, multi-band operation, or the like are taken into account in an extreme high throughput (EHT) considered to provide a higher data rate than the 802.11ax.

In the WLAN 802.11 system, in order to increase a peak throughput, transmission of an increased stream (up to 16 streams supported) is considered by using more antennas or a wider band than the existing 11ax. In addition, a scheme of aggregating and using various bands is also considered.

The present specification proposes a 1×STF sequence in a situation of using 160 MHz/240 MHz/320 MHz in particular, by considering a case of using a wideband.

In the existing 11ax, a 1×/2×HE-STF sequence is defined. The 1×HE-STF is used for all HE PPDUs except for an HE TB PPDU of uplink transmission, and the 2×HE-STF is used for an HE TB PPDU. In a 1×HE-STF sequence, the sequence is mapped in units of 16 subcarriers, and when inverse fast Fourier transform (IFFT) is taken, a symbol of 12.8 us is generated, and the same signal is repeated in units of 0.8 us. The signal of 0.8 us is repeated to configure a 1×HE STF of 4 us. In the 2×HE-STF sequence, the sequence is mapped in units of 8 subcarriers, and when IFFT is taken, a symbol of 12.8 us is generated, and the same signal is repeated in units of 1.6 us. The signal of 1.6 us is repeated 5 times to configure a 2×HE-STF of 8 us. The present specification is in regard to the design of the 1×STF sequence when a PPDU is transmitted in a wide bandwidth situation, and such a sequence is referred to as a 1×EHT-STF sequence.

The configuration of the 1×HE-STF sequence may vary depending on a tone plan. In the present specification, a tone plan newly defined to improve a throughput is considered. In 11ax, since a 160 MHz tone plan is configured by repeating the 80 MHz tone plan (see FIG. 7), 23 tones at the center and some tones at the center of 80 MHz cannot be used. The new tone plan may be designed such that only some of 23 DC tones not used are nulled and center tones of each 80 MHz can be used. Similarly, a tone plan may also be defined in 240 MHz/320 MHz by minimizing a wasted tone. Although a coefficient is nulled in each 80 MHz center and edge in a situation where the 80 MHz tone plan is repeated, a specific coefficient may be inserted in the 1×EHT-STF sequence instead of nulling. Of course, a coefficient corresponding to DC is nulled. In this situation, a specific seed sequence (M sequence of 11ax) and an additional coefficient thereof may be repeated, and a phase rotation value of a seed sequence and an additional coefficient thereof may be optimized.

Although preamble puncturing is defined in 11ax, this situation is not considered in the present specification. That is, a situation where all bands are allocated to transmission and thus an EHT-STF sequence is mapped to all bands is considered. In addition, when a PAPR is calculated by optimizing a sequence in terms of the PAPR, only a contiguous situation is considered for a band. However, in a situation of a repeated tone plane, the designed 1×EHT-STF sequence may also be applied directly to a non-contiguous situation. In addition, capability for a maximum transmittable band of radio frequency (RF) is considered, and thus an optimized sequence is proposed as follows.

A sequence optimized by using the same M-sequence is proposed as in 11ax. The M-sequence is as follows.

$$M=\{-1, -1, 1, 1, 1, -1, 1, 1, 1, -1, 1, 1, -1, 1\}$$

3.1 Regarding RF Capability, One RF can Transmit the Entire PPDU Bandwidth.

1) 80 MHz

The existing 80 MHz 1×HE-STF sequence can be directly used as follows.

$$EHT\text{-}STF_{-496:16:496}=\{M\ 1\ -M\ 0\ -M\ 1\ -M\}*(1+j)/\text{sqrt}(2)$$

PAPR is 4.5287 dB.

2) 160 MHz $$EHT\text{-}STF_{-1008:16:1008}=\{M\ 1\ M\ 1\ M\ 1\ -M\ 0\ M\ 1\ -M\ 1\ -M\ 1\ M\}*(1+j)/\text{sqrt}(2)$$

PAPR is 3.9260 dB.

In the present embodiment, when the tone plan for the 160 MHz band is defined as a full band, it may be configured of 12 guard tones, a 2020-tone RU, 5 DC tones, and 11 guard tones. In addition, when the tone plan for the 160 MHz band is defined as OFDMA, the 2020-tone RU may consist of a 996-tone RU, a 484-tone RU, or the like.

3) 240 MHz $$EHT\text{-}STF_{-1520:16:1520} = \{M\ -1\ M\ -1\ M\ -1\ M\ -1\ -M\ -1\ -M\ 0\ M\ 1\ M\ 1\ -M\ 1\ M\ 1\ -M\ 1\ M\}^*(1+j)/\text{sqrt}(2)$$

PAPR is 3.9164 dB.

In the present embodiment, when the tone plan for the 240 MHz band is defined as a full band, it may be configured of 12 guard tones, a 3044-tone RU, 5 DC tones, and 11 guard tones. In addition, when the tone plan for the 240 MHz band is defined as OFDMA, the 3044-tone RU may consist of a 996-tone RU, a 484-tone RU, or the like.

4) 320 MHz

The 320 MHz is a contiguous band, and may consist of two non-contiguous 160 MHz channels (lower 160 MHz channel and higher 160 MHz channel or primary 160 MHz and secondary 160 MHz). Some channels included in the 320 MHz band may be expressed as high and low in a frequency domain.

The 320 MHz tone plan is proposed for two cases. In a first case, a sequence is optimized in a situation where only an STF coefficient corresponding to DC is nulled by minimizing a wasted tone. In a second case, in consideration of the 320 MHz tone plan configured by repeating the 160 MHz tone plan, a sequence is optimized by repeating a sequence (EHT-STF$_{-1008:16:1008}$) proposed in the section 2) and by applying an additional phase rotation.

In case of a first embodiment, the tone plan for 320 MHz may be defined as a full band, and may be configured of 4096-tone RU or may be configured of 12 guard tones, a 4068-tone RU, 5 DC tones, and 11 guard tones.

In case of a second embodiment, the tone plan for 320 MHz may be configured of a tone plan in which the aforementioned tone plan (including full band and OFDMA) for 160 MHz is repeated.

In the existing 11ax, when the 160 MHz sequence is configured, the 80 MHz 1×HE-STF sequence is repeated and a first 40 MHz part of an 80 MHz channel with a relatively high frequency (or a secondary 80 MHz channel when the 80+80 MHz sequence is configured) is multiplied by −1 to decrease a PAPR. This is directly extended to propose a sequence for decreasing a PAPR when configuring a 320 MHz sequence, by applying an additional phase rotation in units of 20/40/80/160 MHz to a 160 MHz channel with a relatively high frequency (or a secondary 160 MHz channel when configuring a 160+160 MHz sequence). This scheme is also directly applied to another proposal for 320 MHz described below.

Option 1: A sequence optimized in a tone plan which minimizes a waste of tones.

$$EHT\text{-}STF_{-2032:16:2032} = \{M\ 1\ -M\ 1\ -M\ 1\ -M\ 1\ M\ 1\ -M\ 1\ -M\ 1\ -M\ 0\ M\ -1\ -M\ -1\ M\ 1\ M\ 1\ -M\ 1\ M\ -1\ -M\ -1\ -M\}^*(1+j)/\text{sqrt}(2)$$

PAPR is 4.0359 dB.

Option 2: A 160 MHz 1×EHT-STF sequence is repeated in a tone plan in which a 160 MHz tone plan is repeated.

$$EHT\text{-}STF_{-2032:16:2032} = \{M\ 1\ M\ 1\ M\ 1\ -M\ 0\ M\ 1\ -M\ 1\ -M\ 1\ M\ 0\ M\ 1\ M\ 1\ M\ 1\ -M\ 0\ M\ 1\ -M\ 1\ -M\ 1\ M\}^*(1+j)/\text{sqrt}(2)$$

PAPR is 6.7057 dB.

Option 3: A 160 MHz 1×EHT-STF sequence is repeated in a tone plan in which a 160 MHz tone plan is repeated, and an additional phase rotation is applied in units of 20 MHz in a 160 MHz channel with a relatively high frequency.

That is, it is a sequence for optimizing a PAPR by applying an additional phase rotation in units of 20 MHz to a 160 MHz channel with a relatively high frequency.

$$EHT\text{-}STF_{-2032:16:2032} = \{M\ 1\ M\ 1\ M\ 1\ -M\ 0\ M\ 1\ -M\ 1\ -M\ 1\ M\ 0\ -M\ -1\ -M\ 1\ M\ -1\ M\ 0\ -M\ 1\ -M\ 1\ -M\ 1\ M\}^*(1+j)/\text{sqrt}(2)$$

PAPR is 2011 dB.

Option 4: A 160 MHz 1×EHT-STF sequence is repeated in a tone plan in which a 160 MHz tone plan is repeated, and an additional phase rotation is applied in units of 40 MHz in a 160 MHz channel with a relatively high frequency.

That is, it is a sequence for optimizing a PAPR by applying an additional phase rotation in units of 40 MHz to a 160 MHz channel with a relatively high frequency.

$$EHT\text{-}STF_{-2032:16:2032} = \{M\ 1\ M\ 1\ M\ 1\ -M\ 0\ M\ 1\ -M\ 1\ -M\ 1\ M\ 0\ M\ 1\ M\ 1\ M\ 1\ -M\ 0\ -M\ -1\ M\ -1\ M\ -1\ -M\}^*(1+j)/\text{sqrt}(2)$$

PAPR is 6.2646 dB.

Option 5: A 160 MHz 1×EHT-STF sequence is repeated in a tone plan in which a 160 MHz tone plan is repeated, and an additional phase rotation is applied in units of 80 MHz in a 160 MHz channel with a relatively high frequency.

That is, it is a sequence for optimizing a PAPR by applying an additional phase rotation in units of 80 MHz to a 160 MHz channel with a relatively high frequency.

$$EHT\text{-}STF_{-2032:16:2032} = \{M\ 1\ M\ 1\ M\ 1\ -M\ 0\ M\ 1\ -M\ 1\ -M\ 1\ M\ 0\ M\ 1\ M\ 1\ M\ 1\ -M\ 0\ -M\ -1\ M\ -1\ -M\}^*(1+j)/\text{sqrt}(2)$$

PAPR is 6.2646 dB.

Option 6: A 160 MHz 1×EHT-STF sequence is repeated in a tone plan in which a 160 MHz tone plan is repeated, and an additional phase rotation is applied in units of 160 MHz in a 160 MHz channel with a relatively high frequency.

That is, it is a sequence for optimizing a PAPR by applying an additional phase rotation in units of 160 MHz to a 160 MHz channel with a relatively high frequency.

$$EHT\text{-}STF_{-2032:16:2032} = \{M\ 1\ M\ 1\ M\ 1\ -M\ 0\ M\ 1\ -M\ 1\ -M\ 1\ M\ 0\ M\ 1\ M\ 1\ M\ 1\ -M\ 0\ M\ 1\ -M\ 1\ -M\ 1\ M\}^*(1+j)/\text{sqrt}(2)$$

PAPR is 6.7057 dB.

At 320 MHz in which a 160 MHz tone plan is repeated, the 1×EHT-STF sequence proposed in Option 3 may be preferentially used in terms of PAPR (Option 2~Option 6).

5) 160+160 MHz (Non-contiguous)

The present embodiment applies the aforementioned scheme in which a sequence with a good PAPR proposed in 320 MHz is used in a non-contiguous 160+160 MHz band (or channel). In the non-contiguous 160+160 MHz channel, among sequences with the good PAPR proposed in contiguous 320 MHz, a sequence applied to 160 MHz with a relatively low frequency may be applied to primary 160 MHz, and a sequence applied to 160 MHz with a relatively high frequency may be applied to secondary 160 MHz.

i) A sequence for the primary 160 MHz channel $$EHT\text{-}STF_{-1008:16:1008} = \{M\ 1\ M\ 1\ M\ 1\ -M\ 0\ M\ 1\ -M\ 1\ M\}^*(1+j)/\text{sqrt}(2)$$

ii) A sequence for the secondary 160 MHz channel $$EHT\text{-}STF_{-1008:16:1008} = \{M\ 1\ M\ 1\ M\ 1\ -M\ 0\ -M\ -1\ M\ -1\ M\ -1\ -M\}^*(1+j)/\text{sqrt}(2)$$

3.2. Various RF Capability, that is, a Situation Where a Transmittable Maximum Bandwidth of RF is 80/160/240/320 MHz or the Like is Considered.

For example, when transmitting a 160 MHz PPDU, two RFs having a transmittable bandwidth of 80 MHz may be used, or one RF having a transmittable bandwidth of 160 MHz may be used. Therefore, when optimizing a sequence, it is possible to design a sequence which minimizes a max PAPR by considering a PAPR in case of using two 80 MHz RFs and in case of using one 160 MHz RF. In the following description, a PAPR in a bandwidth other than 80 MHz is a max PAPR among PAPRs of several 80/160/240/320 MHz parts.

1) 80 MHz

The existing 80 MHz 1×HE-STF sequence can be directly used as follows.

$EHT\text{-}STF_{-496:16:496} = \{M\ 1\ -M\ 0\ -M\ 1\ -M\}*(1+j)/\text{sqrt}(2)$ PAPR is 4.5287 dB.

2) 160 MHz $EHT\text{-}STF_{-1008:16:1008} = \{M\ -1\ M\ -1\ -M\ -1\ M\ 0\ M\ -1\ -M\ 1\ -M\ -1\ -M\}*(1+j)/\text{sqrt}(2)$ PAPR is 4.7462 dB.

In the present embodiment, when the tone plan for the 160 MHz band is defined as a full band, it may be configured of 12 guard tones, a 2020-tone RU, 5 DC tones, and 11 guard tones. In addition, when the tone plan for the 160 MHz band is defined as OFDMA, the 2020-tone RU may consist of a 996-tone RU, a 484-tone RU, or the like.

3) 240 MHz $EHT\text{-}STF_{-1520:16:1520} = \{M\ -1\ M\ -1\ M\ 1\ -M\ 1\ M\ -1\ M\ 0\ -M\ -1\ M\ 1\ -M\ 1\ -M\ -1\ -M\ 1\ M\}*(1+j)/\text{sqrt}(2)$ PAPR is 4.9838 dB.

In the present embodiment, when the tone plan for the 160 MHz band is defined as a full band, it may be configured of 12 guard tones, a 3044-tone RU, 5 DC tones, and 11 guard tones. In addition, when the tone plan for the 240 MHz band is defined as OFDMA, the 3044-tone RU may consist of a 996-tone RU, a 484-tone RU, or the like.

4) 320 MHz

The 320 MHz is a contiguous band, and may consist of two non-contiguous 160 MHz channels (lower 160 MHz channel and higher 160 MHz channel or primary 160 MHz and secondary 160 MHz). Some channels included in the 320 MHz band may be expressed as high and low in a frequency domain.

In case of a first embodiment, the tone plan for 320 MHz may be defined as a full band, and may be configured of 4096-tone RU or may be configured of 12 guard tones, a 4068-tone RU, 5 DC tones, and 11 guard tones.

In case of a second embodiment, the tone plan for 320 MHz may be configured of a tone plan in which the aforementioned tone plan (including full band and OFDMA) for 160 MHz is repeated.

The 320 MHz tone plan is proposed for two cases. In a first case, a sequence is optimized in a situation where only an STF coefficient corresponding to DC is nulled by minimizing a wasted tone. In a second case, in consideration of the 320 MHz tone plan configured by repeating the 160 MHz tone plan, a sequence is optimized by repeating a sequence (EHT-STF$_{-1008:16:1008}$) proposed in the section 2) and by applying an additional phase rotation.

In the existing 11ax, when the 160 MHz sequence is configured, the 80 MHz 1×HE-STF sequence is repeated and a first 40 MHz part of an 80 MHz channel with a relatively high frequency (or a secondary 80 MHz channel when the 80+80 MHz sequence is configured) is multiplied by −1 to decrease a PAPR. This is directly extended to propose a sequence for decreasing a PAPR when configuring a 320 MHz sequence, by applying an additional phase rotation in units of 20/40/80/160 MHz to a 160 MHz channel with a relatively high frequency (or a secondary 160 MHz channel when configuring a 160+160 MHz sequence). This scheme is also directly applied to another proposal for 320 MHz described below.

Option 1: A sequence optimized in a tone plan which minimizes a waste of tones.

$EHT\text{-}STF_{-2032:16:2032} = \{M\ 1\ -M\ -1\ -M\ 1\ -M\ 1\ -M\ -1\ -M\ 1\ -M\ 1\ M\ 0\ -M\ -1\ M\ -1\ M\ -1\ -M\ 1\ -M\ -1\ -M\ 1\ M\ -1\ -M\}*(1+j)/\text{sqrt}(2)$ PAPR is 5.8502 dB.

Option 2: A 160 MHz 1×EHT-STF sequence is repeated in a tone plan in which a 160 MHz tone plan is repeated.

$EHT\text{-}STF_{-2032:16:2032} = \{M\ -1\ M\ -1\ -M\ -1\ M\ 0\ M\ -1\ -M\ 1\ -M\ -1\ -M\ 0\ M\ -1\ M\ -1\ -M\ 1\ -M\ -1\ -M\}*(1+j)/\text{sqrt}(2)$ PAPR is 7.7565 dB.

Option 3: A 160 MHz 1×EHT-STF sequence is repeated in a tone plan in which a 160 MHz tone plan is repeated, and an additional phase rotation is applied in units of 20 MHz in a 160 MHz channel with a relatively high frequency.

That is, it is a sequence for optimizing a PAPR by applying an additional phase rotation in units of 20 MHz to a 160 MHz channel with a relatively high frequency.

$EHT\text{-}STF_{-2032:16:2032} = \{M\ -1\ M\ -1\ -M\ -1\ M\ 0\ M\ -1\ -M\ 1\ -M\ -1\ -M\ 0\ -M\ -1\ M\ 1\ M\ 1\ -M\ 0\ M\ 1\ M\ -1\ M\ -1\ -M\}*(1+j)/\text{sqrt}(2)$ PAPR is 6.5122 dB.

Option 4: A 160 MHz 1×EHT-STF sequence is repeated in a tone plan in which a 160 MHz tone plan is repeated, and an additional phase rotation is applied in units of 40 MHz in a 160 MHz channel with a relatively high frequency.

That is, it is a sequence for optimizing a PAPR by applying an additional phase rotation in units of 40 MHz to a 160 MHz channel with a relatively high frequency.

$EHT\text{-}STF_{-2032:16:2032} = \{M\ -1\ M\ -1\ -M\ -1\ M\ 0\ M\ -1\ -M\ 1\ -M\ -1\ -M\ 0\ -M\ 1\ -M\ 1\ M\ 1\ -M\ 0\ M\ -1\ -M\ -1\ M\ 1\ M\}*(1+j)/\text{sqrt}(2)$ PAPR is 6.5328 dB.

Option 5: A 160 MHz 1×EHT-STF sequence is repeated in a tone plan in which a 160 MHz tone plan is repeated, and an additional phase rotation is applied in units of 80 MHz in a 160 MHz channel with a relatively high frequency.

That is, it is a sequence for optimizing a PAPR by applying an additional phase rotation in units of 80 MHz to a 160 MHz channel with a relatively high frequency.

$EHT\text{-}STF_{-2032:16:2032} = \{M\ -1\ M\ -1\ -M\ -1\ M\ 0\ M\ -1\ -M\ 1\ -M\ -1\ -M\ 0\ M\ -1\ M\ -1\ -M\ -1\ M\ 0\ -M\ 1\ M\ -1\ M\ 1\ M\}*(1+j)/\text{sqrt}(2)$ PAPR is 6.7985 dB.

Option 6: A 160 MHz 1×EHT-STF sequence is repeated in a tone plan in which a 160 MHz tone plan is repeated, and an additional phase rotation is applied in units of 160 MHz in a 160 MHz channel with a relatively high frequency.

That is, it is a sequence for optimizing a PAPR by applying an additional phase rotation in units of 160 MHz to a 160 MHz channel with a relatively high frequency.

$$EHT\text{-}STF_{-2032:16:2032} = \{M -1\ M -1\ -M -1\ M\ 0\ M\\ -1\ -M\ 1\ -M -1\ -M\ 0\ -M\ 1\ -M\ 1\ M\ 1\ -M\ 0\\ -M\ 1\ M -1\ M\ 1\ M\}*(1+j)/\text{sqrt}(2)$$

PAPR is 7.7532 dB.

At 320 MHz in which a 160 MHz tone plan is repeated, the 1×EHT-STF sequence proposed in Option 3 may be preferentially used in terms of PAPR (Option 2~Option 6).

5) 160+160 MHz (Non-contiguous)

The present embodiment applies the aforementioned scheme in which a sequence with a good PAPR proposed in 320 MHz is used in a non-contiguous 160+160 MHz band (or channel). In the non-contiguous 160+160 MHz channel, among sequences with the good PAPR proposed in contiguous 320 MHz, a sequence applied to 160 MHz with a relatively low frequency may be applied to primary 160 MHz, and a sequence applied to 160 MHz with a relatively high frequency may be applied to secondary 160 MHz.

i) A sequence for the primary 160 MHz channel $$EHT\text{-}STF_{-1008:16:1008} = \{M\ 1\ M\ 1\ M\ 1\ -M\ 0\ M\ 1\ -M\\ 1\ -M\ 1\ M\}*(1+j)/\text{sqrt}(2)$$

ii) A sequence for the secondary 160 MHz channel $$EHT\text{-}STF_{-1008:16:1008} = \{M\ 1\ M\ 1\ M\ 1\ -M\ 0\ -M\ -1\\ M -1\ M -1\ -M\}*(1+j)/\text{sqrt}(2)$$

The proposal of the section 3.2 considering various RF capabilities may be a more reasonable scheme.

Hereinafter, the aforementioned embodiment is described with reference to FIG. 18 to FIG. 23.

Figure 24:
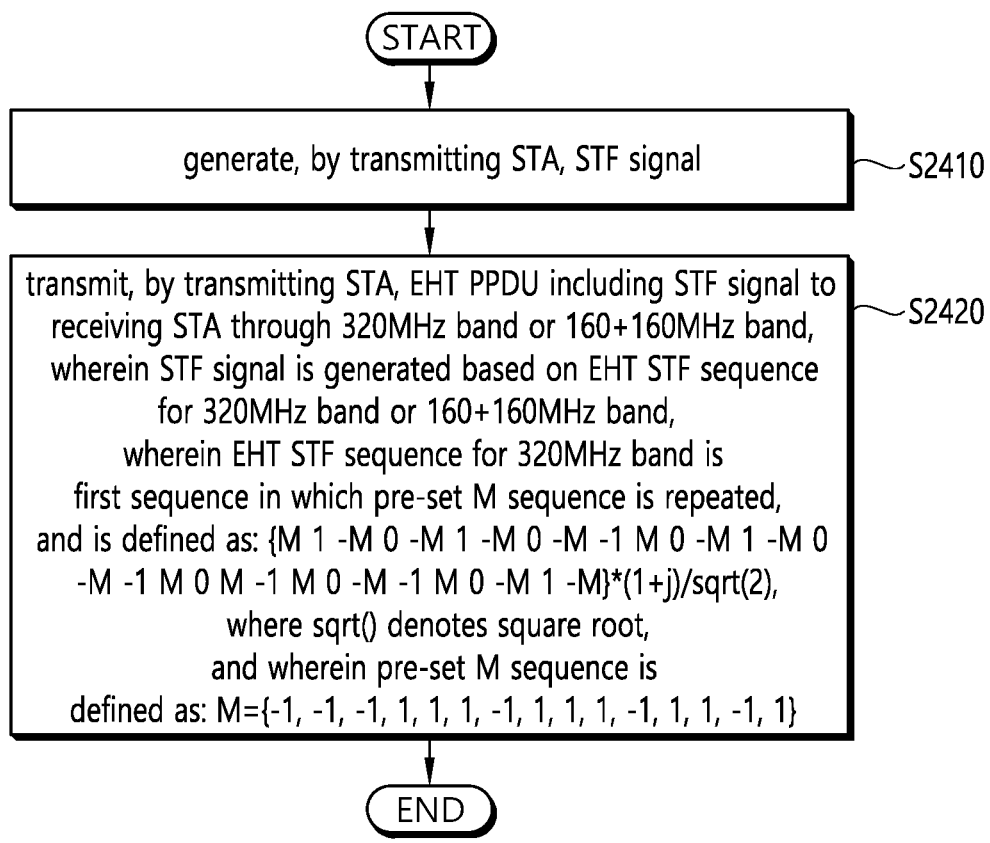
FIG. 24 is a flowchart illustrating a procedure in which a transmitting STA transmits an EHT PPDU according to the present embodiment.

FIG. 24 is a flowchart illustrating a procedure in which a transmitting STA transmits an EHT PPDU according to the present embodiment.

An example of FIG. 24 may be performed in a network environment in which a next-generation WLAN system is supported. The next-generation WLAN system is a WLAN system evolved from an 802.11ax system, and may satisfy backward compatibility with the 802.11 ax system.

The next-generation WLAN system (IEEE 802.11be or EHT WLAN system) may support a wideband to increase a throughput. The wideband includes 160 MHz, 240 MHz, and 320 MHz bands (or a 160+160 MHz band). In the present embodiment, an STF sequence for obtaining an optimal peak-to-average power ratio (PAPR) is proposed by considering a tone plane for each band, whether preamble puncturing is performed, and radio frequency (RF) capability.

An example of FIG. 24 may be performed by a transmitting station (STA), and the transmitting STA may correspond to an access point (AP). A receiving STA of FIG. 24 may correspond to an STA supporting an EHT WLAN system.

In step S2410, the transmitting STA generates a short training field (STF) signal.

In step S2420, the transmitting STA transmits the EHT PPDU including the STF signal to the receiving STA through a 320 MHz band or a 160+160 MHz band. The 320 MHz band is a contiguous band, and the 160+160 MHz band is a non-contiguous band.

The STF signal is generated based on an EHT STF sequence for the 320 MHz band or the 160+160 MHz band.

The EHT STF sequence for the 320 MHz band is a first sequence in which a pre-set M sequence is repeated, and is defined as follows.

$$\{M\ 1\ -M\ 0\ -M\ 1\ -M\ 0\ -M\ -1\ M\ 0\ -M\ 1\ -M\ 0\ -M\\ -1\ M\ 0\ M\ -1\ M\ 0\ -M\ -1\ M\ 0\ -M\ 1\ -M\}*\\ (1+j)/\text{sqrt}(2).$$

Herein, sqrt( ) represents a square root. In addition, * denotes a multiplication operator.

The pre-set M sequence is defined as follows.

$$M=\{-1, -1, -1, 1, 1, 1, -1, 1, 1, 1, -1, 1, 1, -1, 1\}$$

The pre-set M-sequence is the same as the M-sequence defined in the 801.11ax.

The first sequence (i.e., $\{M\ 1\ -M\ 0\ -M\ 1\ -M\ 0\ -M\ -1\ M\ 0\ -M\ 1\ -M\ 0\ -M\ -1\ M\ 0\ M\ -1\ M\ 0\ -M\ -1\ M\ 0\ -M\ 1\ -M\}*(1+j)/\text{sqrt}(2))$ may be mapped to a frequency tone with an interval of 16 tones from a lowest tone having a tone index of −2032 to a highest tone having a tone index of +2032. If the EHT STF sequence (or the first sequence) is mapped to a frequency tone (or subcarrier) corresponding to the 320 MHz band in units of 16 frequency tones and then IFFT is performed thereon, a time-domain signal of 12.8 us in which the same 16 signals with a periodicity of 0.8 us are repeated is generated. In this case, a 1×STF signal of 4 us may be generated by repeating the signal of 0.8 us five times. The STF signal may be the 1×STF signal.

In addition, the EHT STF sequence for the 160+160 MHz band may consist of a second sequence for a primary 160 MHz channel and a third sequence for a secondary 160 MHz channel.

The second sequence may be defined as follows.

$$\{M\ 1\ M\ 1\ M\ 1\ -M\ 0\ M\ 1\ -M\ 1\ -M\ 1\ M\}*(1+j)/\text{sqrt}(2)$$

The third sequence may be defined as follows.

$$\{M\ 1\ M\ 1\ M\ 1\ -M\ 0\ -M\ -1\ M\ -1\ M\ -1\ -M\}*(1+j)/\text{sqrt}(2)$$

The second and third sequences may be mapped to the frequency tone with an interval of 16 tones from a lowest tone having a tone index of −1008 to a highest tone having a tone index of +1008.

The 320 MHz band may include a lower 160 MHz channel in which the tone index is relative low and a higher 160 MHz channel in which the tone index is relatively high.

Specifically, the first sequence may be generated in a fourth sequence in which a high efficiency (HE) STF sequence for the 160 MHz band is repeated, by applying a phase rotation in units of 80 MHz to a sequence for the higher 160 MHz channel. The HE STF sequence for the 160 MHz band may be a 160 MHz 1×HE STF sequence ($\{M\ 1\ M\ 1\ M\ 1\ -M\ 0\ M\ 1\ -M\ 1\ -M\ 1\ M\}*(1+j)/\text{sqrt}(2)$) optimized by considering a tone plan described below.

The fourth sequence may be defined as follows.

$$\{M\ 1\ M\ 1\ M\ 1\ -M\ 0\ M\ 1\ -M\ 1\ -M\ 1\ M\ 0\ M\ 1\ M\ 1\\ M\ 1\ -M\ 0\ M\ 1\ -M\ 1\ -M\ 1\ M\}*(1+j)/\text{sqrt}(2)$$

The phase rotation may be applied to a sequence for an 80 MHz channel of which the tone index is high in the higher 160 MHz channel. In this case, a value of the phase ration may be −1. That is, in the fourth sequence, $\{M\ 1\ -M\ 1\ -M\ 1\ M\}*(1+j)/\text{sqrt}(2)$, i.e., a sequence for an 80 MHz channel of which the tone index is high in the higher 160 MHz channel may be multiplied by −1 to obtain the first sequence (i.e., $\{M\ 1\ M\ 1\ M\ 1\ -M\ 0\ M\ 1\ -M\ 1\ -M\ 1M\ 0\ M\ 1\ M\ 1\ M\ 1\ -M\ -M\ -1\ M\ -1\ M\ -1\ -M\}*(1+j)/\text{sqrt}(2)$).

A tone plan of the 320 MHz band or 160+160 MHz band may be determined as a repetition of a tone plan for the 160 MHz band. The tone plan for the 160 MHz band may be defined in the EHT WLAN system. The tone plan defined in the EHT WLAN system is the aforementioned tone plan.

When the tone plan for the 160 MHz band is defined as a full band, the 160 MHz band may consist of 12 guard tones, a 2020-tone RU, 5 DC tones, and 11 guard tones, based on the tone plan for the 160 MHz band. The 2020-tone RU may be an RU including 2020 tones.

When the tone plan for the 160 MHz band is defined as orthogonal frequency division multiple access (OFDMA), the 160 MHz band may consist of 12 guard tones, a 996-tone RU, a 13-tone RU, 7 DC tones, a 13-tone RU, a 996-tone RU, and 11 guard tones, based on the tone plan for the 160 MHz band. The 996-tone RU may be an RU including 996 tones, and the 13-tone RU may be an RU including 13 tones.

The 996-tone RU may consist of 484 tones, one null tone, a 26-tone RU, one null tone, and a 484-tone RU. The 484-tone RU may be an RU including 484 tones, and the 26-tone RU may be an RU including 26 tones.

In addition, in the 320 MHz band or the 160+160 MHz band, preamble puncturing may not be performed, and the EHT STF sequence may be mapped to the entire band.

The transmitting STA may have RF capability supporting the 320 MHz band or the 160+160 MHz band through one RF.

The STF signal may be used to improve automatic gain control (AGC) estimation in multiple input multiple output (MIMO) transmission.

The EHT STF sequence may be a sequence for obtaining a minimum peak-to-average power ratio (PAPR) based on the RF capability and the tone plan of the 320 MHz band or the 160+160 MHz band. That is, the present embodiment proposes an STF sequence optimized in terms of PAPR when the transmitting device supports the 320 MHz band through one RF, instead of applying preamble puncturing in the 320 MHz band which is a repetition of the tone plan for the 80 MHz band defined in the 802.11ax WLAN system. However, although only the 320 MHz band or the 160+160 MHz band is described in the present embodiment, the STF sequence optimized in terms of PAPR may also be set for the 160 MHz band or the 240 MHz band, and a related embodiment thereof has been descried above.

Figure 25:
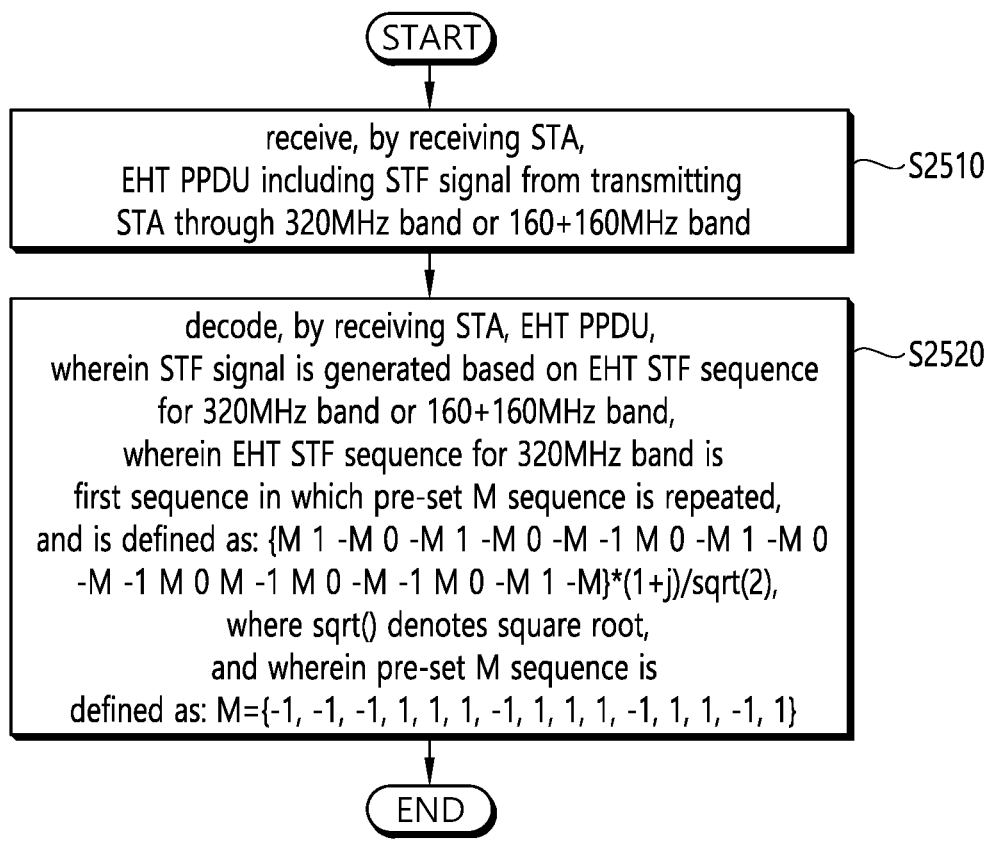
FIG. 25 is a flowchart illustrating a procedure in which a receiving STA receives an EHT PPDU according to the present embodiment.

FIG. 25 is a flowchart illustrating a procedure in which a receiving STA receives an EHT PPDU according to the present embodiment.

An example of FIG. 25 may be performed in a network environment in which a next-generation WLAN system is supported. The next-generation WLAN system is a WLAN system evolved from an 802.11ax system, and may satisfy backward compatibility with the 802.11ax system.

The next-generation WLAN system (IEEE 802.11be or EHT WLAN system) may support a wideband to increase a throughput. The wideband includes 160 MHz, 240 MHz, and 320 MHz bands (or a 160+160 MHz band). In the present embodiment, an STF sequence for obtaining an optimal PAPR is proposed by considering a tone plane for each band, whether preamble puncturing is performed, and RF capability.

The example of FIG. 25 may be performed by the receiving STA which may correspond to an STA supporting an EHT WLAN system. A transmitting STA of FIG. 25 may correspond to an AP.

In step S2510, the receiving STA receives the EHT PPDU including an STF signal from the transmitting STA through a 320 MHz band or a 160+160 MHz band. The 320 MHz band is a contiguous band, and the 160+160 MHz band is a non-contiguous band.

In step S2520, the receiving STA decodes the EHT PPDU. In addition, the receiving STA may perform automatic gain control (AGC) estimation in multiple input multiple output (MIMO) transmission based on the STF signal.

The STF signal is generated based on an EHT STF sequence for the 320 MHz band or the 160+160 MHz band.

The EHT STF sequence for the 320 MHz band is a first sequence in which a pre-set M sequence is repeated, and is defined as follows.

$\{M\ 1\ -M\ 0\ -M\ 1\ -M\ 0\ -M\ -1\ M\ 0\ -M\ 1\ -M\ 0\ -M\ -1\ M\ 0\ M\ -1\ M\ 0\ -M\ -1\ M\ 0\ -M\ 1\ -M\}*(1+j)/\text{sqrt}(2).$ Herein, sqrt( ) denotes a square root. In addition, * denotes a multiplication operator.

The pre-set M sequence is defined as follows.

$M=\{-1, -1, -1, 1, 1, 1, -1, 1, 1, 1, -1, 1, 1, -1, 1\}$

The pre-set M-sequence is the same as the M-sequence defined in the 801.11ax.

The first sequence (i.e., {M −M 0 −M 1 −M 0 −M −1 M 0 −M 1 −M 0 −M −1 M 0 M −1 M 0 −M −1 M 0 −M 1 −M}*(1+j)/sqrt(2)) may be mapped to a frequency tone with an interval of 16 tones from a lowest tone having a tone index of −2032 to a highest tone having a tone index of +2032. If the EHT STF sequence (or the first sequence) is mapped to a frequency tone (or subcarrier) corresponding to the 320 MHz band in units of 16 frequency tones and then IFFT is performed thereon, a time-domain signal of 12.8 us in which the same 16 signals with a periodicity of 0.8 us are repeated is generated. In this case, a 1×STF signal of 4 us may be generated by repeating the signal of 0.8 us five times. The STF signal may be the 1×STF signal.

In addition, the EHT STF sequence for the 160+160 MHz band may consist of a second sequence for a primary 160 MHz channel and a third sequence for a secondary 160 MHz channel.

The second sequence may be defined as follows.

$\{M\ 1\ M\ 1\ M\ 1\ -M\ 0\ M\ 1\ -M\ 1\ -M\ 1\ M\}*(1+j)/\text{sqrt}(2)$

The third sequence may be defined as follows.

$\{M\ 1\ M\ 1\ M\ 1\ -M\ 0\ -M\ -1\ M\ -1\ M\ -1\ -M\}*(1+j)/\text{sqrt}(2)$

The second and third sequences may be mapped to the frequency tone with an interval of 16 tones from a lowest tone having a tone index of −1008 to a highest tone having a tone index of +1008.

The 320 MHz band may include a lower 160 MHz channel in which the tone index is relative low and a higher 160 MHz channel in which the tone index is relatively high.

Specifically, the first sequence may be generated in a fourth sequence in which a high efficiency (HE) STF sequence for the 160 MHz band is repeated, by applying a phase rotation in units of 80 MHz to a sequence for the higher 160 MHz channel. The HE STF sequence for the 160 MHz band may be a 160 MHz 1×HE STF sequence ({M 1 M 1 M 1 −M 0 M 1 −M 1 −M 1 M} *(1+j)/sqrt(2)) optimized by considering a tone plan described below.

The fourth sequence may be defined as follows.

$\{M\ 1\ M\ 1\ M\ 1\ -M\ 0\ M\ 1\ -M\ 1\ -M\ 1\ M\ 0\ M\ 1\ M\ 1\ M\ 1\ -M\ 0\ M\ 1\ -M\ 1\ -M\ 1\ M\}*(1+j)/\text{sqrt}(2)$ The phase rotation may be applied to a sequence for an 80 MHz channel of which the tone index is high in the higher 160 MHz channel. In this case, a value of the phase ration may be −1. That is, in the fourth sequence, {M 1 −M 1 −M 1 M}*(1+j)/sqrt(2), i.e., a sequence for an 80 MHz channel of which the tone index is high in the higher 160 MHz channel may be multiplied by −1 to obtain the first sequence (i.e., {M 1 M 1 M 1 −M 0 M 1 −M 1 −M 1 M0 M 1 M 1 M 1 −M −M −1 M −1 M −1 −M}*(1+j)/sqrt(2)).

A tone plan of the 320 MHz band or 160+160 MHz band may be determined as a repetition of a tone plan for the 160

MHz band. The tone plan for the 160 MHz band may be defined in the EHT WLAN system. The tone plan defined in the EHT WLAN system is the aforementioned tone plan.

When the tone plan for the 160 MHz band is defined as a full band, the 160 MHz band may consist of 12 guard tones, a 2020-tone RU, 5 DC tones, and 11 guard tones, based on the tone plan for the 160 MHz band. The 2020-tone RU may be an RU including 2020 tones.

When the tone plan for the 160 MHz band is defined as orthogonal frequency division multiple access (OFDMA), the 160 MHz band may consist of 12 guard tones, a 996-tone RU, a 13-tone RU, 7 DC tones, a 13-tone RU, a 996-tone RU, and 11 guard tones, based on the tone plan for the 160 MHz band. The 996-tone RU may be an RU including 996 tones, and the 13-tone RU may be an RU including 13 tones.

The 996-tone RU may consist of 484 tones, one null tone, a 26-tone RU, one null tone, and a 484-tone RU. The 484-tone RU may be an RU including 484 tones, and the 26-tone RU may be an RU including 26 tones.

In addition, in the 320 MHz band or the 160+160 MHz band, preamble puncturing may not be performed, and the EHT STF sequence may be mapped to the entire band.

The transmitting STA may have RF capability supporting the 320 MHz band or the 160+160 MHz band through one RF.

The STF signal may be used to improve automatic gain control (AGC) estimation in multiple input multiple output (MIMO) transmission.

The EHT STF sequence may be a sequence for obtaining a minimum peak-to-average power ratio (PAPR) based on the RF capability and the tone plan of the 320 MHz band or the 160+160 MHz band. That is, the present embodiment proposes an STF sequence optimized in terms of PAPR when the transmitting device supports the 320 MHz band through one RF, instead of applying preamble puncturing in the 320 MHz band which is a repetition of the tone plan for the 80 MHz band defined in the 802.11ax WLAN system. However, although only the 320 MHz band or the 160+160 MHz band is described in the present embodiment, the STF sequence optimized in terms of PAPR may also be set for the 160 MHz band or the 240 MHz band, and a related embodiment thereof has been descried above.

6. Device Configuration

Figure 26:
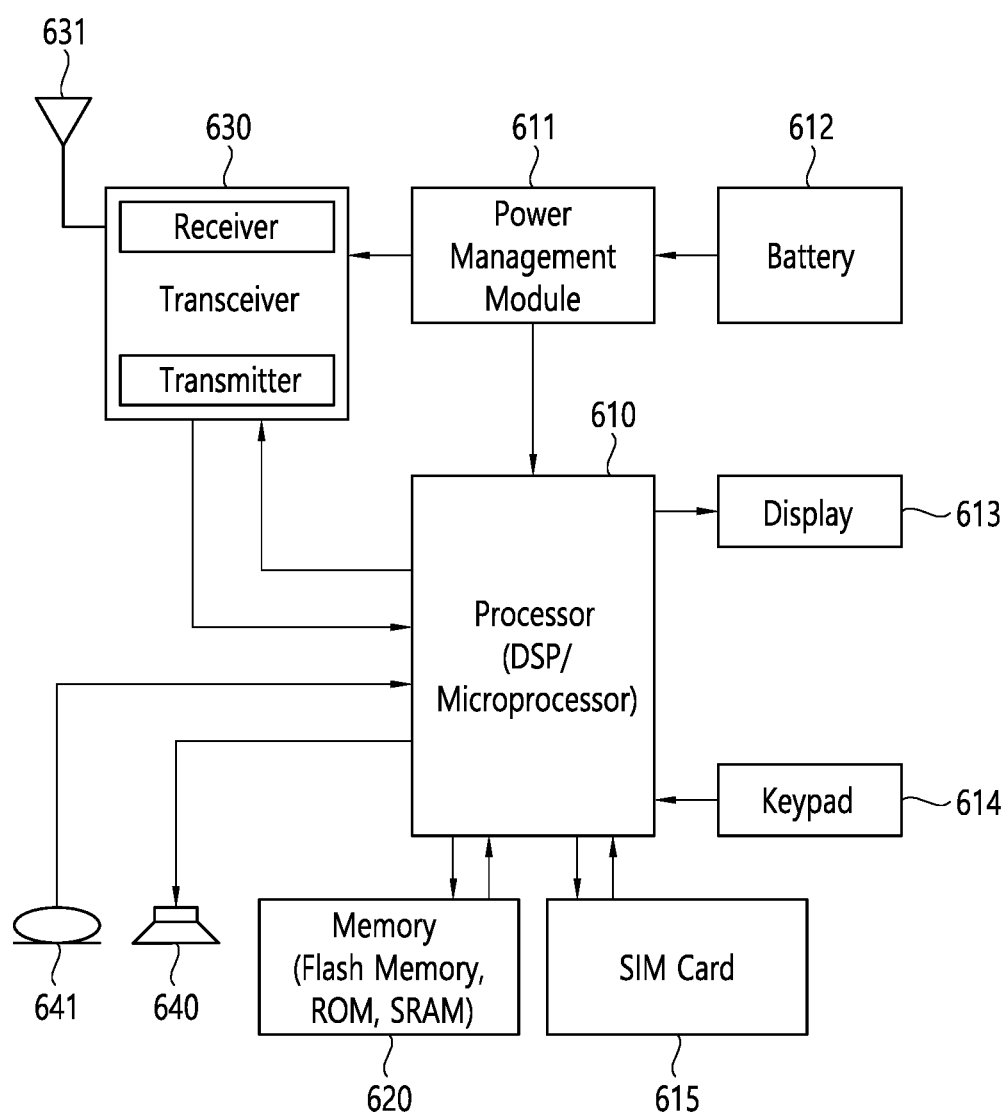
FIG. 26 shows a wireless device to which the technical features of the present disclosure can be applied.

FIG. 26 shows a wireless device to which the technical features of the present disclosure can be applied. The present disclosure described above for a transmitting device or a receiving device may be applied to this embodiment.

The wireless device includes a processor 610, a power management module 611, a battery 612, a display 613, a keypad 614, a subscriber identification module (SIM) card 615, a memory 620, a transceiver 630, one or more antennas 631, a speaker 640, and a microphone 641.

The processor 610 may be configured to implement proposed functions, procedures and/or methods described in the present specification. Layers of a radio interface protocol may be implemented in the processor 610. The processor 610 may include application-specific integrated circuit (ASIC), other chipset, logic circuit and/or data processing device. The processor 610 may be an application processor (AP). The processor 610 may include at least one of a digital signal processor (DSP), a central processing unit (CPU), a graphics processing unit (GPU), a modulator and demodulator (modem). An example of the processor 610 may be found in SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or a corresponding next generation processor.

The power management module 611 manages power for the processor 610 and/or the transceiver 630. The battery 612 supplies power to the power management module 611. The display 613 outputs results processed by the processor 610. The keypad 614 receives inputs to be used by the processor 610. The keypad 614 may be shown on the display 613. The SIM card 615 is an integrated circuit that is intended to securely store the international mobile subscriber identity (IMSI) number and its related key, which are used to identify and authenticate subscribers on mobile telephony devices (such as mobile phones and computers). It is also possible to store contact information in many SIM cards.

The memory 620 is operatively coupled with the processor 610 and stores a variety of information to operate the processor 610. The memory 620 may include read-only memory (ROM), random access memory (RAM), flash memory, memory card, storage medium and/or other storage device. When the embodiments are implemented in software, the techniques described herein can be implemented with modules (e.g., procedures, functions, and so on) that perform the functions described herein. The modules can be stored in the memory 620 and executed by the processor 610. The memory 620 may be implemented inside the processor 610. Alternatively, the memory 620 may be implemented outside the processor 610, and may be communicatively coupled to the processor 610 via various means known in the art.

The transceiver 630 is operatively coupled with the processor 610, and transmits and/or receives a radio signal. The transceiver 630 includes a transmitter and a receiver. The transceiver 630 may include baseband circuitry to process radio frequency signals. The transceiver controls the one or more antennas 631 to transmit and/or receive a radio signal.

The speaker 640 outputs sound-related results processed by the processor 610. The microphone 641 receives sound-related inputs to be used by the processor 610.

In case of the transmitting device, the processor 610 generates an STF signal, and transmits the EHT PPDU including the STF signal to a receiving STA through a 320 MHz band or a 160+160 MHz band.

In case of the receiving device, the processor 610 receives the EHT PPDU including the STF signal from the transmitting STA through the 320 MHz band or the 160+160 MHz band, decodes the EHT PPDU, and performs AGC estimation in MIMO transmission based on the STF signal.

The 320 MHz band is a contiguous band, and the 160+160 MHz band is a non-contiguous band.

The STF signal is generated based on an EHT STF sequence for the 320 MHz band or the 160+160 MHz band.

The EHT STF sequence for the 320 MHz band is a first sequence in which a pre-set M sequence is repeated, and is defined as follows.

$$\{M\ 1\ -M\ 0\ -M\ 1\ -M\ 0\ -M\ -1\ M\ 0\ -M\ 1\ -M\ 0\ -M$$
$$-1\ M\ 0\ M\ -1\ M\ 0\ -M\ -1\ M\ 0\ -M\ 1\ -M\}^*$$
$$(1+j)/\text{sqrt}(2).$$

Herein, sqrt( ) denotes a square root. In addition, * denotes a multiplication operator.

The pre-set M sequence is defined as follows.

$$M=\{-1, -1, -1, 1, 1, 1, -1, 1, 1, 1, -1, 1, 1, -1, 1\}$$

The pre-set M-sequence is the same as the M-sequence defined in the 801.11ax.

The first sequence (i.e., {M 1 -M 0 -M 1 -M 0 -M -1 M 0 -M 1 -M 0 -M -1 M 0 M -1 M 0 -M -1 M 0 -M 1

−M}*(1+j)/sqrt(2)) may be mapped to a frequency tone with an interval of 16 tones from a lowest tone having a tone index of −2032 to a highest tone having a tone index of +2032. If the EHT STF sequence (or the first sequence) is mapped to a frequency tone (or subcarrier) corresponding to the 320 MHz band in units of 16 frequency tones and then IFFT is performed thereon, a time-domain signal of 12.8 us in which the same 16 signals with a periodicity of 0.8 us are repeated is generated. In this case, a 1×STF signal of 4 us may be generated by repeating the signal of 0.8 us five times. The STF signal may be the 1×STF signal.

In addition, the EHT STF sequence for the 160+160 MHz band may consist of a second sequence for a primary 160 MHz channel and a third sequence for a secondary 160 MHz channel.

The second sequence may be defined as follows.

$$\{M\ 1\ M\ 1\ M\ 1\ −M\ 0\ M\ 1\ −M\ 1\ −M\ 1\ M\}*(1+j)/\text{sqrt}(2)$$

The third sequence may be defined as follows.

$$\{M\ 1\ M\ 1\ M\ 1\ −M\ 0\ −M\ −1\ M\ −1\ M\ −1\ −M\}*(1+j)/\text{sqrt}(2)$$

The second and third sequences may be mapped to the frequency tone with an interval of 16 tones from a lowest tone having a tone index of −1008 to a highest tone having a tone index of +1008.

The 320 MHz band may include a lower 160 MHz channel in which the tone index is relative low and a higher 160 MHz channel in which the tone index is relatively high.

Specifically, the first sequence may be generated in a fourth sequence in which a high efficiency (HE) STF sequence for the 160 MHz band is repeated, by applying a phase rotation in units of 80 MHz to a sequence for the higher 160 MHz channel. The HE STF sequence for the 160 MHz band may be a 160 MHz 1×HE STF sequence ({M 1 M 1 M 1 −M 0 M 1 −M 1 −M 1 M} *(1+j)/sqrt(2)) optimized by considering a tone plan described below.

The fourth sequence may be defined as follows.

$$\{M\ 1\ M\ 1\ M\ 1\ −M\ 0\ M\ 1\ −M\ 1\ −M\ 1\ M\ 0\ M\ 1\ M\ 1\ M\ 1\ −M\ 0\ M\ 1\ −M\ 1\ −M\ 1\ M\}*(1+j)/\text{sqrt}(2)$$

The phase rotation may be applied to a sequence for an 80 MHz channel of which the tone index is high in the higher 160 MHz channel. In this case, a value of the phase ration may be −1. That is, in the fourth sequence, {M 1 −M 1 −M 1 M}*(1+j)/sqrt(2), i.e., a sequence for an 80 MHz channel of which the tone index is high in the higher 160 MHz channel may be multiplied by −1 to obtain the first sequence (i.e., {M 1 M 1 M 1 −M 0 M 1 −M 1 −M 1M 0 M 1 M 1 M 1 −M −M −1 M −1 M −1 −M}*(1+j)/sqrt(2)).

A tone plan of the 320 MHz band or 160+160 MHz band may be determined as a repetition of a tone plan for the 160 MHz band. The tone plan for the 160 MHz band may be defined in the EHT WLAN system. The tone plan defined in the EHT WLAN system is the aforementioned tone plan.

When the tone plan for the 160 MHz band is defined as a full band, the 160 MHz band may consist of 12 guard tones, a 2020-tone RU, 5 DC tones, and 11 guard tones, based on the tone plan for the 160 MHz band. The 2020-tone RU may be an RU including 2020 tones.

When the tone plan for the 160 MHz band is defined as orthogonal frequency division multiple access (OFDMA), the 160 MHz band may consist of 12 guard tones, a 996-tone RU, a 13-tone RU, 7 DC tones, a 13-tone RU, a 996-tone RU, and 11 guard tones, based on the tone plan for the 160 MHz band. The 996-tone RU may be an RU including 996 tones, and the 13-tone RU may be an RU including 13 tones.

The 996-tone RU may consist of 484 tones, one null tone, a 26-tone RU, one null tone, and a 484-tone RU. The 484-tone RU may be an RU including 484 tones, and the 26-tone RU may be an RU including 26 tones.

In addition, in the 320 MHz band or the 160+160 MHz band, preamble puncturing may not be performed, and the EHT STF sequence may be mapped to the entire band.

The transmitting STA may have RF capability supporting the 320 MHz band or the 160+160 MHz band through one RF.

The STF signal may be used to improve automatic gain control (AGC) estimation in multiple input multiple output (MIMO) transmission.

The EHT STF sequence may be a sequence for obtaining a minimum peak-to-average power ratio (PAPR) based on the RF capability and the tone plan of the 320 MHz band or the 160+160 MHz band. That is, the present embodiment proposes an STF sequence optimized in terms of PAPR when the transmitting device supports the 320 MHz band through one RF, instead of applying preamble puncturing in the 320 MHz band which is a repetition of the tone plan for the 80 MHz band defined in the 802.11ax WLAN system. However, although only the 320 MHz band or the 160+160 MHz band is described in the present embodiment, the STF sequence optimized in terms of PAPR may also be set for the 160 MHz band or the 240 MHz band, and a related embodiment thereof has been descried above.

The foregoing technical features of this specification are applicable to various applications or business models. For example, the foregoing technical features may be applied for wireless communication of a device supporting artificial intelligence (AI).

Artificial intelligence refers to a field of study on artificial intelligence or methodologies for creating artificial intelligence, and machine learning refers to a field of study on methodologies for defining and solving various issues in the area of artificial intelligence. Machine learning is also defined as an algorithm for improving the performance of an operation through steady experiences of the operation.

An artificial neural network (ANN) is a model used in machine learning and may refer to an overall problem-solving model that includes artificial neurons (nodes) forming a network by combining synapses. The artificial neural network may be defined by a pattern of connection between neurons of different layers, a learning process of updating a model parameter, and an activation function generating an output value.

The artificial neural network may include an input layer, an output layer, and optionally one or more hidden layers. Each layer includes one or more neurons, and the artificial neural network may include synapses that connect neurons. In the artificial neural network, each neuron may output a function value of an activation function of input signals input through a synapse, weights, and deviations.

A model parameter refers to a parameter determined through learning and includes a weight of synapse connection and a deviation of a neuron. A hyper-parameter refers to a parameter to be set before learning in a machine learning algorithm and includes a learning rate, the number of iterations, a mini-batch size, and an initialization function.

Learning an artificial neural network may be intended to determine a model parameter for minimizing a loss function. The loss function may be used as an index for determining an optimal model parameter in a process of learning the artificial neural network.

Machine learning may be classified into supervised learning, unsupervised learning, and reinforcement learning.

Supervised learning refers to a method of training an artificial neural network with a label given for training data, wherein the label may indicate a correct answer (or result value) that the artificial neural network needs to infer when the training data is input to the artificial neural network. Unsupervised learning may refer to a method of training an artificial neural network without a label given for training data. Reinforcement learning may refer to a training method for training an agent defined in an environment to choose an action or a sequence of actions to maximize a cumulative reward in each state.

Machine learning implemented with a deep neural network (DNN) including a plurality of hidden layers among artificial neural networks is referred to as deep learning, and deep learning is part of machine learning. Hereinafter, machine learning is construed as including deep learning.

The foregoing technical features may be applied to wireless communication of a robot.

Robots may refer to machinery that automatically process or operate a given task with own ability thereof. In particular, a robot having a function of recognizing an environment and autonomously making a judgment to perform an operation may be referred to as an intelligent robot.

Robots may be classified into industrial, medical, household, military robots and the like according uses or fields. A robot may include an actuator or a driver including a motor to perform various physical operations, such as moving a robot joint. In addition, a movable robot may include a wheel, a brake, a propeller, and the like in a driver to run on the ground or fly in the air through the driver.

The foregoing technical features may be applied to a device supporting extended reality.

Extended reality collectively refers to virtual reality (VR), augmented reality (AR), and mixed reality (MR). VR technology is a computer graphic technology of providing a real-world object and background only in a CG image, AR technology is a computer graphic technology of providing a virtual CG image on a real object image, and MR technology is a computer graphic technology of providing virtual objects mixed and combined with the real world.

MR technology is similar to AR technology in that a real object and a virtual object are displayed together. However, a virtual object is used as a supplement to a real object in AR technology, whereas a virtual object and a real object are used as equal statuses in MR technology.

XR technology may be applied to a head-mount display (HMD), a head-up display (HUD), a mobile phone, a tablet PC, a laptop computer, a desktop computer, a TV, digital signage, and the like. A device to which XR technology is applied may be referred to as an XR device.

Claims disclosed in the present specification can be combined in various ways. For example, technical features in method claims of the present specification can be combined to be implemented or performed in an apparatus, and technical features in apparatus claims of the present specification can be combined to be implemented or performed in a method. Further, technical features in method claims and apparatus claims of the present specification can be combined to be implemented or performed in an apparatus. Further, technical features in method claims and apparatus claims of the present specification can be combined to be implemented or performed in a method.

What is claimed is:

1. A method of transmitting an extremely high throughput (EHT) physical protocol data unit (PPDU) in a wireless local area network (WLAN) system, the method comprising:

generating, by a transmitting station (STA), a short training field (STF) signal; and transmitting, by the transmitting STA, the EHT PPDU including the STF signal to a receiving STA through a 320 MHz band or a 160+160 MHz band, wherein the STF signal is generated based on an EHT STF sequence for the 320 MHz band or the 160+160 MHz band, wherein the EHT STF sequence for the 320 MHz band is a first sequence in which a pre-set M sequence is repeated, and is defined as:

$\{M\ 1\ M\ 1\ M\ 1\ -M\ 0\ M\ 1\ -M\ 1\ -M\ 1\ M\ 0\ M\ 1\ M\ 1\ M\ 1\ -M\ 0\ -M\ -1\ M\ -1\ M\ -1\ -M\}*(1+j)/\text{sqrt}(2)$, where sqrt( ) denotes a square root, and
wherein the pre-set M sequence is defined as:

$M=\{-1, -1, -1, 1, 1, 1, -1, 1, 1, 1, -1, 1, 1, -1, 1\}$.

2. The method of claim 1,
wherein the EHT STF sequence for the 160+160 MHz band consists of a second sequence for a primary 160 MHz channel and a third sequence for a secondary 160 MHz channel,
wherein the second sequence is defined as:

$\{M\ 1\ M\ 1\ M\ 1\ -M\ 0\ M\ 1\ -M\ 1\ -M\ 1\ M\}*(1+j)/\text{sqrt}(2)$, and wherein the third sequence is defined as:

$\{M\ 1\ M\ 1\ M\ 1\ -M\ 0\ -M\ -1\ M\ -1\ M\ -1\ -M\}*(1+j)/\text{sqrt}(2)$.

3. The method of claim 2,
wherein the first sequence is mapped to a frequency tone with an interval of 16 tones from a lowest tone having a tone index of −2032 to a highest tone having a tone index of +2032, and
wherein the second and third sequences are mapped to the frequency tone with an interval of 16 tones from a lowest tone having a tone index of −1008 to a highest tone having a tone index of +1008.

4. The method of claim 3,
wherein the 320 MHz band includes a lower 160 MHz channel of which the tone index is relative low and a higher 160 MHz channel of which the tone index is relatively high,
wherein the first sequence is generated in a fourth sequence in which a high efficiency (HE) STF sequence for the 160 MHz band is repeated, by applying a phase rotation in units of 80 MHz to a sequence for the higher 160 MHz channel,
wherein the fourth sequence is defined as:

$\{M\ 1\ M\ 1\ M\ 1\ -M\ 0\ M\ 1\ -M\ 1\ -M\ 1\ M\ 0\ M\ 1\ M\ 1\ M\ 1\ -M\ 0\ M\ 1\ -M\ 1\ -M\ 1\ M\}*(1+j)/\text{sqrt}(2)$, wherein the phase rotation is applied to a sequence for an 80 MHz channel of which the tone index is high in the higher 160 MHz channel, and
wherein a value of the phase ration is −1.

5. The method of claim 2,
wherein a tone plan of the 320 MHz band or the 160+160 MHz band is determined as a repetition of a tone plan for the 160 MHz band, and
wherein the tone plan for the 160 MHz band is defined in an EHT WLAN system.

6. The method of claim 5, wherein when the tone plan for the 160 MHz band is defined as a full band, the 160 MHz band consists of 12 guard tones, a 2020-tone resource unit (RU), 5 direct conversion (DC) tones, and 11 guard tones, based on the tone plan for the 160 MHz band, and the 2020-tone RU is an RU including 2020 tones.

7. The method of claim 5, wherein when the tone plan for the 160 MHz is defined as orthogonal frequency division multiple access (OFDMA), the 160 MHz band consists of 12 guard tones, a 996-tone RU, a 13-tone RU, 7 DC tones, a 13-tone RU, a 996-tone RU, and 11 guard tones, based on the tone plan for the 160 MHz band, the 996-tone RU is an RU including 996 tones, and the 13-tone RU is an RU including 13 tones.

8. The method of claim 7, wherein the 996-tone RU consists of 484 tones, one null tone, a 26-tone RU, one null tone, and a 484-tone RU, the 484-tone RU is an RU including 484 tones, and the 26-tone RU is an RU including 26 tones.

9. The method of claim 5, wherein the transmitting STA has radio frequency (RF) capability supporting the 320 MHz band or the 160+160 MHz band through one RF.

10. The method of claim 9,
wherein the STF signal is used to improve automatic gain control (AGC) estimation in multiple input multiple output (MIMO) transmission, and
wherein the EHT STF sequence is a sequence for obtaining a minimum peak-to-average power ratio (PAPR) based on the RF capability and the tone plan of the 320 MHz band or the 160+160 MHz band.

11. A transmitting station (STA) for transmitting an extremely high throughput (EHT) physical protocol data unit (PPDU) in a wireless local area network (WLAN) system, the transmitting STA comprising:
a memory;
a transceiver; and
a processor operatively coupled to the memory and the transceiver, wherein the processor is configured to:
generate a short training field (STF) signal; and
transmit the EHT PPDU including the STF signal to a receiving STA through a 320 MHz band or a 160+160 MHz band,
wherein the STF signal is generated based on an EHT STF sequence for the 320 MHz band or the 160+160 MHz band,
wherein the EHT STF sequence for the 320 MHz band is a first sequence in which a pre-set M sequence is repeated, and is defined as:

$\{M\ 1\ M\ 1\ M\ 1\ -M\ 0\ M\ 1\ -M\ 1\ -M\ 1\ M\ 0\ M\ 1\ M\ 1\ M\ 1\ -M\ 0\ -M\ -1\ M\ -1\ M\ -1\ -M\}*(1+j)/\text{sqrt}(2)$, where sqrt( ) denotes a square root, and
wherein the pre-set M sequence is defined as:

$M=\{-1, -1, -1, 1, 1, 1, -1, 1, 1, 1, -1, 1, 1, -1, 1\}$.

12. The transmitting STA of claim 11,
wherein the EHT STF sequence for the 160+160 MHz band consists of a second sequence for a primary 160 MHz channel and a third sequence for a secondary 160 MHz channel,
wherein the second sequence is defined as:

$\{M\ 1\ M\ 1\ M\ 1\ -M\ 0\ M\ 1\ -M\ 1\ -M\ 1\ M\}*(1+j)/\text{sqrt}(2)$, and wherein the third sequence is defined as:

$\{M\ 1\ M\ 1\ M\ 1\ -M\ 0\ -M\ -1\ M\ -1\ M\ -1\ -M\}*(1+j)/\text{sqrt}(2)$.

13. The transmitting STA of claim 12,
wherein a tone plan of the 320 MHz band or the 160+160 MHz band is determined as a repetition of a tone plan for the 160 MHz band, and
wherein the tone plan for the 160 MHz band is defined in an EHT WLAN system.

14. The transmitting STA of claim 13, wherein when the tone plan for the 160 MHz band is defined as a full band, the 160 MHz band consists of 12 guard tones, a 2020-tone resource unit (RU), 5 direct conversion (DC) tones, and 11 guard tones, based on the tone plan for the 160 MHz band, and the 2020-tone RU is an RU including 2020 tones.

15. The transmitting STA of claim 13, wherein when the tone plan for the 160 MHz is defined as orthogonal frequency division multiple access (OFDMA), the 160 MHz band consists of 12 guard tones, a 996-tone RU, a 13-tone RU, 7 DC tones, a 13-tone RU, a 996-tone RU, and 11 guard tones, based on the tone plan for the 160 MHz band, the 996-tone RU is an RU including 996 tones, and the 13-tone RU is an RU including 13 tones.

16. The transmitting STA of claim 15, wherein the 996-tone RU consists of 484 tones, one null tone, a 26-tone RU, one null tone, and a 484-tone RU, the 484-tone RU is an RU including 484 tones, and the 26-tone RU is an RU including 26 tones.

17. The transmitting STA of claim 13, wherein the transmitting STA has radio frequency (RF) capability supporting the 320 MHz band or the 160+160 MHz band through one RF.

18. The method of claim 17,
wherein the STF signal is used to improve automatic gain control (AGC) estimation in multiple input multiple output (MIMO) transmission, and
wherein the EHT STF sequence is a sequence for obtaining a minimum peak-to-average power ratio (PAPR) based on the RF capability and the tone plan of the 320 MHz band or the 160+160 MHz band.

19. A method of receiving an extremely high throughput (EHT) physical protocol data unit (PPDU) in a wireless local area network (WLAN) system, the method comprising:
receiving, by a receiving station (STA), the EHT PPDU including a short training field (STF) signal from a transmitting STA through a 320 MHz band or a 160+160 MHz band, and
decoding, by the receiving STA, the EHT PPDU,
wherein the EHT PPDU including the STF signal is transmitted to the receiving STA through a 320 MHz band or a 160+160 MHz band,
wherein the STF signal is generated based on an EHT STF sequence for the 320 MHz band or the 160+160 MHz band,
wherein the EHT STF sequence for the 320 MHz band is a first sequence in which a pre-set M sequence is repeated, and is defined as:

$\{M\ 1\ M\ 1\ M\ 1\ -M\ 0\ M\ 1\ -M\ 1\ -M\ 1\ M\ 0\ M\ 1\ M\ 1\ M\ 1\ -M\ 0\ -M\ -1\ M\ -1\ M\ -1\ -M\}*(1+j)/\text{sqrt}(2)$, where sqrt( ) denotes a square root, and
wherein the pre-set M sequence is defined as:

$M=\{-1, -1, -1, 1, 1, 1, -1, 1, 1, 1, -1, 1, 1, -1, 1\}$.

20. The method of claim 19, further comprising performing, by the receiving STA, automatic gain control (AGC) estimation in multiple input multiple output (MIMO) transmission based on the STF signal.

* * * * *